(12) United States Patent
Nagata et al.

(10) Patent No.: US 7,201,395 B2
(45) Date of Patent: Apr. 10, 2007

(54) KNEE-PROTECTING AIRBAG DEVICE

(75) Inventors: Atsushi Nagata, Aichi-ken (JP); Kazuhiro Nakayama, Aichi-ken (JP); Yoshio Mizuno, Aichi-ken (JP); Yuji Sato, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 399 days.

(21) Appl. No.: 10/744,134

(22) Filed: Dec. 24, 2003

(65) Prior Publication Data

US 2004/0164527 A1     Aug. 26, 2004

(30) Foreign Application Priority Data

| Dec. 27, 2002 | (JP) | ............................. 2002-381485 |
| Dec. 27, 2002 | (JP) | ............................. 2002-381498 |
| Dec. 27, 2002 | (JP) | ............................. 2002-381511 |
| Dec. 27, 2002 | (JP) | ............................. 2002-381532 |
| Jan. 30, 2003 | (JP) | ............................. 2003-022569 |

(51) Int. Cl.
 *B60R 21/231* (2006.01)
(52) U.S. Cl. .................................... 280/730.1; 280/752
(58) Field of Classification Search ............ 280/728.1, 280/728.2, 730.1, 743.1, 743.2, 752, 753; *B60R 21/16, B60R 21/22*
See application file for complete search history.

(56) References Cited

U.S. PATENT DOCUMENTS

| 6,220,629 B1* | 4/2001 | Wipasuramonton et al. ..... 280/743.1 |
| 6,416,079 B1* | 7/2002 | Lutz et al. ................ 280/730.1 |
| 2002/0024200 A1* | 2/2002 | Eckert et al. ............ 280/730.1 |
| 2002/0149187 A1* | 10/2002 | Holtz et al. .................. 280/749 |
| 2002/0171230 A1* | 11/2002 | Takimoto et al. ........ 280/730.1 |
| 2002/0171232 A1 | 11/2002 | Abe |
| 2003/0107206 A1* | 6/2003 | Takimoto et al. ........ 280/730.1 |
| 2004/0207183 A1* | 10/2004 | Nagata et al. ............ 280/730.1 |
| 2006/0071459 A1* | 4/2006 | Hayakawa et al. ...... 280/730.1 |

FOREIGN PATENT DOCUMENTS

| DE | 199 46 477 A1 | 3/2001 |
| EP | 1 300 299 A1 | 4/2003 |
| JP | A-H07-137594 | 5/1995 |
| JP | A-2001-233165 | 8/2001 |
| JP | A-2002-249016 | 9/2002 |
| WO | WO 02/04261 A1 | 1/2002 |

* cited by examiner

*Primary Examiner*—Paul N. Dickson
*Assistant Examiner*—Leonard McCreary, Jr.
(74) *Attorney, Agent, or Firm*—Posz Law Group, PLC

(57) ABSTRACT

In a knee-protecting airbag device according to the present invention, an airbag folded and housed in undeployed condition protrudes rearward from a housing case to deploy upward and protects knees of a driver upon inflow of inflation gas. The airbag includes a cover portion for covering a vehicle's rear side of an area proximate to the key cylinder upon completion of deployment, and a general portion in the upper edge side of the airbag except the cover portion. Kinetic energy of the cover portion as deployed in a position of complete deployment is restrained compared with a kinetic energy of the general portion as deployed in a position of complete deployment. This restraint is achieved by reducing amount of inflation gas flowing into the cover portion. The knee-protecting airbag device of the present invention prevents the inflating airbag from contacting with key accessories hung down from an ignition key inserted into the key cylinder in a manner to cause gas leakage.

2 Claims, 47 Drawing Sheets

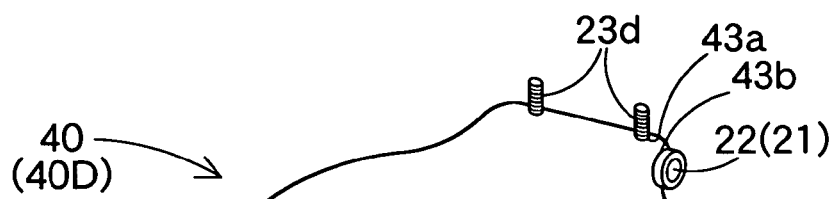
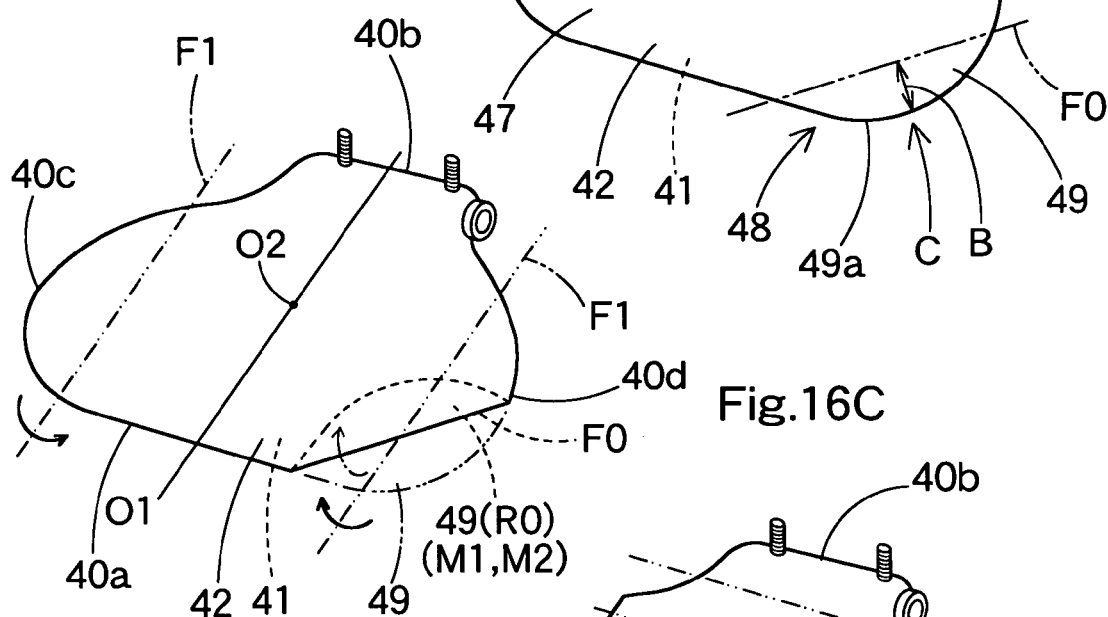
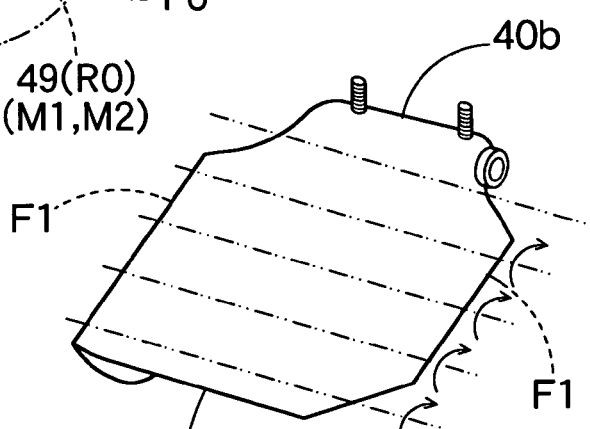
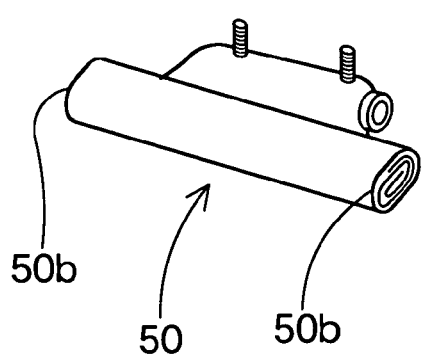
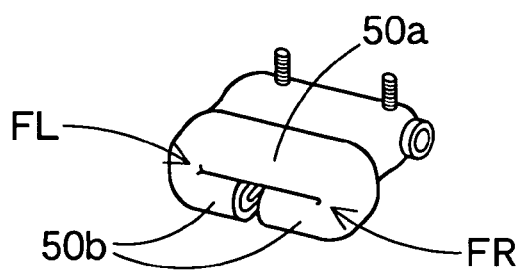

(Housed State)

(Protruded State)

(Housed State)

(Protruded State)

Fig.47A
(Housed Position)
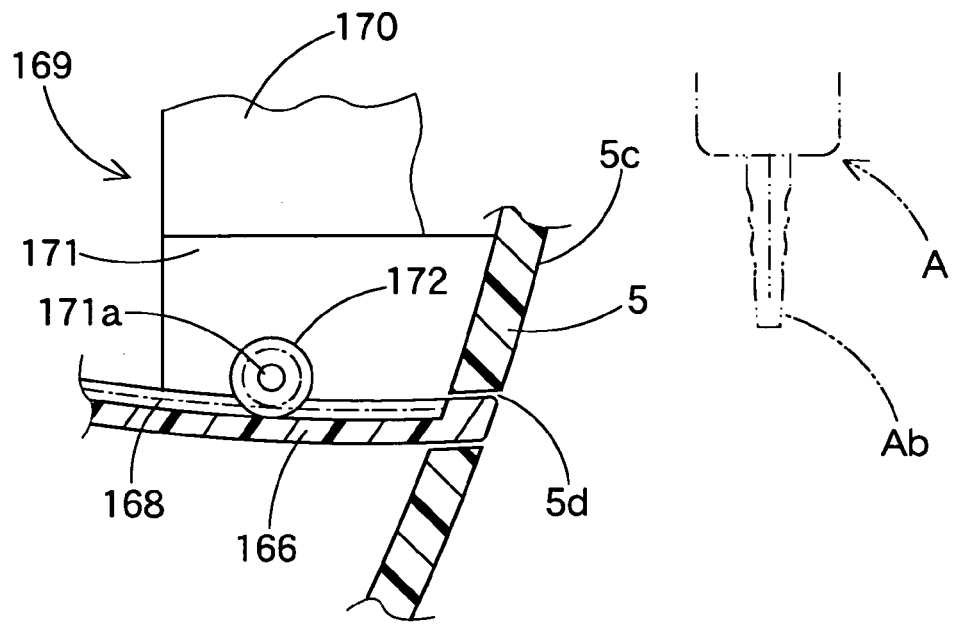
Fig.47B
(Preventing Position)
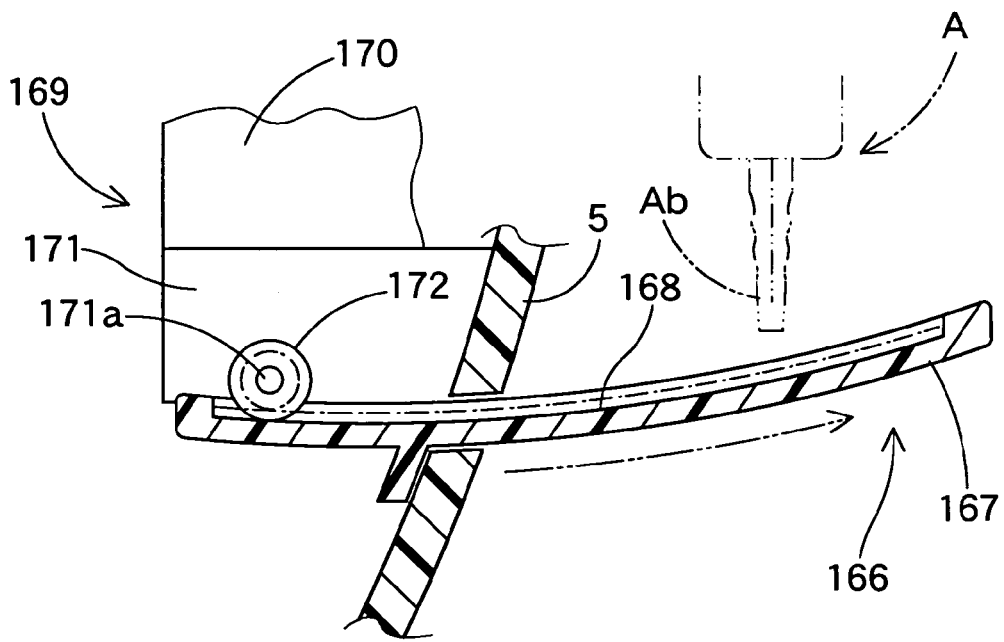

(Housed Position)

(Preventing Position)

KNEE-PROTECTING AIRBAG DEVICE

The present application claims priority from Japanese Patent Applications No. 2002-381485 of Nagata et al., No. 2002-381498 of Nagata et al., No. 2002-381511 of Nagata et al., No. 2002-381532 of Nagata et al., all filed on Dec. 27, 2002, and No. 2003-022569 of Mizuno et al., filed on Jan. 30, 2003, the entirety of each is hereby incorporated into the present application by this reference.

BACKGROUND OF THE INVENTION

1. Field of the Invention

The present invention relates to a knee-protecting airbag device which protects knees of a driver with an airbag expanding and inflating with inflation gas.

2. Description of the Related Art

In a knee-protecting airbag device for protecting knees of a driver in the prior art, a folded airbag is housed in and held by a housing case located in front of the driver. Upon inflow of inflation gas, the airbag rises along a lower surface of steering column, and deploys for protecting the driver's knees. The airbag as completely deployed includes, in the vicinity of left or right corner in its upper edge side, a cover portion for covering vehicle's rear side of an area proximate to key cylinder, as disclosed in WO 02/03231 A1.

However, there are some cases in which accessories such as a sub-key are hung down from a car key inserted into the key cylinder. If an airbag in the knee-protecting airbag device in the prior art deploys, lower ends of the accessories may engage an inflated part of the airbag perpendicularly, and the airbag may be damaged and leak inflation gas.

SUMMARY OF THE INVENTION

It is an object of the present invention to provide a knee-protecting airbag device capable of preventing gas leakage in the event that a deploying airbag contacts with accessories connected with a car key.

A knee-protecting airbag device according to the present invention is located below a steering column in front of a driver and, at a lower side of a key cylinder into which a key with key accessories is inserted. The airbag device includes a housing case, an airbag, and a damage prevention means. The case is located below the steering column. The airbag is folded and housed in the housing case in undeployed condition, and upon inflow of inflation gas, protrudes rearward from the housing case to deploy upward for protecting knees of the driver. The airbag includes a cover portion located in a left or right corner in an upper edge side of the airbag as completely deployed for covering a vehicle's rear side of an area proximate to the key cylinder, and a general portion which is the upper edge side of the airbag completely deployed except the cover portion. The damage prevention means prevents the airbag from being damaged by the key accessories and leaking gas when the inflated airbag contacts with the key accessories directly.

With the damage prevention means, the knee-protecting airbag device of the present invention is able to prevent gas leakage even if an inflated part of the airbag contacts with key accessories connected with the key directly.

The damage prevention means may constitute a restraining means to restrain a kinetic energy of the cover portion of the airbag as deployed in a position of complete deployment, compared with a kinetic energy of the general portion as deployed in a position of complete deployment. In this case, the airbag is housed in the housing case while being equipped with the restraining means.

With this arrangement, in airbag deployment, the kinetic energy of the cover portion of the airbag as deployed in a position of complete deployment is reduced by the restraining means compared with the kinetic energy of the general portion as deployed in a position of complete deployment. Accordingly, the cover portion is less likely to be damaged. In other words, even if the cover portion engages the lower ends of accessories substantially along the axial direction of the accessories, it is less likely to be damaged and cause gas leakage.

It is also prevented that the accessories are scattered from the key upon contacting the cover portion, since the kinetic energy of the cover portion has been decreased.

Here, to reduce the kinetic energy of the cover portion, it is necessary to reduce the mass and moving speed of the cover portion. Considering that kinetic energy is proportionate to square of velocity, especially, it is effective to reduce the moving speed of the cover portion. In other words, provided that the mass of the cover portion itself is not changed, restraint of the kinetic energy of the cover portion equals to restraint of the speed of the cover portion. Reduction of the kinetic energy is easily judged by measuring the moving speed of the cover portion. Of course, the kinetic energy of the cover portion can be reduced by making the cover portion lighter than the general portion in such a degree as not to lessen strength of the cover portion.

Moreover, considering the reduction of moving speed of the airbag from an aspect of occurrences inside the airbag, it is important to reduce flow speed of inflation gas flowing into the cover portion. It is because the reduction of flow speed of inflation gas immediately leads to reducing the moving speed of the cover portion. It will also be appreciated to delay the inflation of the cover portion than the inflation of the general portion. If the cover portion inflates later than the general portion, the cover portion inflates right before the completion of deployment of the airbag. The flow speed of inflation gas has been slow down by this time. To delay the inflation of the cover portion than that of the general portion, there are means of delaying the time when inflation gas flows into the cover portion, delaying the time when the cover portion completes inflation, reducing the amount of inflation gas flowing into the cover portion than into the general portion, or locating the cover portion downstream of inflation gas than the general portion.

That is, the restraining means to restrain the kinetic energy of the cover portion is exemplified by a gas-flow regulating means for regulating the flow of inflation gas flowing into the cover portion and thus reducing the kinetic energy of the cover portion. The gas-flow regulating means can be attained by reducing the flow speed of inflation gas flowing into the cover portion than the flow speed in the general portion, or by delaying the inflation of cover portion than that of the general portion.

When the completely inflated airbag takes a substantially plate shape including a column side wall located toward the steering column and a driver's side wall located toward the driver, and the airbag internally includes a tether joining the column side wall and the driver's side wall for regulating thickness of the airbag as completely inflated, it will be appreciated that the tether constitutes the gas-flow regulating means to slow down the flow speed of inflation gas flowing into the cover portion than the flow speed in the general portion, or to delay the inflation of cover portion than that of the general portion such that the moving speed of the cover portion slows down.

This arrangement can be achieved by adjusting opening areas of inlet ports into the cover portion and the general portion, more specifically, by narrowing the inlet port of the cover portion. With this arrangement, when the airbag deploys, the flow speed of inflation gas flowing into the cover portion is slowed down by the tether, so that the cover portion becomes less likely to be damaged in such a manner to cause gas leakage, even if it engages the lower ends of key accessories.

With this arrangement, gas leakage is easily prevented by merely adjusting the location of the tether for regulating the thickness of the inflated airbag. Therefore, manufacturing of the airbag is not complicated.

When the airbag internally includes a tether for regulating the thickness of the airbag, it may be arranged as follows: The tether is located upstream of inflation gas below the general portion and the cover portion of the completely inflated airbag transversely. The general portion and the cover portion have gas inlet ports, respectively, between left and right ends of the tether and inner surface of the airbag in the transverse direction. In a folding process of the airbag, when at least one of the left and right edge side of the airbag is folded toward center of the airbag on folds along vertical direction, the vertical fold toward the cover portion is formed to cross the tether while the vertical fold toward the general portion is formed away from the tether. In this case, the vertical fold crossing the tether toward the cover portion constitutes the gas-flow regulating means.

With this arrangement, since the airbag is folded on the vertical fold on the end of the tether near the cover portion, the gas inlet port for letting inflation gas flow into the cover portion is closed by the vertical fold and the tether. The gas inlet port does not open until the fold is unfolded. On the other hand, the gas inlet port for the general portion is open to allow inflation gas to flow into the general portion irrespective of unfolding of the vertical fold, since this fold is so made as not to fall on the end of the tether near the general portion. Accordingly, with this arrangement, the time when inflation gas starts to flow into the cover portion is securely delayed than the general portion. Moreover, when the cover portion inflates, the kinetic energy of inflation gas itself is reduced compared with the initial stage of inflation (from different aspect, the flow speed of inflation gas flowing into the cover portion after the fold is eliminated is slowed down than the flow speed of inflation gas flowing toward the general portion, and thus the moving speed of the cover portion is restrained), so that the cover portion is less likely to be damaged and cause gas leakage even if it engages lower ends of the accessories. Besides, this arrangement enables every airbag to complete inflation of the cover portion later than the general portion, so that gas leakage from the cover portion is stably prevented for every airbag. Of course, with this arrangement, too, the gas leakage preventing action is easily obtained by means of the folding process (the vertical folding step) of the airbag applied when housed in the case and adjusting the location of the tether of the airbag for thickness-regulation. Therefore, manufacturing and folding of the airbag are not complicated.

When the airbag internally includes an inflator for supplying inflation gas, it will be appreciated that the inflator constitutes the gas-flow regulating means and discharge more inflation gas toward the general portion than toward the cover portion.

With this arrangement, since the cover portion admits less inflation gas than the general portion, the cover portion completes inflation later than the general portion, so that the cover portion inflates right before the completion of inflation of the airbag. The kinetic energy of inflation gas itself has been reduced by this time compared with the initial stage of inflation. Also in this case, viewed from a different aspect, it can be explained that the flow speed of inflation gas flowing toward the cover portion is made slower than flow speed of inflation gas flowing toward the general portion, and that thus the moving speed of the cover portion is restrained. Consequently, the cover portion is less likely to be damaged and cause gas leakage even if it engages lower ends of the accessories. Moreover, this arrangement can be achieved easily only by adjusting direction and opening area of the gas outlet port of the inflator for emitting inflation gas into the airbag.

It will also be appreciated that the cover portion of the airbag itself constitutes the gas-flow regulating means by being formed, when completely inflated, to have greater thickness than the general portion. With this arrangement, the flow speed of inflation gas flowing toward the cover portion becomes slower than the speed of inflation gas flowing toward the general portion since the cover portion has a greater capacity than the general portion. Accordingly, the kinetic energy of the cover portion is reduced, so that the cover portion is less likely to be damaged and cause gas leakage even if it engages the lower ends of accessories.

Since the cover portion in this case has a great capacity and easily dents upon contacting with the accessories, gas leakage is even less likely to occur.

Furthermore, the restraining means may be constituted by an airbag folding process. In this case, the airbag is folded in the folding process to house the airbag in the housing case such that the cover portion is unfolded later than the general portion when the general portion and the cover portion are unfolded in the course of airbag deployment.

With this arrangement, the cover portion is unfolded right before the completion of inflation of the airbag, which is later than the unfolding of the general portion. This helps slow down the flow speed of inflation gas flowing into the cover portion, compared with the initial stage of inflation. Thus the kinetic energy of the cover portion upon contacting with the lower ends of accessories is decreased. Consequently, the cover portion is prevented from being damaged by accessories. In this case, too, viewed from a different aspect, it can be explained that the fold from the folding constitutes the gas-flow regulating means, since the flow speed of inflation gas flowing into the cover portion after the fold is unfolded is slower than the flow speed of inflation gas flowing toward the general portion, and thus the moving speed of the cover portion is restrained.

Such folding is achieved, for example, by a folding method of airbag that includes a cover-portion folding step applied before the step of folding the general portion, in which a fold is located around the cover portion. This arrangement can be easily executed only by folding the cover portion at the beginning of the folding process of the airbag.

Alternatively, the restraining means may be constituted by a fold-keeping member that keeps the folded state of the cover portion in a releasable manner. This fold-keeping member helps unfold the cover portion later than the general portion when the general portion and the cover portion are unfolded in the course of airbag deployment. In this arrangement, the kinetic energy of the cover portion is consumed and reduced when the fold-keeping member releases the fold-keeping state. Accordingly, since the kinetic energy of the cover portion has been reduced by the time the lower ends of accessories engage the cover portion, the cover portion is prevented from being damaged by accessories.

When the airbag as completely inflated takes a substantially plate shape including a column side wall located toward the steering column and a driver's side wall located toward the driver, it will be appreciated that the folding process of the airbag for housing the airbag in the housing case includes a roll-folding step in which, from flat state in which the column side wall and the driver's side wall are overlaid on each other, the upper edge side of the airbag is roll-folded on the column sidewall toward the lower edge side, and a cover-portion folding step to fold a corner of the cover portion toward the transverse center of the airbag. In this case, the damage prevention means is constituted by a series of processes that the cover-portion folding is performed before the roll-folding step, and then the airbag is housed in the case.

With this arrangement, if the airbag admits inflation gas and protrudes from the housing case, the airbag deploys while unfolding in substantially inverse process to the folding process. Accordingly, the airbag rises while unfolding the roll-folding, and then unfolds the fold of the cover portion.

More specifically, by the time the cover portion is unfolded, the upper edge part of the airbag except the cover portion is deployed up to the highest location. Then the cover portion unfolds in a condition that the fold formed in the cover-portion folding step is located near the key cylinder. That is, the cover portion turns around the fold located near the key cylinder. At this time, if the cover portion is folded on the driver's side wall in the cover-portion folding step, the cover portion turns upward and rearward from the lower side of the fold. If the cover portion is folded on the column side wall in the cover-portion folding step, the cover portion turns upward and rearward from the front side of the fold.

While turning upward and rearward from the lower side of the fold, the cover portion pushes the lower ends of accessories hung down from the key forward of the vehicle. Then the accessories turn forward of the vehicle around the joint portion with the key, and come to extend substantially along outer circumference of the key cylinder. At this time, the cover portion has not admitted so much gas, and thus is thin plate-shaped, and contacts with the lower ends of the accessories from obliquely rear lower direction. Accordingly, the lower ends of the accessories do not contact with the cover portion perpendicularly, so that the cover portion is prevented from being damaged. Even if the cover portion inflates thickly thereafter, the thick cover portion does not contact with the lower ends of the accessories in damageable manner as a matter of course, since the accessories are pressed and substantially extended along the outer circumference of the key cylinder.

If the cover portion turns upward and rearward from the front side of the fold, the cover portion pushes the lower ends of accessories hung down from the key rearward of the vehicle. Then the accessories turn rearward of the vehicle around the joint portion with the key, and makes their lower ends horizontally or upwardly oriented to keep the lower ends away from the airbag. At this time, too, the cover portion has not admitted so much gas, and thus is thin plate-shaped, and engages the lower ends of accessories from obliquely front lower direction. Accordingly, the lower ends of accessories do not contact with the cover portion perpendicularly, so that the cover portion is prevented from being damaged. Even if the cover portion inflates thickly thereafter, the thick cover portion does not contact with the lower ends of accessories in a damageable manner as a matter of course, since the lower ends of accessories are directed horizontally or upward.

Consequently, with the above arrangements, even if the inflating airbag contacts with accessories connected with the key, the airbag does not contact with the accessories in a damageable manner, so that gas leakage is prevented.

Here, in the above arrangements, since the airbag is roll-folded on the column side wall when bringing the upper edge close to the lower edge, when it is unrolled, the airbag is able to develop along the lower surface (or rear surface) of the steering column and deploy between the driver's knees and the steering column lower surface properly even if there is only a narrow space between the knees and the steering column lower surface.

Besides, if the cover portion is folded back on the driver's side wall in the cover-portion folding step, when the cover portion initially contacts with the lower ends of accessories, the cover portion turns the accessories forward of the vehicle, not rearward and closer to the driver. Therefore, even if the accessories come off the key, they are prevented from flying toward the driver.

It will be appreciated that the airbag includes a primary inflatable portion which is inflatable from initial stage of inflow of inflation gas and includes the general portion as its part, and a secondary inflatable portion which starts to inflate around when the primary inflatable portion completes inflation, and that the cover portion is located either in an area of the secondary inflatable portion, or in an area near the secondary inflatable portion, thereby constituting the damage prevention means.

With this arrangement, the cover portion has admitted little gas and thus is thin plate-shaped in the initial stage of deployment. Even if accessories such as a sub-key are hung down from the key inserted into the key cylinder, accordingly, the cover portion does not contact with the lower ends of accessories in a damageable manner, but instead would repel the accessories. Then the cover portion is able to inflate smoothly without leaking gas. Here, if the cover portion contacts with the lower ends of accessories perpendicularly in a thickly inflated condition, not in a thin plate-shaped condition, the cover portion is likely to be damaged by the accessories and leak inflation gas.

In a knee-protecting airbag device thus arranged, the airbag is able to complete inflation of the primary inflatable portion swiftly since the capacity to inflate is reduced by the capacity of the secondary inflatable portion. When the primary inflatable portion is completely inflated, especially, at least the general portion in the upper edge part of the airbag is deployed in the vicinity of a position of the airbag as completed inflation. Accordingly, the entire airbag is able to locate itself in front of the driver's knees before the knees come upfront. The driver's knees are properly protected by the completely inflated primary inflatable portion and the secondary inflatable portion to inflate thereafter. That is, the knee-protecting airbag device of this arrangement is able to thrust the airbag to be deployed in between the driver's knees and a member of vehicle structure easily even if advancing speed of the knees is fast, and thus the driver's knees are properly protected.

Moreover, when the airbag as completely inflated takes a substantially plate shape including a column side wall located toward the steering column and a driver's side wall located toward the driver, the primary inflatable portion and the secondary inflatable portion may be formed by stitching yarn that breakably stitches the column cover side wall and the driver's side wall together.

With this arrangement, the primary inflatable portion and the secondary inflatable portion are formed easily only by stitching up the column side wall and the driver's side wall of the airbag by the breakable stitching yarn, so that the manufacturing of the airbag is facilitated.

It will be desirable that the primary inflatable portion includes a portion extending substantially straightly from the lower end side toward the upper end side of the airbag completely inflated. With this arrangement, inflation gas is able to flow toward the upper end side from the lower end side of the airbag smoothly, so that the upper edge of the airbag is deployed in position quickly.

When the airbag is provided in its upper edge part with a cover portion for covering vehicle's rear side of an area proximate to the key cylinder when completely inflated, the knee-protecting airbag device may include a damage prevention member located in the periphery of the key cylinder for preventing the inflating airbag from contacting with key accessories in a manner to cause gas leakage.

In a knee-protecting airbag device thus arranged, when it is in action, the damage prevention member located in the periphery of the key cylinder prevents the inflating airbag from contacting with key accessories in a manner to cause gas leakage. Therefore, the inflating airbag is not damaged by key accessories, so that the driver's knees are protected properly.

This damage prevention member is exemplified by a member that is located to encircle the lower side of the key cylinder. The damage prevention member includes a receiving plane extended from a leading end plane of the key cylinder for receiving key accessories hung down from the key from lower side, and a guide plane extended downward from the rear end of the receiving plane for guiding the inflating airbag upward.

In a knee-protecting airbag device having the damage prevention member thus arranged, the inflating airbag is guided by the guide plane located below the receiving plane of the damage prevention member and rises, so that the airbag does not contact with the key accessories supported on the receiving plane. Moreover, with this damage prevention means, the key accessories are easy to hand-grip, and actions such as pulling out the key inserted in the key cylinder are not hindered.

The damage prevention member may be configured to protrude from periphery of key accessories below the key accessories. In this case, the lower surface of the damage prevention member functions as a guide surface to guide the inflating airbag upward.

In an airbag device having the damage prevention member thus arranged, the inflating airbag is guided by the guide surface or the lower surface of the damage prevention member and rises, so that the airbag does not contact with the key accessories covered by the damage prevention member. Thus, gas leakage does not occur. Moreover, this damage prevention member can also be used as a coin holder which holds coins with its top surface toward the key accessories.

Alternatively, the damage prevention member may be located at least one of the left or right side of key accessories, so as to protrude rearward than the key accessories. In this case, the lower surface of the damage prevention member functions as a guide surface to guide the inflating airbag upward.

In an airbag device having the damage prevention member thus arranged, the inflating airbag is guided by the guide surface or the lower surface of the damage prevention member protruded rearward than the key accessories and rises, so that the airbag does not contact with the key accessories. Thus, gas leakage does not occur. Moreover, since the damage prevention member leaves the rear side of the key accessories open, it does not hinder actions such as pulling out the key inserted in the key cylinder, and leaves the key accessories free for hand-gripping.

Further alternatively, the damage prevention member may be supported by a moving means movably between a preventing position where the damage prevention member prevents the damage of the airbag and a housed position where the member is housed in the periphery of the key cylinder.

With this arrangement, the damage prevention member is not protruded but housed when the ignition key needs to be operated and so on, so that key operation is not hindered. Moreover, since the damage prevention member is housed except when it is needed, good appearance in the periphery of the key cylinder is maintained.

In this case, it will be appreciated that the moving means is actuated to protrude the damage prevention member up to the preventing position when a parking brake is released after a vehicle engine is started, and is actuated to return the damage prevention member to the housed position when the parking brake is applied. With this arrangement, the releasing and applying operations of the parking brake determine the actions of the damage prevention member, so that the timing of moving in and out of the damage prevention member is clear. Therefore, the moving means properly behaves.

Furthermore, the damage prevention member may be arranged by moving key accessories to prevent the inflating airbag from contacting with the accessories. In this case, it is sufficient to change the direction of at least lower ends of key accessories. Therefore, an acting portion can be as compact as possible.

In this case, the damage prevention member may be constituted by a moving piece that touches a part of key accessories and moves their lower ends, or by a magnet that absorbs the key accessories to the vicinity of the key cylinder. If the damage prevention member is composed of a magnet, a driving mechanism is not required, which helps the damage prevention member to be more compact. Moreover, good appearance in the vicinity of the key cylinder is secured since the magnet does not have to be exposed on the surface.

BRIEF DESCRIPTION OF DRAWINGS

FIGS. 16A to 16E illustrate yet another folding process of the airbag of FIG. 6;

FIGS. 47A and 47B is a schematic vertical section taken along the transverse direction illustrating a movement of a damage prevention member used in the knee-protecting airbag device of FIGS. 45A and 45B;

DESCRIPTION OF THE PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
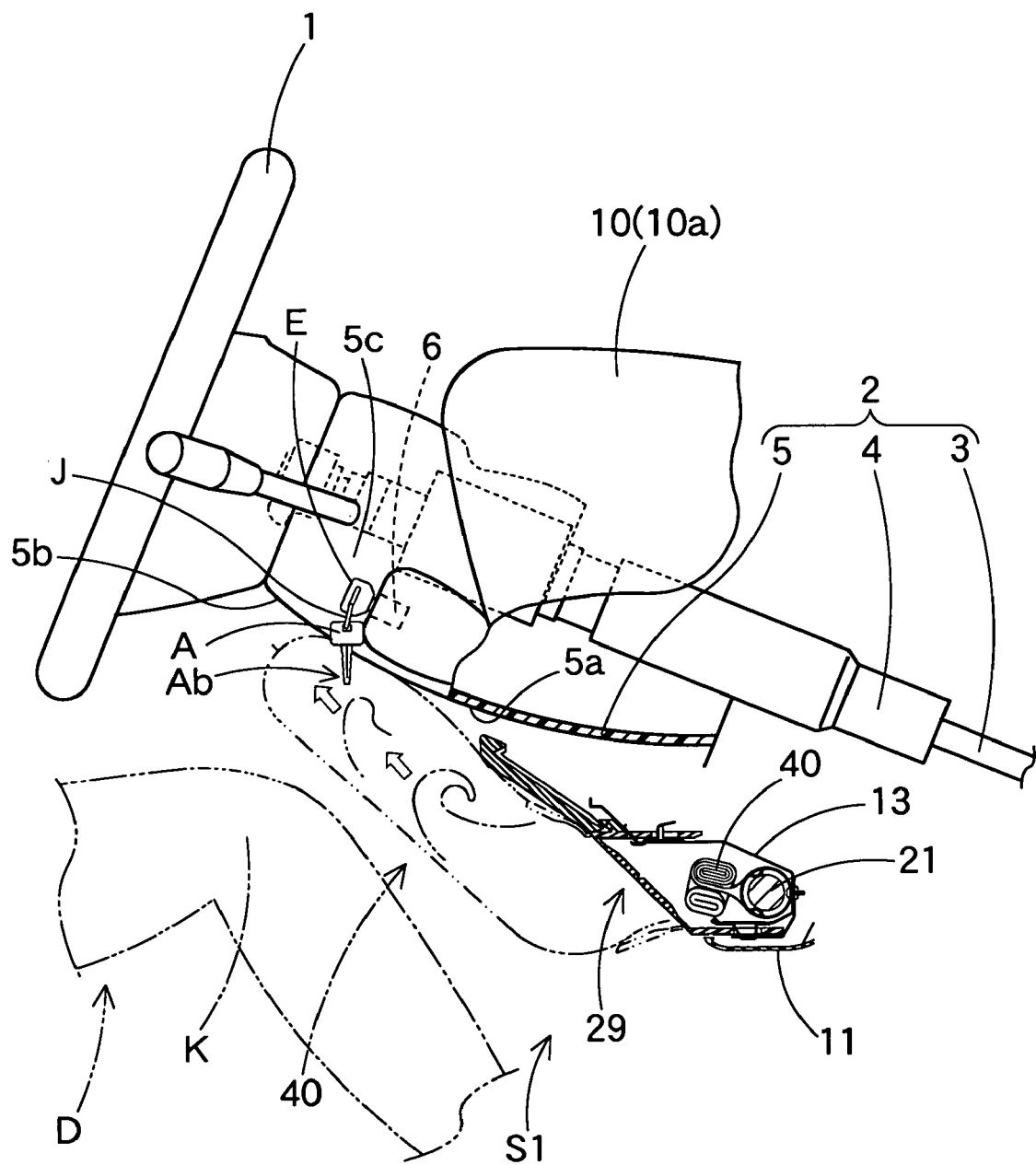
FIG. 1 is a schematic vertical section of a first embodiment of the knee-protecting airbag device according to the present invention in action, taken along the longitudinal direction of the vehicle.

As shown in FIGS. 1 and 9, a first embodiment S1 of the knee-protecting airbag device of the present invention is located below steering column 2 in front of a driver D for protecting knees K of the driver D.

Here, up-down, front-rear, and left-right in this specification are based on a state in which the knee-protecting airbag device is mounted on the vehicle, and therefore, correspond to up-down, left-right, and front-rear of the vehicle with the knee protection airbag device mounted thereon.

Referring to FIG. 1, the steering column 2 includes a main shaft 3 connected to a steering wheel 1, a column tube 4 covering the main shaft 3, and a column cover 5 for covering those members.

The column cover 5 is formed of synthetic resin into a substantially square cylindrical shape, and is so arranged along the axial direction of the main shaft 3 as to cover the main shaft 3 and the column tube 4 located below the steering wheel 1. More specifically, the column cover 5 is located to ascend obliquely backward from an instrument panel (as will be called "dashboard" herein below) 10. In a right side face 5c of the column cover 5 is located a key cylinder 6 to insert an ignition key E for starting engine thereinto. In the first knee-protecting airbag device S1, the ignition key E inserted in the key cylinder 6 has an accessory A such as a sub-key (as will be called "key accessory") hung down therefrom by means of a connecting means J such as a connecting ring.

The knee protection airbag device S1 includes a folded airbag 40, an inflator 21 for supplying the airbag 40 with inflation gas, a housing case 13 opened rearward for housing the folded airbag 40 and the inflator 21, and an airbag cover 29 for covering vehicle's rearward of the case 13.

The housing case 13 is made of sheet metal. Referring to FIGS. 1 to 5, the case 13 is located below the steering column 2, and includes a substantially square cylindrical circumferential wall portion 14, a bottom wall 17 for closing vehicle's front side of the circumferential wall portion 14, and a substantially rectangular opening 13a located at the vehicle's rear side. The circumferential wall portion 14 of the case 13 is provided, on outer surfaces of walls 14a and 14b confronting each other in the vertical direction, with a plurality of retainers 15 (15U and 15D) for attaching side walls 31 and 32 of the airbag cover 29 to the case 13.

Each of the retainers 15U formed on the outer surface of the upper wall 14a is formed into a hook shape and adapted to be inserted in a retaining hole 31a in the upper side wall 31 of the airbag cover 29. The retainers 15U are disposed in plurality along the vehicle's transverse direction, correspondingly to the retaining holes 31a in the upper side wall 31. Each of the retainers 15D is formed into a projection shape and is adapted to be inserted in a retaining hole 32a in the lower side wall 32 of the airbag cover 29. The retainers 15D are also disposed in plurality along the vehicle's transverse direction correspondingly to the retaining holes 32a in the lower side wall 32. In each of the retaining projections 15D is inserted a locking member 16 for preventing the projections 15D from coming off from the retaining hole 32a after being inserted in the retaining hole 32a. The locking member 16 is attached to the case 13 while having its bars 16a inserted respectively in between the outer surface of the lower side wall 32 and inner circumference of each of the retaining projections 15D.

Figure 3:
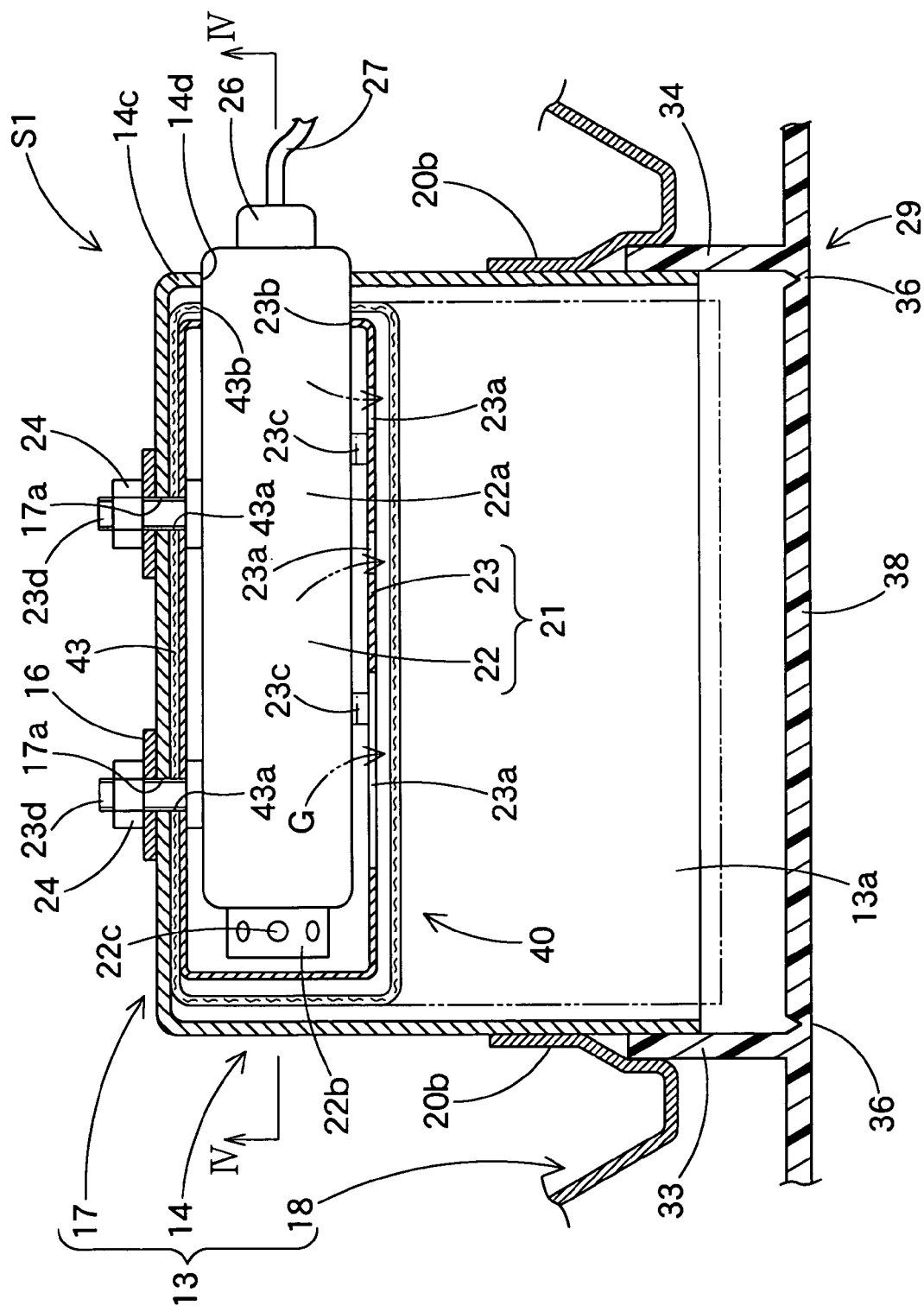
FIG. 3 is a schematic enlarged horizontal section of the knee-protecting airbag device of FIG. 1 taken along the longitudinal direction of the vehicle, and corresponds to line III—III in FIG. 2.
Figure 4:
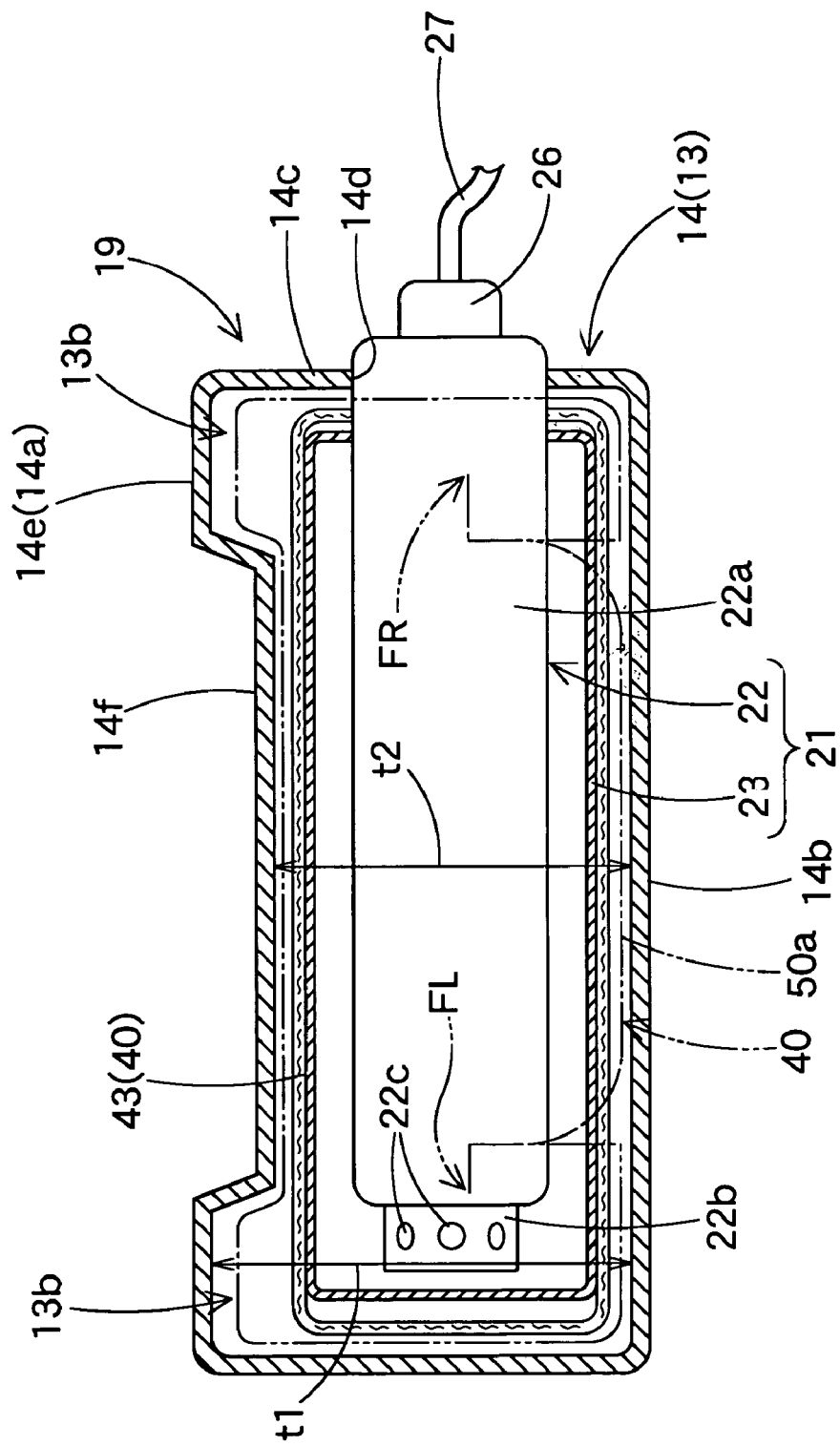
FIG. 4 is a schematic vertical section taken along line IV—IV in FIG. 3.
Figure 5:
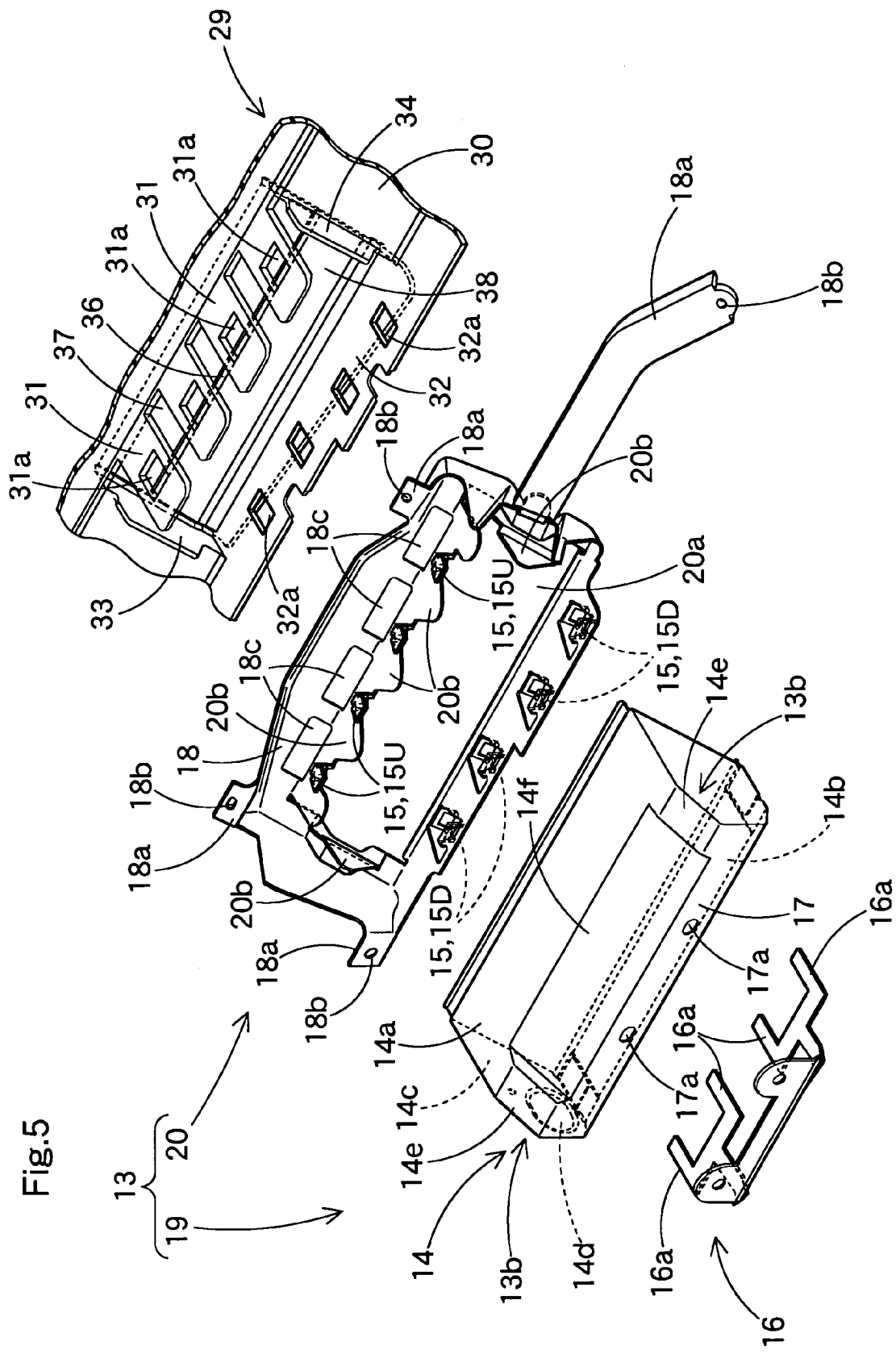
FIG. 5 is a schematic exploded perspective view of a case and an airbag cover used in the knee-protecting airbag device of FIG. 1.

Referring to FIGS. 3 to 5, the circumferential wall portion 14 is further provided on its right side wall 14c with an insert hole 14d for inserting the end of the inflator body 21 thereinto. The bottom wall 17 is provided with two insert holes 17a for inserting individual bolts 23d of the inflator 21 thereinto.

The case 13 further includes a flange 18 extended outwardly from the circumferential wall portion 14 to encircle the opening 13a. The case 13 is secured to vehicle body by means of a plurality of mounting portions 18a formed in the flange 18. Each of the mounting portions 18a is provided with a mounting hole 18b for inserting a not-shown bolt. The flange 18 further includes apertures 18c for inserting the upper side wall 31 of the airbag cover 29 thereinto.

Here in the first knee-protecting airbag device S1, the case 13 is formed of two members of a box member 19 constituting the circumferential wall portion 14 and a panel member 20 constituting the flange 18, as shown in FIG. 5. Each of the box member 19 and the panel member 20 is made of a pressed sheet metal. The panel member 20 includes a rectangular hole 20a in the vicinity of its center. The case 13 is formed by welding a fixing portion 20b located in the periphery of the hole 20a of the panel member 20 to the outer surface of the circumferential wall portion 14 of the box member 19. The retainers 15U and 15D are formed in the periphery of the hole 20a in the panel member 20.

In the case 13 of the first knee-protecting airbag device S1, axial direction of the circumferential wall portion 14 is located in substantially horizontally, and plane of the opening 13a is located obliquely such that its lower side may be disposed frontward of the vehicle. More specifically, longitudinal dimension of the upper wall 14a is set greater than that of the lower wall 14b, so that the upper wall 14a protrudes rearward of the vehicle than the lower side wall 14b. As referred to FIGS. 2 and 5, the upper wall 14a includes, in its front end part, a slope portion 14e locating the front end downward. As referred to FIGS. 2, 4 and 5, moreover, a recess 14f recessed downward is formed in transverse center of the slope portion 14e. In the foregoing embodiment, left and right sections of the recess 14f in the box member 19 constitute housing spaces 13b for housing later-described folded portion 50 of the airbag 40 near folds FL and FR shown in FIG. 8.

Figure 2:
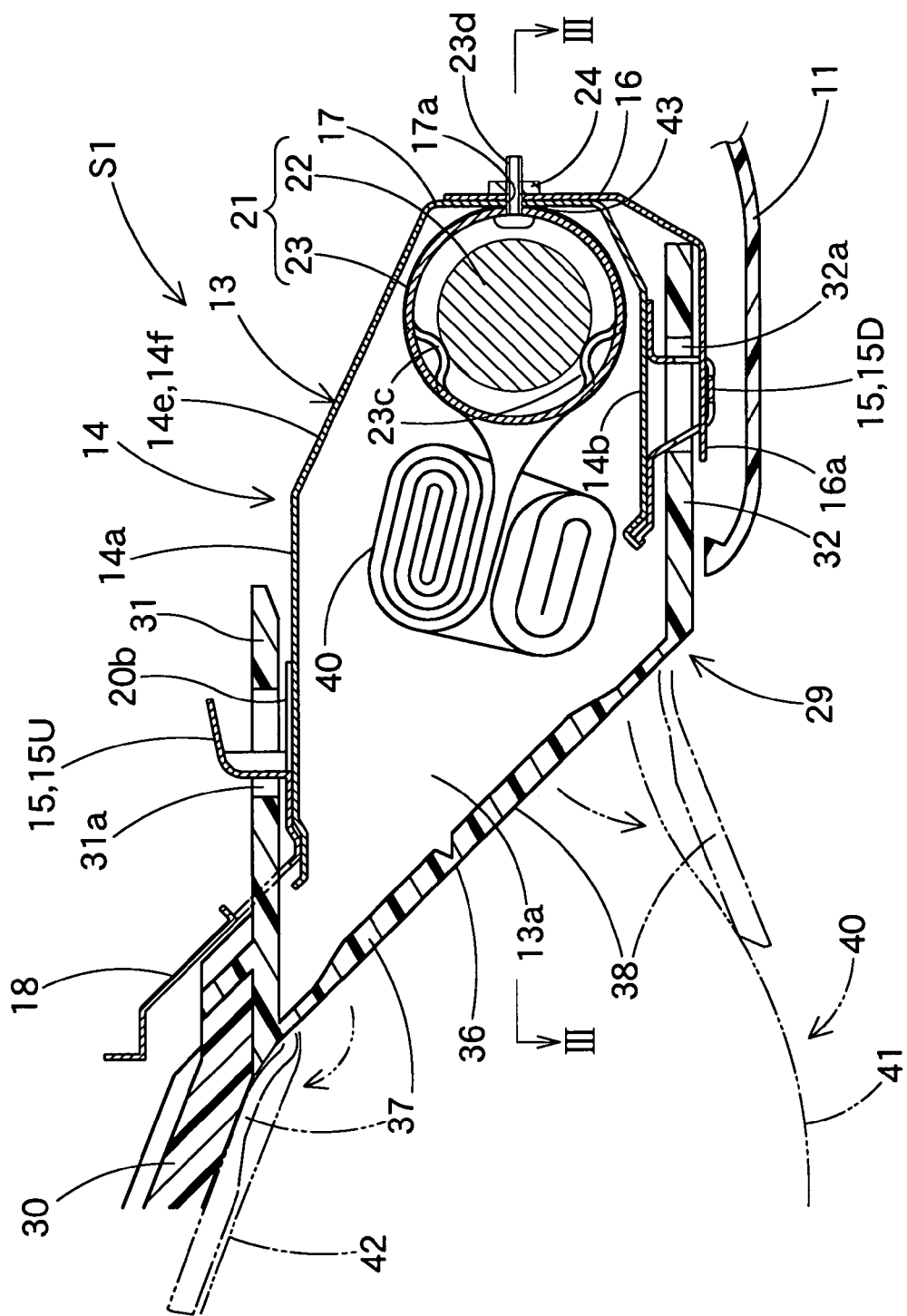
FIG. 2 is a schematic enlarged vertical section of the knee-protecting airbag device of FIG. 1, taken along the longitudinal direction of the vehicle.

Referring to FIGS. 2 to 4, the inflator 21 is of a cylinder type locating its axial direction along the vehicle's transverse direction, and includes a substantially cylindrical body 22 and a diffuser 23. As referred to FIGS. 6 and 7, the inflator 21 is located in the vicinity of transverse center within the airbag 40 and toward lower edge 40b apart from later-described cover portion 48. The body 22 includes a substantially cylindrical general portion 22a and a small diameter portion 22b protruded from an end face of the general portion 22a. The small diameter portion 22b includes on its outer circumference with a plurality of gas discharge ports 22c. The other end face of the general portion 22a apart from the small diameter portion 22b is connected with a connector 26 for inputting actuating signals via lead wire 27.

The diffuser 23 has substantially cylindrical shape for covering the inflator body 22, and is closed at one end in its length direction and opened at the other end as an insert hole 23b. The diffuser 23 is provided on its rear side face as mounted on the vehicle with a plurality of gas outlet ports 23a for emitting inflation gas G. The diffuser 23 further includes a plurality (two, in the foregoing embodiment) of bolts 23d protruded forward of the vehicle, and a plurality of clamping portions 23c for holding the body 22. To attach the inflator body 22 to the diffuser 23, the body 22 is inserted into the diffuser 23 through the insert hole 23b, from the small diameter portion 22b. Then each of the clamping portions 23c is pressed onto outer circumference of the general portion 22a. Thus the body 22 is secured to the diffuser 23. If each of the bolts 23d is inserted into through hole 17a of the bottom wall 17 of the case 13, and then nut 24 is fastened with the bolt 23d, the inflator 21 is secured to the case 13.

Here, opening area of each of the gas outlet ports 23a is so predetermined that the gas G from the gas discharge ports 22c may uniformly flows rearward of the vehicle in entire area along the transverse direction within the case 13.

The inflator 21 is actuated by an actuating signal inputted through the lead wire 27 when airbag actuating circuit mounted on the vehicle detects frontal collision of the vehicle. At this time, not-shown airbag device mounted on steering wheel 1 is actuated simultaneously.

The airbag cover 29 is adapted to cover the vehicle's rear side of the vicinities of the opening 13a of the case 13 and the flange 18, and is joined with and supported by the case 13. As referred to FIGS. 1 and 9, the airbag cover 29 is arranged toward a lower panel 10b of the dashboard 10 around the column cover 5 to cover the lower periphery of the column cover 5 protruded from the dashboard 10. The dashboard 10 is composed of an upper panel 10a and the lower panel 10b.

Referring to FIGS. 2 to 5, the airbag cover 29 includes two doors 37 and 38 covering the opening 13a of the case 13 at the vehicle's rear side, and a general portion 30 located around the doors 37 and 38 and to be enclosed by the lower panel 10b as mounted on the vehicle. The airbag cover 29 is a two-color part whose portion including the doors 37 and 38 and the side walls 31, 32, 33 and 34 is made from thermoplastic elastomer of polyolefin or the like, while the general portion 30 around those members is made from synthetic resin such as polypropylene.

The doors 37 and 38 are respectively formed in a substantially rectangular plate shape, and are provided therearound with a thinned breakable portion 36 having an H shape. The breakable portion 36 is so made by forming continuous or intermittent grooves in the vehicle's front side face of the airbag cover 29 as to be easily broken when the doors 37 and 38 are pushed by the inflating airbag 40. When the breakable portion 36 is pushed and breaks by the airbag 40, the door 37 opens upward around its upper end near the upper side wall 31, and the door 38 opens downward around its lower end near the lower side wall 32.

From the periphery of the doors 37 and 38 are protruded forward of the vehicle four kinds of side walls 31, 32, 33 and 34 to neighbor the circumferential wall portion 14 outward of the circumferential wall portion 14 of the case 13. The upper side wall 31 located above the case circumferential wall portion 14 and the lower side wall 32 located below the circumferential wall portion 14 help join the airbag cover 29 to the case 13. As described above, the walls 31 and 32 are provided with retaining holes 31a and 32a, respectively, in which the individual retainers 15 (15U and 15D) formed in the circumferential wall portion 14 are inserted and held. The upper side wall 31 is divided into four pieces and each of the pieces 31 is provided with the retaining hole 31a.

The airbag 40 is formed of flexible woven fabric of polyester, polyamide or the like, and takes a substantially rectangular plate shape as expanded and inflated completely, as shown in FIGS. 1, 6, 7 and 9. The airbag 40 is transversely wide enough to protect both knees K of the driver D. The airbag 40 is configured to locate its driver's side wall 41 toward the driver D, and locate its column side wall 42 toward the column cover 5 as completely deployed. The walls 41 and 42 have substantially the same shapes. The airbag 40 is made of a single woven cloth in which the walls 41 and 42 are connected at lower end 40b. The cloth is folded in two at the lower end 40b, and is sewn up at periphery to form the airbag 40. As shown in FIGS. 3 and 8, the airbag 40 is provided in a portion 43 in the column side wall 42 near transverse center of the lower edge 40b with two insert holes 43a and an insert hole 43b. The insert holes 43a are for inserting the individual bolts 23d of the inflator 21 therethrough, and the insert hole 43b is for inserting the body 22 of the inflator 21 therethrough. The airbag 40 is attached to the case 13 with the body 22 of the inflator 21 protruded from the insert hole 43b, and with the peripheries of the individual insert holes 43a clamped by the diffuser 23 and the bottom wall 17 of the case 13. In other words, the airbag 40 is secured to the bottom wall 17 of the case 13 by the insert holes 43a peripheries functioning as a mounting portion 43.

Figure 9A:
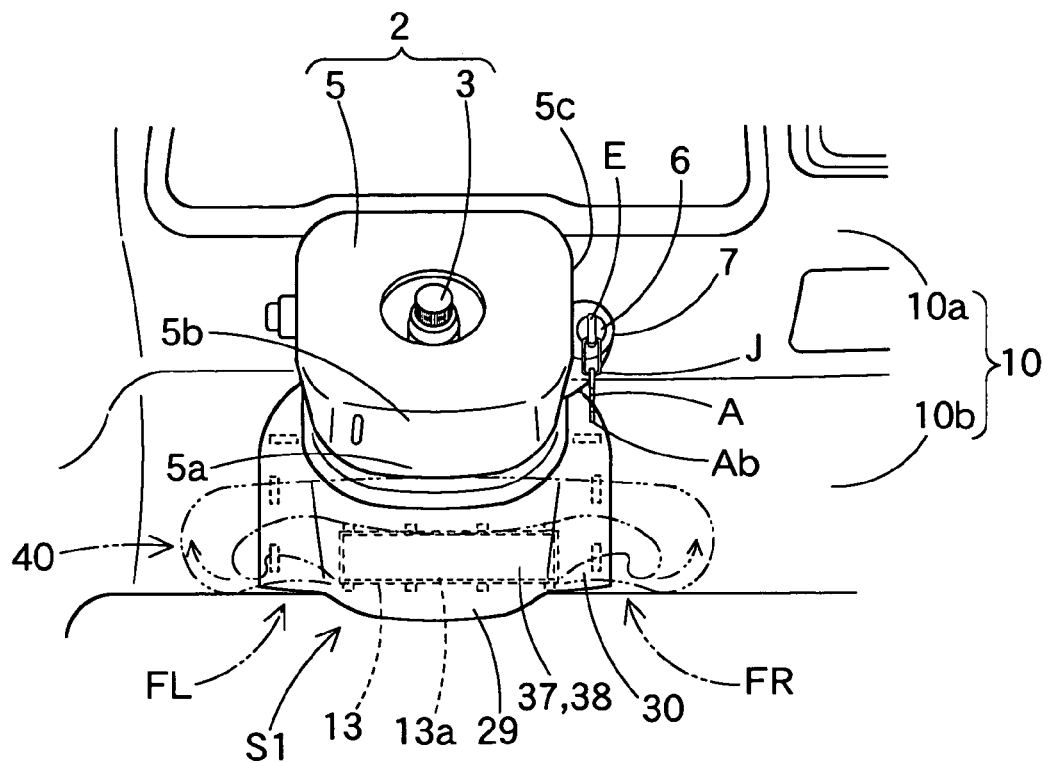
FIGS. 9A and 9B is a front view showing the actuated knee-protecting airbag device of FIG. 1 in order.
Figure 9B:
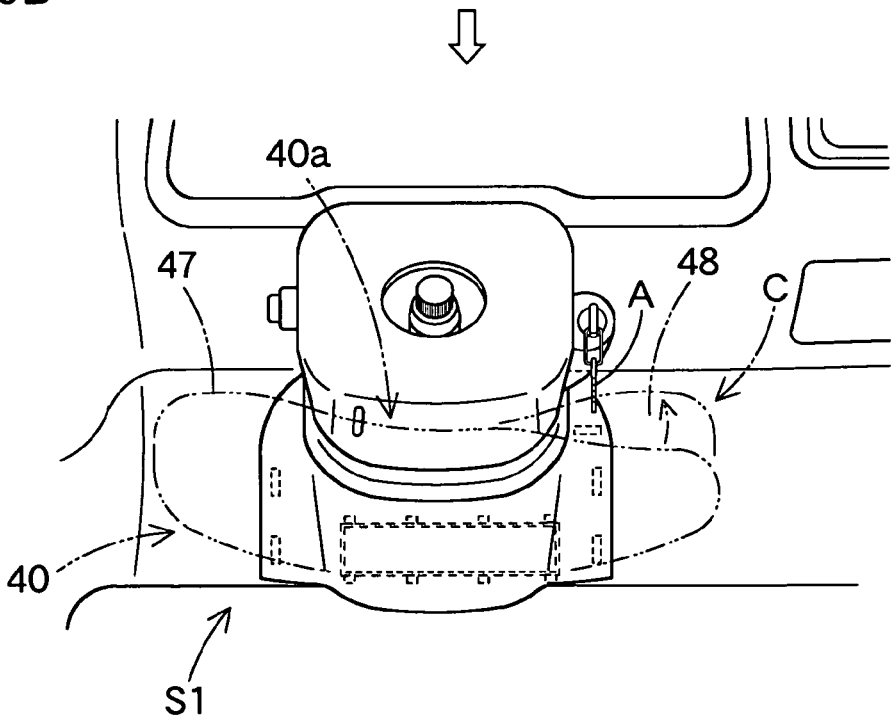

In this airbag 40 mounted on the vehicle and completely deployed, as referred to FIGS. 1 and 9B, the vicinity of right corner C in the upper edge 40a side functions as a cover portion 48 for covering the vehicle's rearward of the key cylinder 6. This cover portion 48 is adapted to admit inflation gas G and inflate upon airbag deployment, and is configured to also cover an area of an accessory A hung from a key E inserted into the key cylinder 6 from the vehicle's rear side. A portion in the upper edge 40a side of the airbag 40 except the cover portion 48 will be called a general portion 47.

Figure 6:
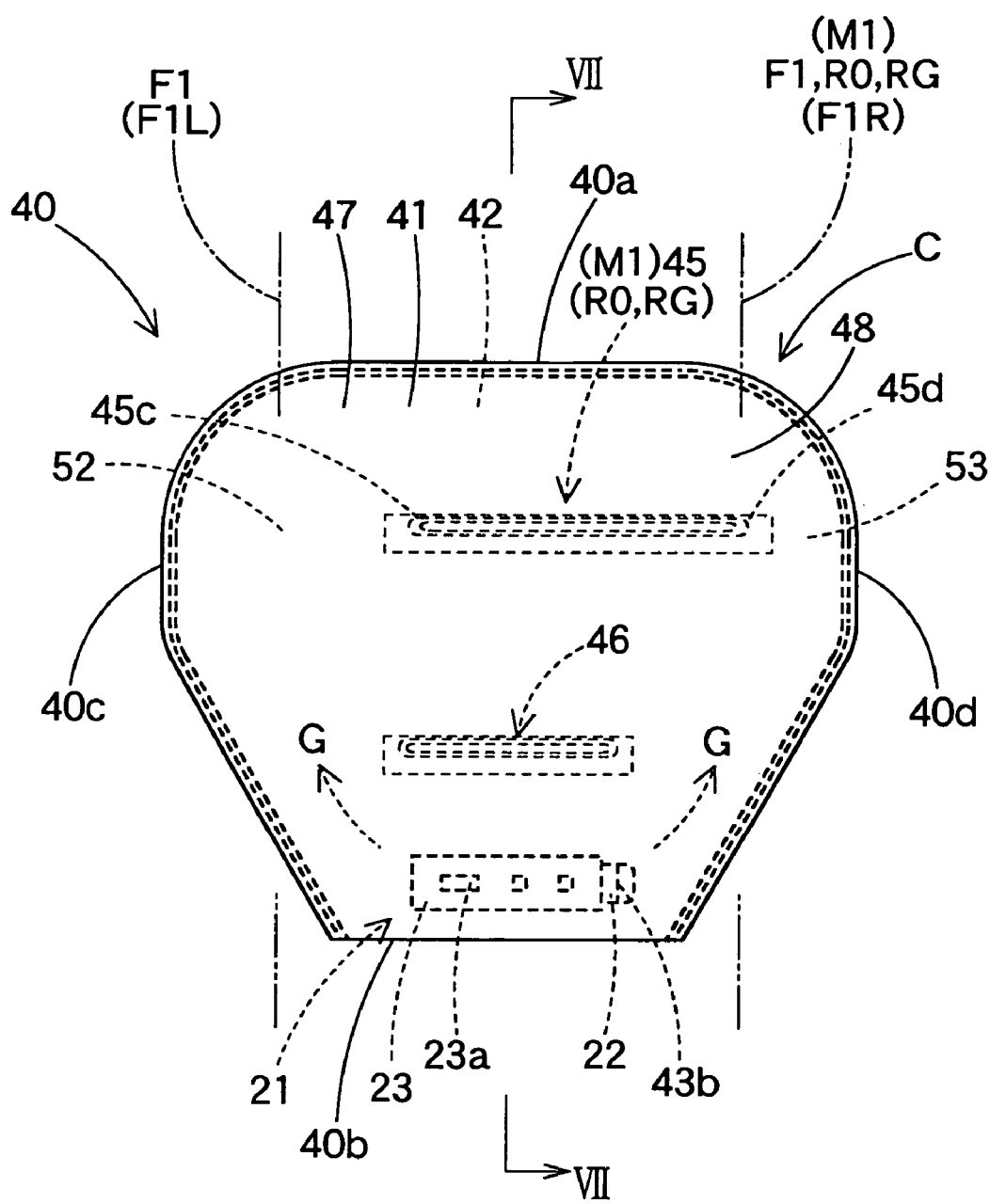
FIG. 6 is a schematic front view of an airbag used in the knee-protecting airbag device of FIG. 1, as developed and has an inflator located inside thereof.
Figure 7:
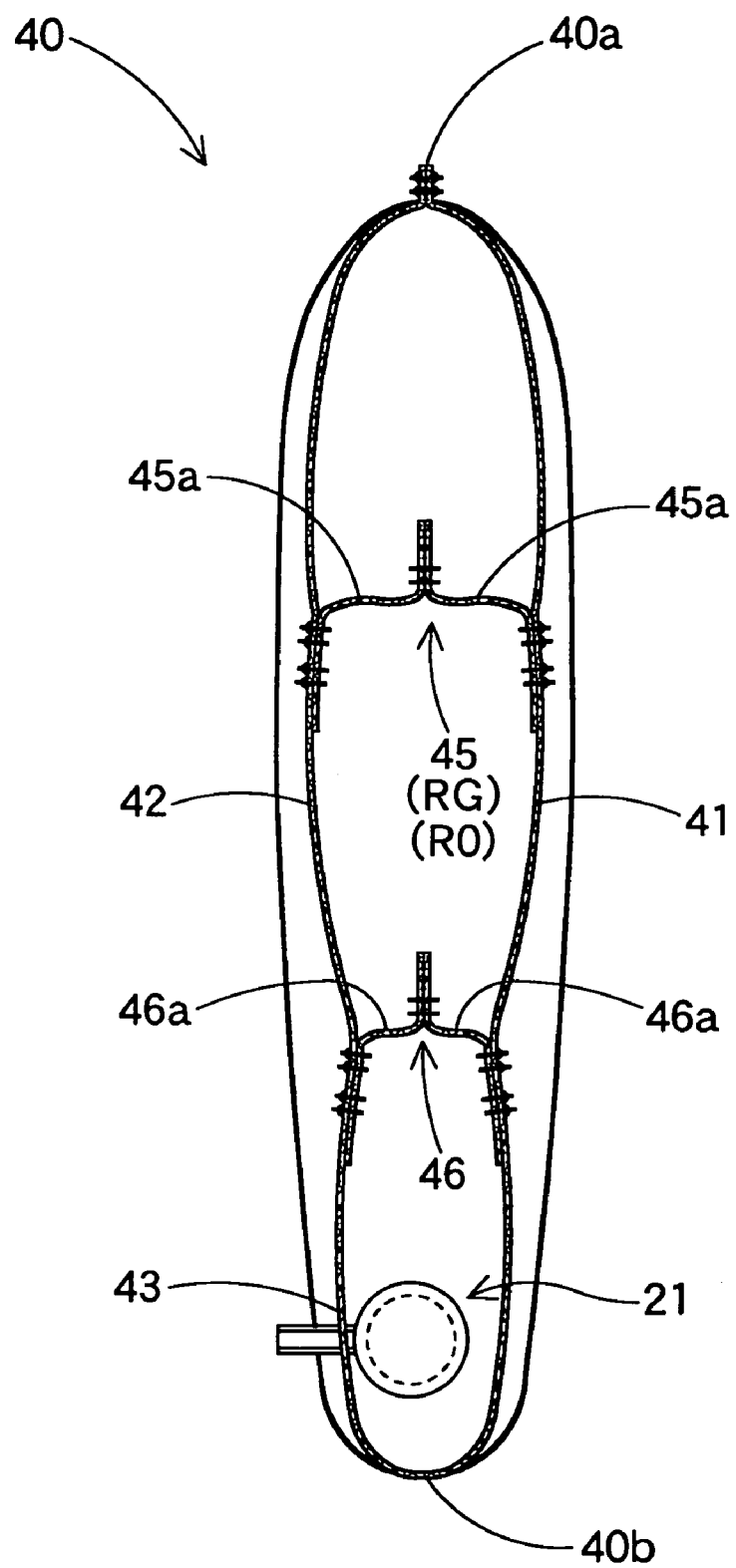
FIG. 7 is a schematic section taken along line VII—VII in FIG. 6.

The airbag 40 is internally provided with two tethers 45 and 46 arranged up and down along the transverse direction. Each of the tethers 45 and 46 is adapted to join the walls 41 and 42 and regulate thickness of the inflated airbag 40, and thus keep the airbag 40 in substantially plate-like shape. The tethers 45 and 46 help the airbag 40 to deploy smoothly in between the knees K and the column cover 5, even when a space between the knees K and the column cover 5 is narrow. Here, each of the tethers 45 and 46 is located upstream of inflation gas G than the general portion 47 and the cover portion 48, or below the general portion 47 and the cover portion 48, as best shown in FIG. 6. In the foregoing embodiment, each of the tethers 45 and 46 is made of two pieces of cloth member 45a and 46a joined to each other and each piece is connected to either one of the walls 41 and 42. However, it will also be appreciated to form the tether by joining the walls 41 and 42 partially since it is sufficient that the tether regulates the entire thickness of the airbag 40.

In the first knee-protecting airbag device S1, the tether 45 constitutes a damage prevention means M1 to prevent the airbag 40 from being damaged upon deployment of the airbag 40. The tether 45 also constitutes a gas-flow regulating means RG as a restraining means R0 to reduce kinetic energy of the cover portion 48 right before the cover portion 48 is deployed in a position of complete deployment. In the foregoing embodiment, regarding clearances 52 and 53 formed between an inner surface at left and right edges 40c and 40d of the airbag 40 and left and right ends 45c and 45d of the tether 45, the right clearance 53 toward the cover portion 48 is set smaller than the left clearance 52. These clearances 52 and 53 act as gas inlet ports 52 and 53 for inflation gas G from the inflator 21 to flow into the general portion 47 and the cover portion 48 therefrom. Since the right end 45d of the tether 45 is located close to the right edge 40d of the airbag 40, the gas inlet port 53 communicated with the cover portion 48 has a smaller opening area than the gas inlet port 52 communicated with the general portion 47.

To erect the airbag device S1, the inflator 21 preliminarily assembled is firstly put in the airbag 40 such that the bolts 23d are protruded from the individual insert holes 43a, and the end of the inflator body 22 is protruded from the insert hole 43b. Then the airbag 40 is so folded as to be housed within the case 13.

Folding process of the airbag 40 consists of a transverse folding step in which the upper edge 40a is brought close to the lower edge 40b on folds along the transverse direction, and a vertical folding step to adjust transverse width of the airbag 40 to fit the width of the case 13 on folds along vertical direction (or front-rear direction).

Figure 8A:
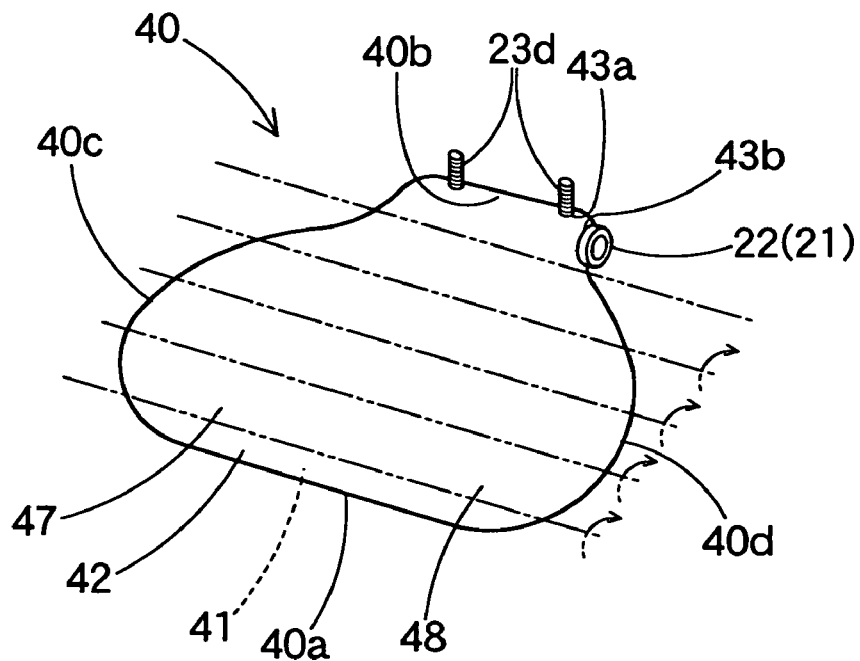
FIGS. 8A to 8C illustrate a folding process of the airbag of FIG. 6.
Figure 8B:
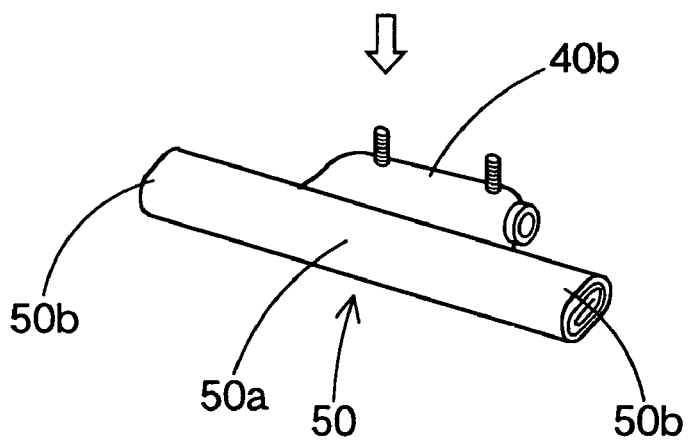

The transverse folding step is firstly applied to the first airbag device S1. Referring to FIGS. 8A and 8B, more specifically, the upper edge 40a side of the airbag 40 is roll-folded on the column side wall 42 toward the lower edge 40b, from flat expanded state in which the column side wall 42 and the driver's side wall 41 are overlaid on each other.

Figure 8C:
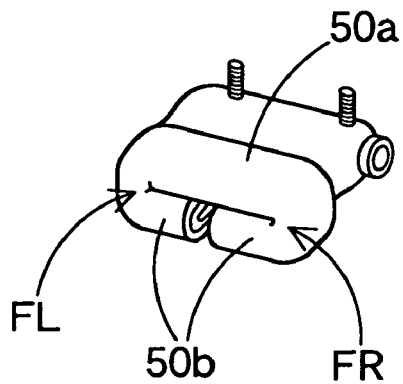

As referred to FIGS. 8B and 8C, then, the vertical folding step is applied. The left and right ends 50b of the roll-folded portion 50 is folded back to be located below a center 50a of the folded portion 50 on vertical folds FL and FR, so that the airbag 40 is folded to have the transverse width to fit in the case 13, and thus the folding of the airbag 40 is completed.

Thereafter, the airbag 40 is wrapped around by a not-shown breakable wrapping film for keeping the folded-up shape. At this time, the bolts 23d of the inflator 21 and the end of the inflator body 22 protruded from the insert holes 43a and 43b are taken out from the wrapping film. Here, other than resin sheet material, cloth member such as a woven fabric forming the airbag 40, tape member, or string member may be employed as the wrapping film.

Thereafter, the inflator 21 together with the folded airbag 40 is housed in the case 13 so that the individual bolts 23d of the inflator 21 are protruded from the through holes 17a while the end of the inflator body 22 is protruded from the insert hole 14d. Then if not-shown spring nuts are fastened with the individual bolts 23d, the inflator 21 and the airbag 40 are housed in and attached to the case 13.

Subsequently, the airbag cover 29 is attached to the case 13. More specifically, the individual side walls 31, 32, 33 and 34 of the airbag cover 29 are located around the case circumferential wall portion 14 toward the opening 13a. At this time, the individual retaining hooks 15U are so inserted into the retaining holes 31a in the upper side wall 31 as to be retained thereat, and the individual retaining projections 15D are inserted into the corresponding retaining holes 32a in the lower side wall 32 so as to be projected on the outer surface of the lower side wall 32. Then the bars 16a of the locking member 16 are inserted between the outer surface of the lower side wall 32 and the inner circumference of the individual projections 15D, the individual bolts 23d are put through the locking member 16, and the nuts 24 are fastened with the bolts 23d. Thus the airbag cover 29 is joined to and held by the case 13, and the airbag device (or airbag module) S1 is formed.

Then the airbag device S1 is mounted on the vehicle by connecting the connector 26 having the lead wire 27 joined thereto to the body 22 of the inflator 21, fixing the individual mounting portions 18a formed in the flange 18 of the case 13 to a member of vehicle structure, and connecting the lead wire 27 to the airbag actuating circuit.

Here, the upper panel 10a and the lower panel 10b have been attached to the vehicle by this time. An under cover 11 is attached after the airbag device S1 is mounted on the vehicle.

After the airbag device S1 is mounted on the vehicle, if a predetermined actuating signal is inputted to the inflator body 22 via the lead wire 27, inflation gas G is discharged from the gas discharge ports 22c of the inflator 21. The gas G then flows into the airbag 40 via the gas outlet ports 23a of the diffuser 23, as shown in FIGS. 3 and 6. The airbag 40 inflates and breaks the not-shown wrapping film, pushes the doors 37 and 38 of the airbag cover 29, and breaks the breakable portion 36 to open the doors 37 and 38. Then as indicated by double-dotted lines in FIG. 1, the airbag 40 protrudes rearward from the opening 13a of the case 13, and further expands and inflates upward along the column cover lower surface 5a.

In the knee protection airbag device S1, when the airbag 40 protrudes from the case 13 by means of inflation gas G, the airbag 40 expands and inflates in a substantially inverse process to the folding process. More specifically, the airbag 40 firstly protrudes from the case 13 while eliminating the vertical folding, and then rises along the lower (rear) surface 5a of the column cover 5 while unrolling until locating its upper edge 40a in the vicinity of upper end 5b of the column cover 5.

In the airbag 40 having the tether 45, the gas inlet port 53 communicated with the cover portion 48 has a smaller opening area than the gas inlet port 52 communicated with the general portion 47, so that less inflation gas G flows into the cover portion 48 than into the general portion 47. As shown in FIGS. 9A and 9B, accordingly, the cover portion 48 completes inflation later than the general portion 47. In other words, it is not until the time right before the completion of inflation of the airbag 40 that the cover portion 48 inflates. By this time, kinetic energy of inflation gas G itself has decreased than in initial stage of inflation, so that the cover portion 48 is less likely to be damaged and cause gas leakage even if it engages lower end Ab of the accessory A.

Viewed from a different aspect, this is also explained as follows: Since the tether 45 helps narrow the gas inlet port 53 communicated with the cover portion 48 than another gas inlet port 52 communicated with the general portion 47, flow speed of inflation gas G flowing into the cover portion 48 is made slower than gas G flowing into the general portion 47. This directly helps decelerate moving speed of the cover portion 48 than moving speed of the general portion 47, so that the cover portion 48 is less likely to be damaged and cause gas leakage even if it engages the lower end Ab of the accessory A.

In the first knee-protecting airbag device S1, therefore, gas leakage is prevented even if the inflating airbag 40 engages the accessory A connected with the key E.

It is also prevented that the accessory A is scattered from the key E upon contacting the cover portion 48, since kinetic energy of the cover portion 48 has been decreased.

The foregoing embodiment has shown a case of forming the gas inlet port 53 rightward of the tether 45 to communicate the cover portion 48 and the lower side. However, it will also be appreciated that the right end 45d of the tether 45 is extended to reach the right edge 40d of the airbag 40, for example, so as not to form the gas inlet port 53, such that the cover portion 48 is located downstream of inflation gas G than the general portion 47. Since the inflation of the cover portion 48 is delayed than the general portion 47 with this arrangement, too, the kinetic energy of inflation gas G is decreased when the cover portion 48 inflates compared with the initial stage of inflation. Accordingly, the cover portion 48 is less likely to be damaged and cause gas leakage even if it engages the lower end Ab of the accessory A.

Moreover, in the first knee-protecting device S1, gas leakage is easily prevented by merely adjusting the location of the tether 45 for regulating the thickness of the inflated airbag 40. Therefore, manufacturing of the airbag 40 is not complicated.

In the first knee-protecting airbag device S1, moreover, the airbag 40 is roll-folded on the column side wall 42 in the transverse folding step to bring the upper edge 40a closer to the lower edge 40b. When unfolded, therefore, the airbag 40 expands along the lower surface 5a of the column cover 5, and thus, is able to deploy properly between the knees K of the driver D and the column cover lower surface 5a even if the space between the driver D and the column cover lower surface 5a is narrow.

The case 13 in the first airbag device S1 is provided in the transverse center of the upper wall 14a of the circumferential wall portion 14 with a recess 14f. In other words, the upper wall 14a is stepped. Compared with a case which is formed of merely square cylindrical circumferential wall portion, the step acts like a reinforcing rib, and helps increase rigidity of the circumferential wall portion 14 of the case 13, so that the circumferential wall portion 14 is prevented from deforming upon actuation of the inflator 21. Consequently, the case 13 (or the box member 19) is prevented from deforming in the initial stage of inflation of the airbag 40, so that the airbag 40 is able to deploy smoothly.

As referred to in FIG. 4, in the first knee-protecting airbag device S1, moreover, the circumferential wall portion 14 of the box member 19 is configured such that vertical width t1 in a part near the left or right end is greater than vertical width t2 in the transverse center. Accordingly, when the airbag 40 is housed with its transverse width being reduced on folds along the front-rear direction, bulky portions in the left and right ends of the completely folded airbag 40 (in other words, portions near the folds FL and FR of the folded portion 50) are smoothly housed in spaces near the left and right ends of the circumferential wall portion 14 of the box member 19 (or the housing space 13b). In otherwords, since the airbag 40 is housed in the case 13 while its folded shape is maintained to the utmost, the airbag 40 is able to unfold the folds FL and FR of the folded portion 50 smoothly in the initial stage of inflation, as shown in FIG. 9A, and develop along the rear surface 5a of the column cover 5 in transversely expanded state.

In the first knee-protecting airbag device S1, therefore, the rigidity of the case 13 or the box member 19 is enhanced, so that the airbag 40 is able to deploy smoothly, and moreover, the airbag 40 folded through the vertical folding is easily housed while keeping the folded-up shape.

Moreover, since the upper wall 14a in the airbag device S1 is recessed near the transverse center as the recess 14f, even when the steering column 2 shifts downward upon operation of not-shown tilt mechanism, the steering column 2 does not engage the box member 19 or the circumferential wall portion 14, so that the device S1 is favorably located in front of the driver's seat. Without considering this point, it would also be appreciated to form a recessed portion in transverse center of the lower wall 14b, or alternatively form protruded portions in the vicinity of left and right ends of the upper wall 14a or the lower wall 14b.

Figure 10:
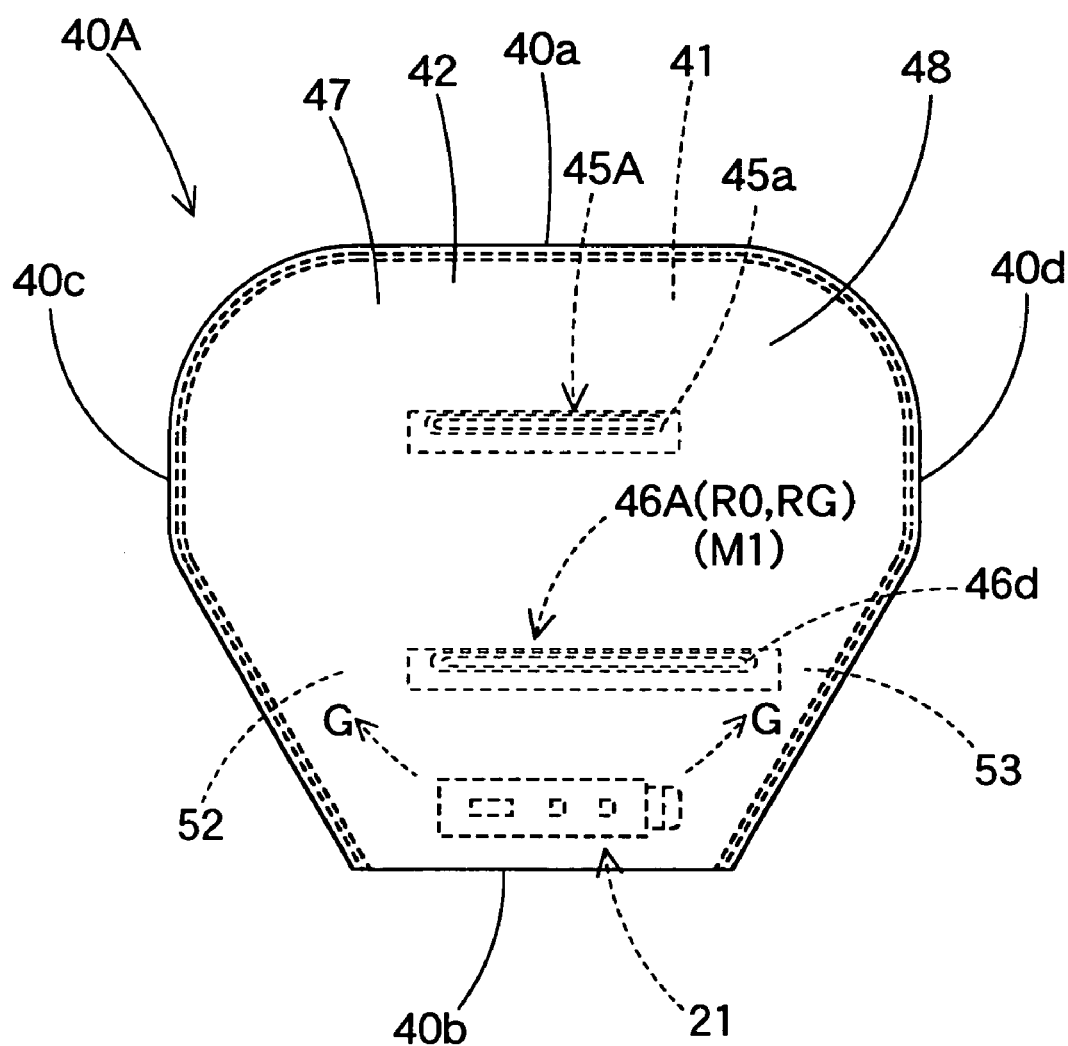
FIG. 10 is a schematic front view of a modification of the airbag of FIG. 6.
Figure 11A:
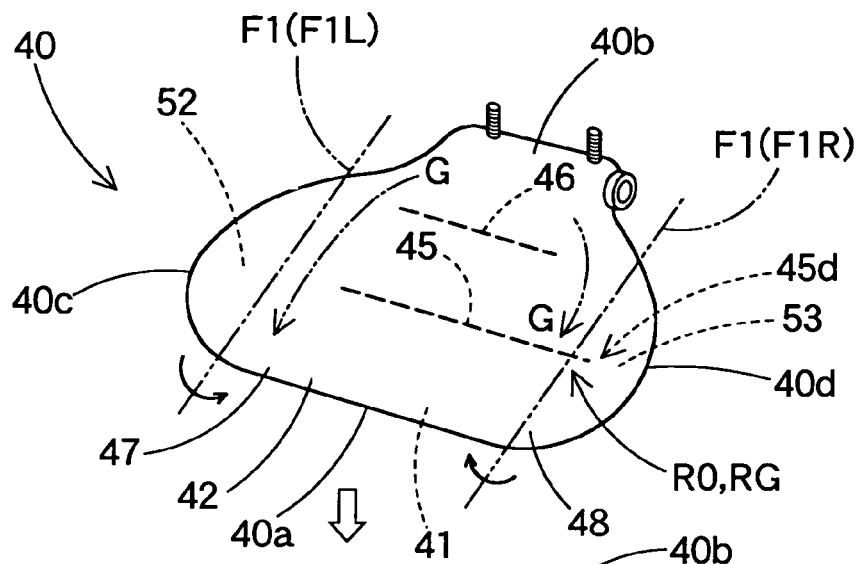
FIGS. 11A to 11D illustrate another folding process of the airbag of FIG. 6.
Figure 11B:
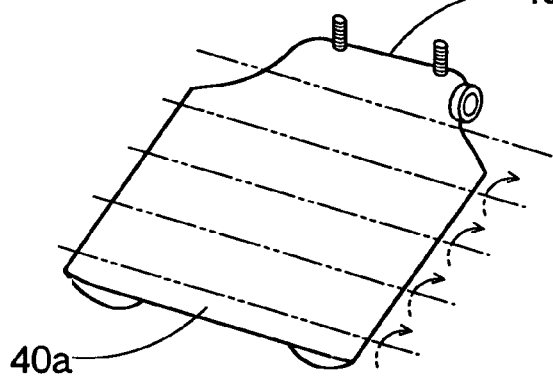
Figure 11C:
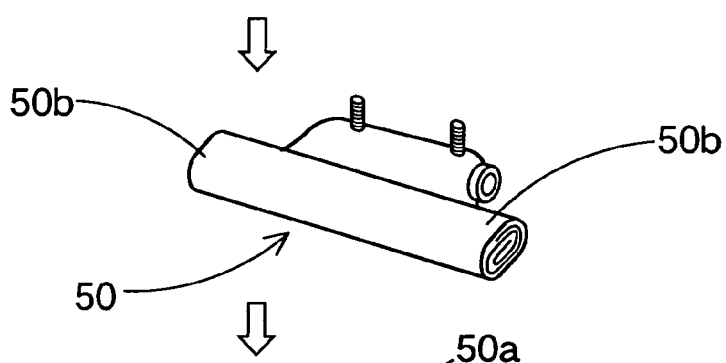
Figure 11D:
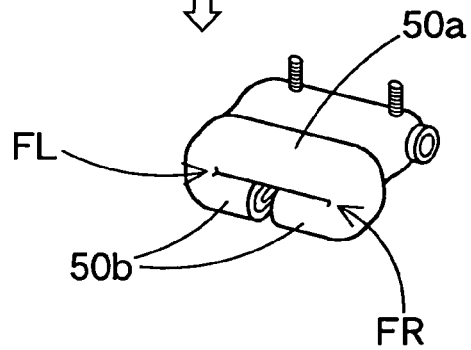

Although the foregoing embodiment shows only the upper tether 45 located within the airbag 40 as a flow regulating means RG, like an airbag 40A shown in FIG. 10, it will also be appreciated that a right end 46d of a lower tether 46A is extended toward the right edge 40d of the airbag 40A while a right end 45d of an upper tether 45A is kept away from the right edge 40d of the airbag 40A, such that only the tether 46A functions as a flow regulating means RG. Further alternatively, both of the tether 45 of the airbag 40 and the tether 46A of the airbag 40A may be employed as flow regulating means RG.

In the first knee-protecting airbag device S1, it will also be appreciated that the vertical folding step to reduce the transverse width of the airbag 40 is also applied before the roll-folding step, as shown in FIG. 11. In FIGS. 11A and 11B, the flat airbag 40 with the column side wall 42 and the driver's side wall 41 overlaid on each other firstly goes through a vertical folding step to bring left and right edges 40c and 40d of the airbag 40 toward the transverse center O1 of the airbag 40 on folds F1 (F1L and F1R) along the front-rear (vertical) direction. Thereafter, as the processes shown in FIGS. 8A, 8B and 8C, the airbag 40 goes through the transverse roll-folding step of bringing the upper edge 40a toward the lower edge 40b on the column side wall 42, and then the vertical folding step to fold the ends 50b, so that the folding process is complete. Referring to FIG. 6, as to the location of the folds F1, the fold F1R at the side of the cover portion 48 is so located as to cross the tether 45, while the fold F1L at the side of the general portion 47 is so located as not to fall on the tether 45.

With this arrangement, since the airbag 40 is folded on the vertical fold F1R on the end 45d of the tether 45 near the cover portion 48, the gas inlet port 53 for letting inflation gas G flow into the cover portion 48 is closed by the vertical fold F1R and the tether 45. The gas inlet port 53 does not open until the fold F1R is unfolded. On the other hand, the gas inlet port 52 is open to allow inflation gas G to flow into the general portion 47 even before the vertical fold F1L is eliminated, since the fold F1L is so made as not to fall on the end 45c of the tether 45 near the general portion 47.

In other words, the vertical fold F1R located to cross the tether 45 constitutes the gas-flow regulating means RG for delaying the starting of flowing-in of inflation gas G into the cover portion 48 than in the general portion 47. When the cover portion 48 inflates, the kinetic energy of inflation gas G itself is decreased compared with the initial stage of inflation, so that the cover portion 48 is less likely to be damaged and cause gas leakage even if it engages the lower end Ab of the accessory A. Besides, this arrangement enables every airbag 40 to complete inflation of the cover portion 48 later than the general portion 47, so that gas leakage from the cover portion 48 is stably prevented in every airbag 40.

Viewing the above working-effect from different aspect, it is also explained as follows: the flow speed of inflation gas G flowing into the cover portion 48 after the fold F1R is unfolded is made slower than gas G flowing into the general portion 47, so that the moving speed of the cover portion 48 is restrained. Consequently, the cover portion 48 is less likely to be damaged and cause gas leakage even if it engages the lower end Ab of the accessory A.

In this arrangement, too, furthermore, the gas leakage preventing action is easily obtained by means of the folding process (the vertical folding step) applied to the airbag 40 when housed in the case 13 and adjusting the location of the tether 45 of the airbag 40 for thickness-regulation. Thus, manufacturing and folding of the airbag 40 are not complicated.

Figure 12:
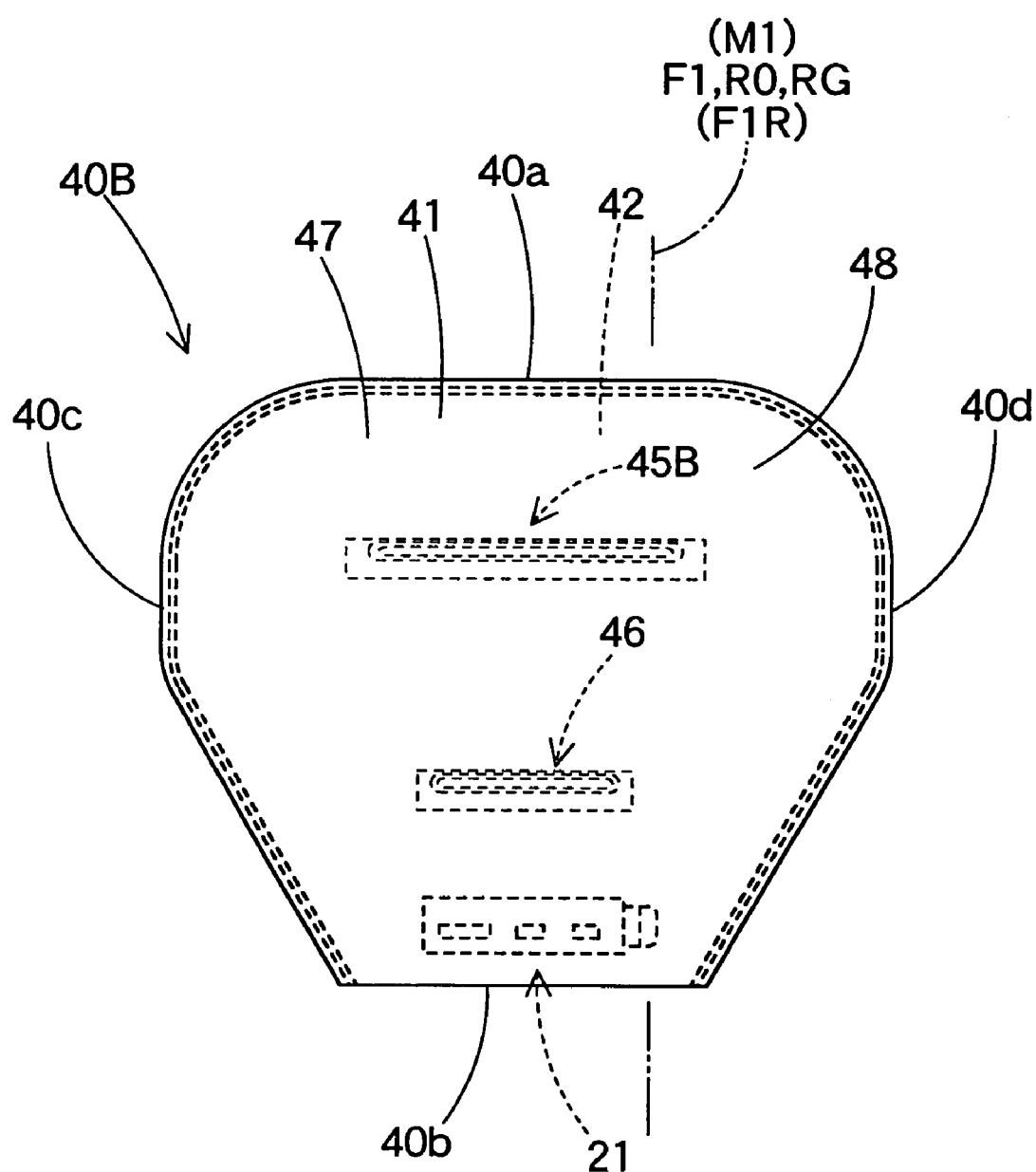
FIG. 12 is a schematic front view of another modification of the airbag of FIG. 6.

Although FIG. 11 show the vertical fold F1 located both in left and right sides, it would also be appreciated to make the fold F1R only at the side of the cover portion 48. When the vertical folds are made in both left and right sides, their folding widths do not necessarily have to be the same. Moreover, the arrangement of making the vertical fold act as the flow regulating means RG can also be applied to a case where, as in the airbag 40B shown in FIG. 12, the tether 45B located transversely is substantially symmetrical relative to the center of the airbag 40B, not like the tether 45. In that case, the vertical fold F1 is so made to make folding width toward the cover portion 48 great as to cross the tether 45B, or alternatively, the fold F1 is formed only at the side of the cover portion 48. Here, the airbag 40B differs from the airbag 40 only in that the tethers 45B and 46 are formed symmetrical relative to the transverse center of the airbag 40B.

Figure 13:
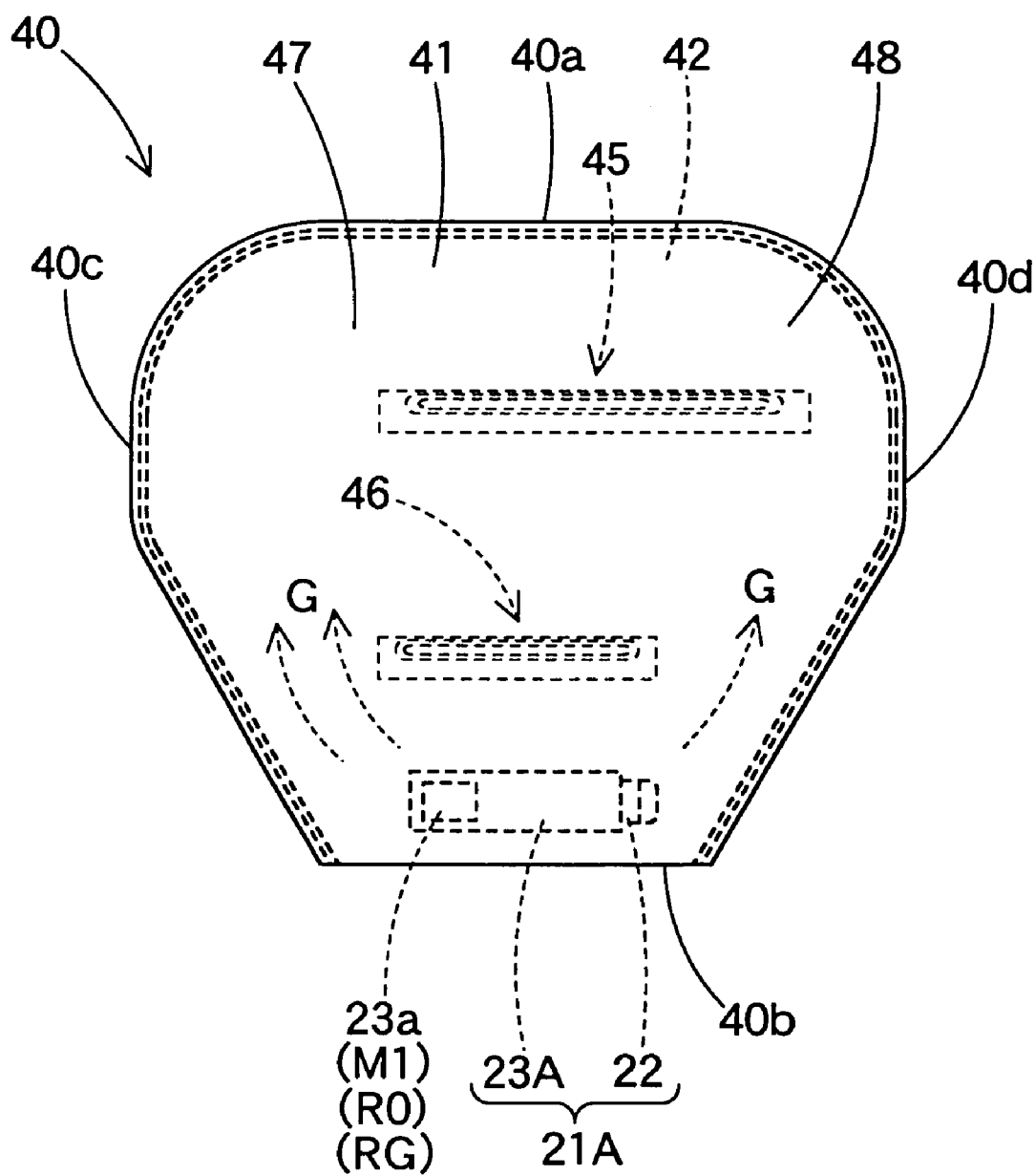
FIG. 13 is a schematic front view of a modification of the inflator shown in FIG. 6.

Further alternatively, the gas-flow regulating means RG may be constituted by an inflator located within the airbag 40, as in the inflator 21A shown in FIG. 13. In the inflator 21A, the gas outlet port 23*a* located in a diffuser 23A is located only in the left side such that more inflation gas G may be discharged toward the general portion 47 than toward the cover portion 48. Here, other construction of the inflator 21A is similar to that of the inflator 21, and how it is mounted on the vehicle is similar to the airbag device S1.

With this arrangement of the inflator 21A, since the cover portion 48 admits less inflation gas G than the general portion 47, the cover portion 48 completes inflation even later than the general portion 47, so that the cover portion 48 inflates right before the completion of inflation of the airbag 40. Kinetic energy of inflation gas G itself has been decreased by this time compared with the initial stage of inflation. Also in this case, viewed from a different aspect, it can be explained that flow speed of inflation gas G flowing toward the cover portion 48 is made slower than flow speed of inflation gas G flowing toward the general portion 47. Consequently, moving speed of the cover portion 48 is restrained, and thus the cover portion 48 is less likely to be damaged and cause gas leakage even if it engages the lower end Ab of the accessory A. Moreover, this arrangement can be achieved easily only by adjusting direction and opening area of the gas outlet port 23*a* of the inflator 21A for emitting inflation gas G into the airbag 40. This inflator 21A may be employed in the airbag 40B having the tethers 45B and 46 located symmetrically.

Figure 14:
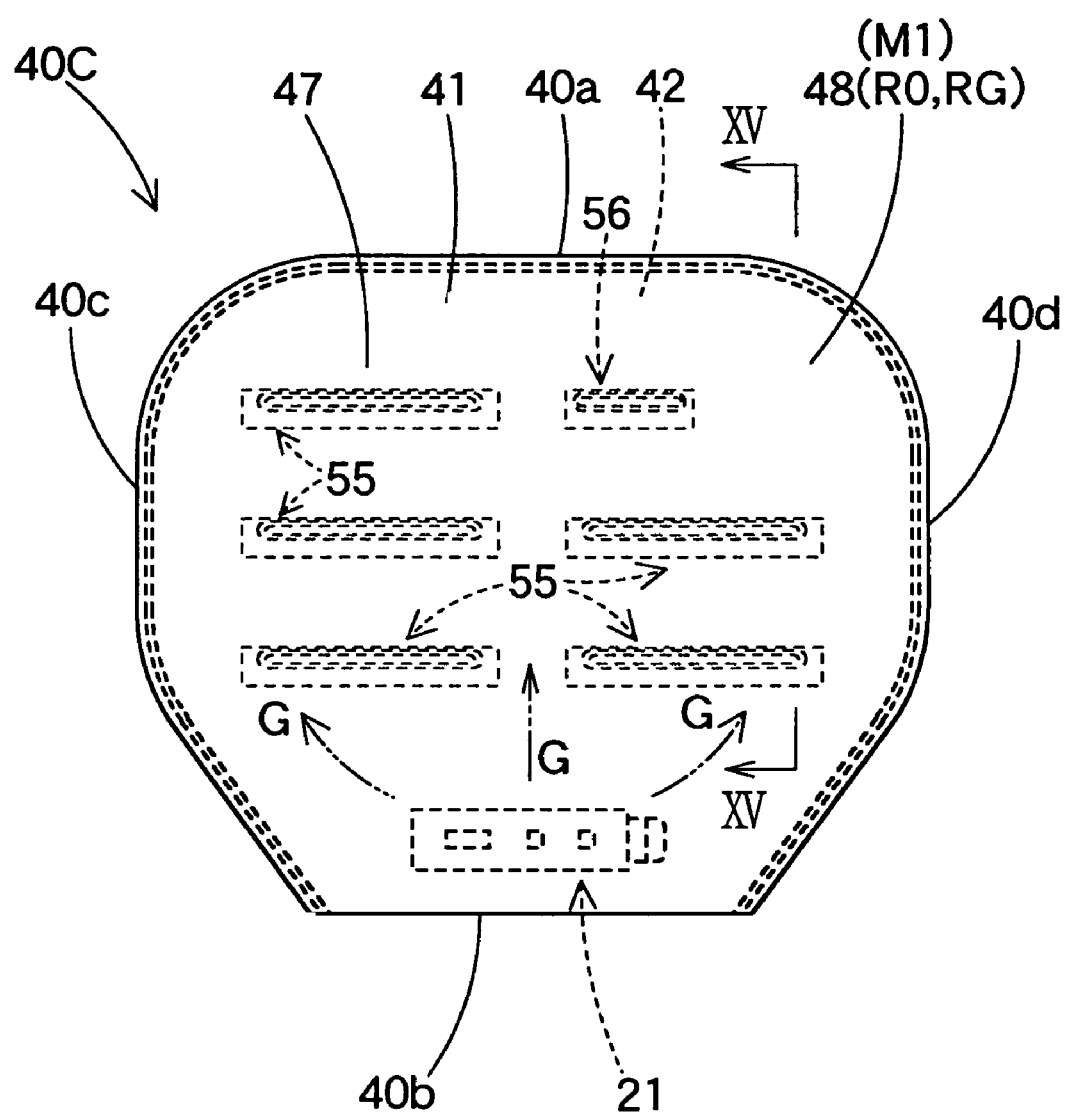
FIG. 14 is a schematic front view of yet another modification of the airbag of FIG. 6.
Figure 15:
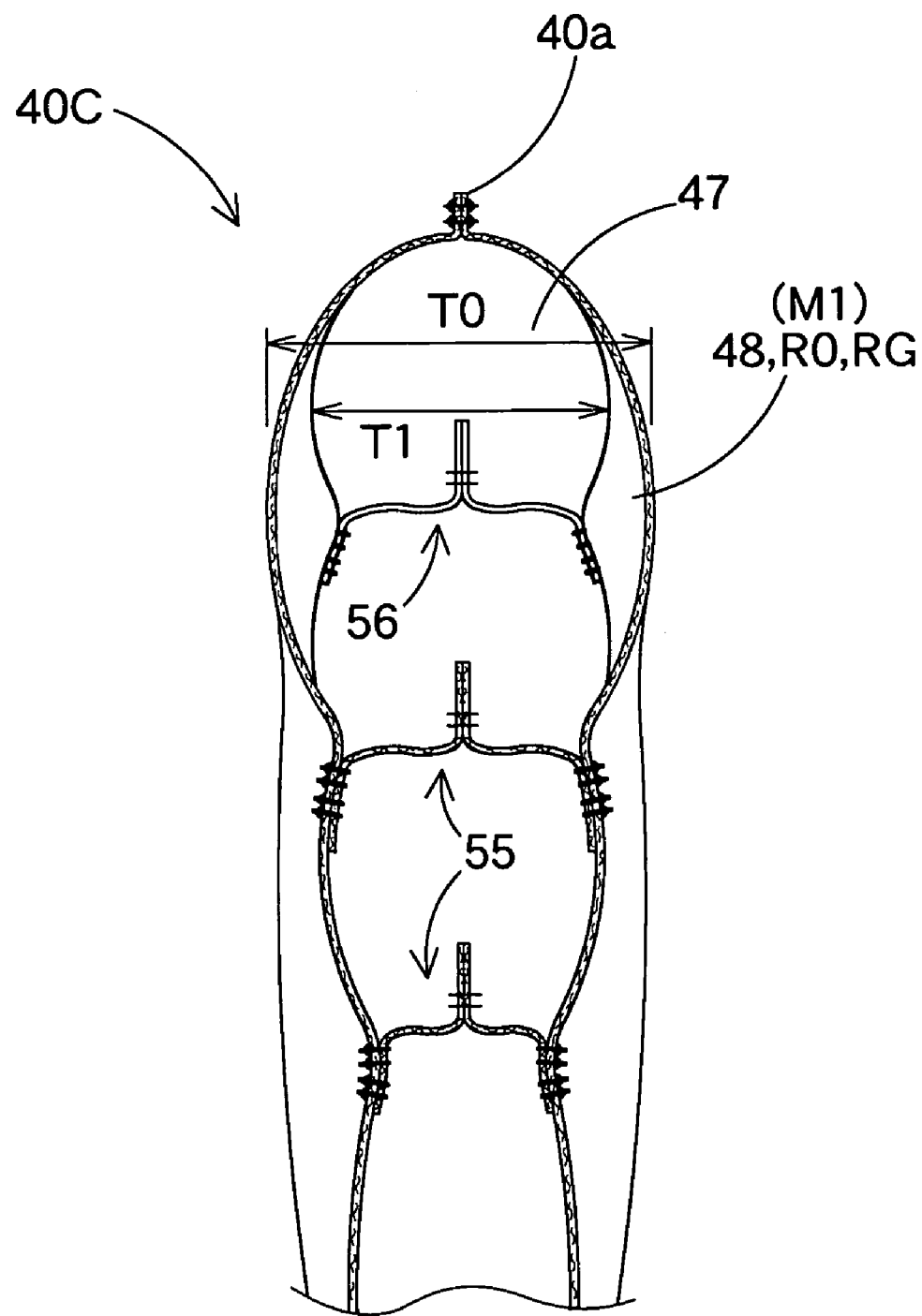
FIG. 15 is a sectional view taken along line XV—XV in FIG. 14.
Figure 17A:
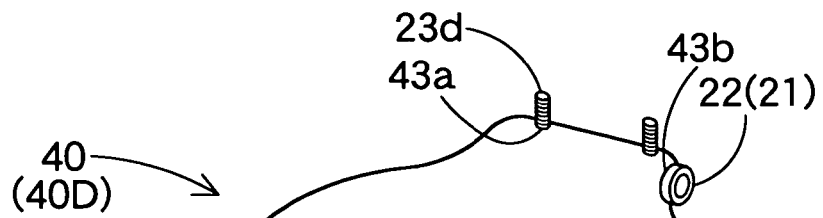
FIGS. 17A to 17E illustrate a modification of the folding process shown in FIGS. 16A to 16E.
Figure 17B:
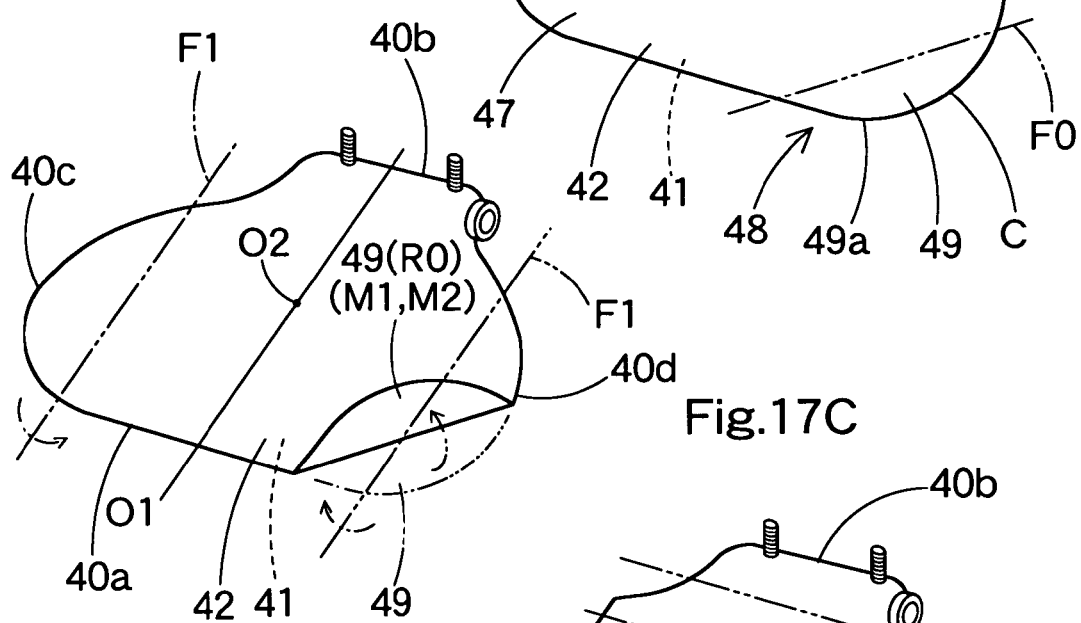
Figure 17C:
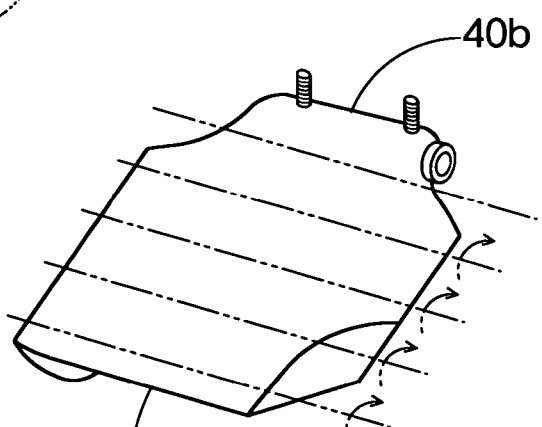
Figure 17D:
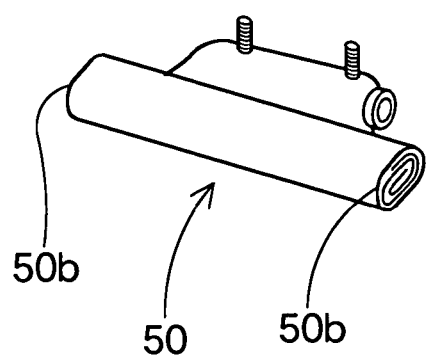
Figure 17E:
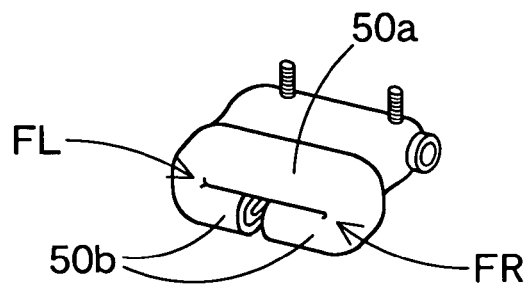

Further alternatively, as in the airbag 40C shown in FIGS. 14 and 15, the gas-flow regulating means RG may be constituted by the cover portion 48 itself by making the thickness T0 of the airbag cover 48 as completely inflated greater than the thickness T1 of the general portion 47. A plurality of tethers are formed in the airbag 40C along the transverse direction, and a tether 56 located downstream of inflation gas G near the cover portion 48 has a shorter length, which increases a volume of the cover portion 48 as completely inflated. The airbag 40C has similar construction to that of the airbag 40, and is mounted on the vehicle after going through similar processes to those of the airbag device S1 including the folding process.

With this arrangement, when the airbag 40C inflates, the flow speed of inflation gas G flowing toward the cover portion 48 slows down upon flowing into the cover portion 48 and becomes slower than the speed of inflation gas G flowing toward the general portion 47 since the cover portion 48 has a greater capacity. Accordingly, the kinetic energy of inflation gas G is decreased, so that the cover portion 48 is less likely to be damaged and cause gas leakage even if it engages the lower end Ab of the accessory A.

Since the cover portion 48 in this case has a great capacity and easily dents when the accessory A engages it, gas leakage is less likely to occur.

The restraining means R0 may be constituted by the folding process of the airbag 40 for housing the airbag 40 in the case 13. Specifically, as referred to FIG. 16, the restraining means R0 is formed in the folding process of the airbag 40 that includes a cover-portion folding step applied before the step to fold the general portion 47, in which the fold F0 is located around the cover portion 48.

More specifically, the folding process of the airbag 40 begins with the cover-portion folding step. From flat expanded state in which the column cover side wall 42 and the driver's side wall 41 are overlaid on each other as shown in FIG. 16A, a portion 49 near the corner C of the cover portion 48 is folded back toward the transverse center O1 of the airbag 40 on the fold F0, as shown in FIGS. 16A and 16B. Particularly in FIGS. 16A and 16B, the portion 49 is folded back on the driver's side wall 41 toward the vertical (longitudinal) and transverse center O2 of the airbag 40. The folded-back portion 49 is adapted to cover the area of the accessory A as hung down from the key E from the vehicle's rear side when the airbag 40 is completely inflated and deployed. Folding width B of the portion 49 is so predetermined that the fold F0 and its vicinity may not engage the accessory A when the fold F0 is unfolded near the completion of inflation of the airbag 40, but the vicinity of the outer edge 49*a* of the portion 49 may turn around the fold F0 to engage the lower end Ab of the accessory A.

Subsequently, as referred to FIGS. 16B and 16C, the airbag 40 goes through a vertical folding step to fold and bring the left and right edges 40*c* and 40*d* of the airbag 40 toward the transverse center O1 while forming folds F1 along the longitudinal (vertical) direction near the edges 40*c* and 40*d*.

Referring to FIGS. 16C and 16D, thereafter, the upper edge 40*a* of the airbag 40 is rolled on the column side wall 42 toward the lower edge 40*b*.

To narrow the transverse width of the airbag 40 enough to be housed in the case 13, then, the left and right ends 50*b* of the roll-folded portion 50 are folded on folds FL and FR to be located below the center 50*a* of the folded portion 50 in the vertical folding step, as shown in FIGS. 16D and 16E. Thus the folding process of the airbag 40 is completed.

In this arrangement, the cover portion 48 is folded at the beginning of the folding process of the airbag 40. Accordingly, the portion 49 of the cover portion 48 is unfolded right before the completion of inflation of the airbag 40, which helps slow down the flow speed of inflation gas flowing into the portion 49, compared with the initial stage of inflation. Thus the kinetic energy of the folded portion 49 at the time the portion 49 engages the lower end Ab of the accessory A is decreased. Consequently, the portion 49 of the cover portion 48 is prevented from being damaged by the accessory A. In this case, too, viewed from a different aspect, it can be explained that the fold F0 constitutes the gas-flow regulating means RG, since the flow speed of inflation gas flowing into the cover portion 48 after the fold F0 is unfolded is slower than the flow speed of inflation gas flowing toward the general portion 47, and thus the moving speed of the cover portion 48 is restrained.

Moreover, this arrangement can be easily executed only by folding the cover portion 48 at the beginning of the folding process of the airbag 40.

Here, when the fold F0 is formed in the cover portion 48, the portion 49 may be folded on the column side wall 42, as shown in FIG. 17. Moreover, the vertical folding process to fold on the folds F1 may be omitted in the folding processes shown in FIGS. 16 and 17.

Folding method should not be limited to those shown as long as the unfolding in the cover portion 48 is delayed than in the general portion 47. The cover portion 48 may be folded in any manners which would give resistance to unfolding of the cover portion 48.

Figure 18A:
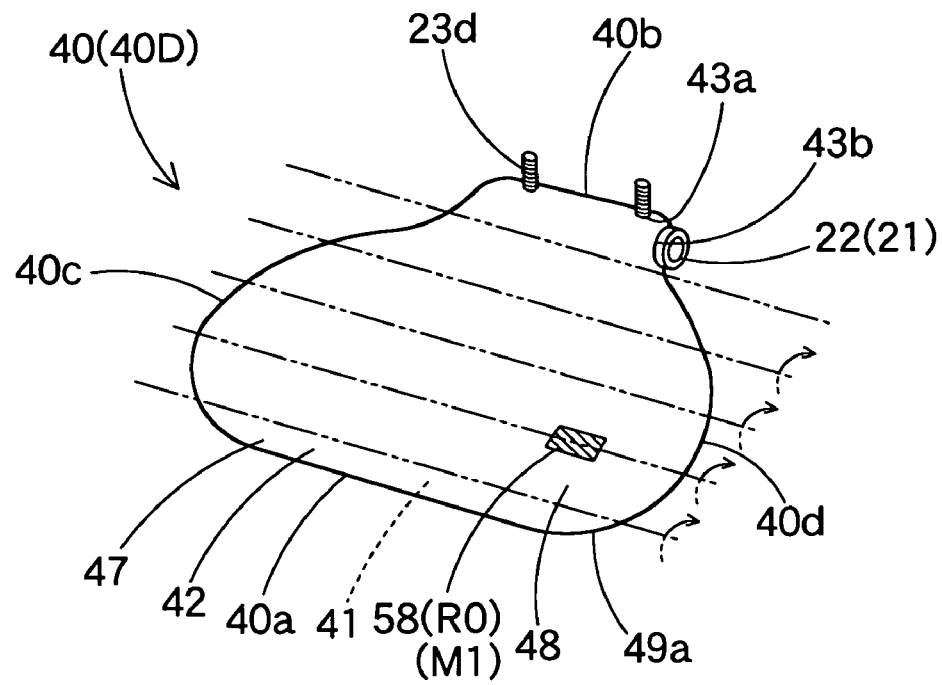
FIGS. 18A to 18C illustrate another restraining means.
Figure 18B:
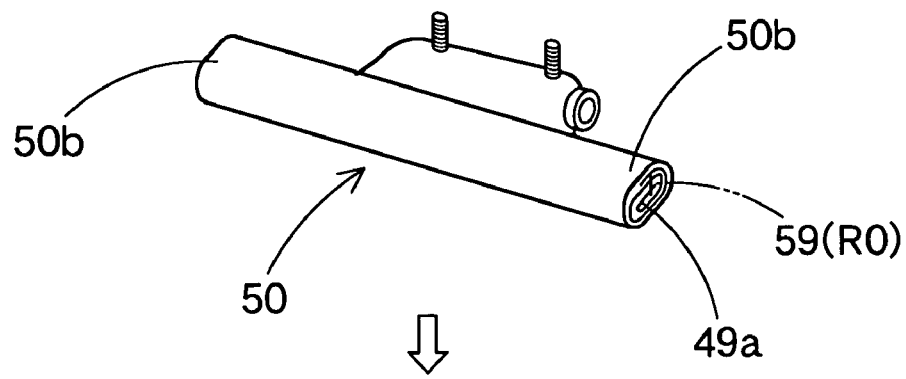
Figure 18C:
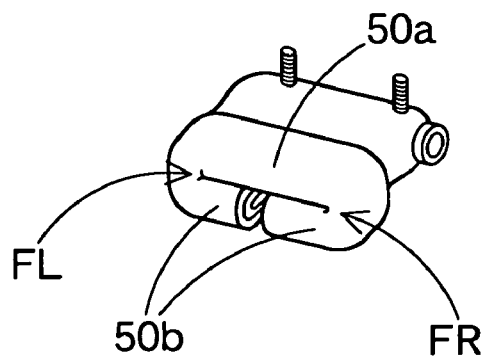

Furthermore, the restraining means R0 is also exemplified by a fold-keeping member 58 shown in FIG. 18 for keeping the folded state of the cover portion 48 releasably such that the cover portion 48 may be unfolded later than the general portion 47 in the course of airbag 40 deployment. The fold-keeping member 58 shown in FIG. 18 is constituted by an adhesive member that adheres the cover portion 48 to a different part of the airbag 40 in a releasable manner in the roll-folding step. Arrangements of other parts such as the airbag 40 and the inflator 21 are similar to those of the airbag device S1, including a mounting process on the vehicle.

With this arrangement, when the fold-keeping member 58 stops keeping the folded state of the airbag 40, in other words, when the adhesive 58 is released, the kinetic energy of the cover portion 48 is consumed and decreased. Accordingly, since the kinetic energy of the cover portion 48 has been decreased by the time the lower end Ab of the accessory A engage thereto, the cover portion 48 is prevented from being damaged by the accessory A.

Other than the adhesive member, joining members such as a breakable yarn stitched externally to the airbag 40 is also exemplified as the fold-keeping member. For example, FIG. 18B illustrates by a double-dotted line a joining member 59 which stitches the outer edge 49a of the folded cover portion 48 to a different part of the airbag 40.

Figure 19:
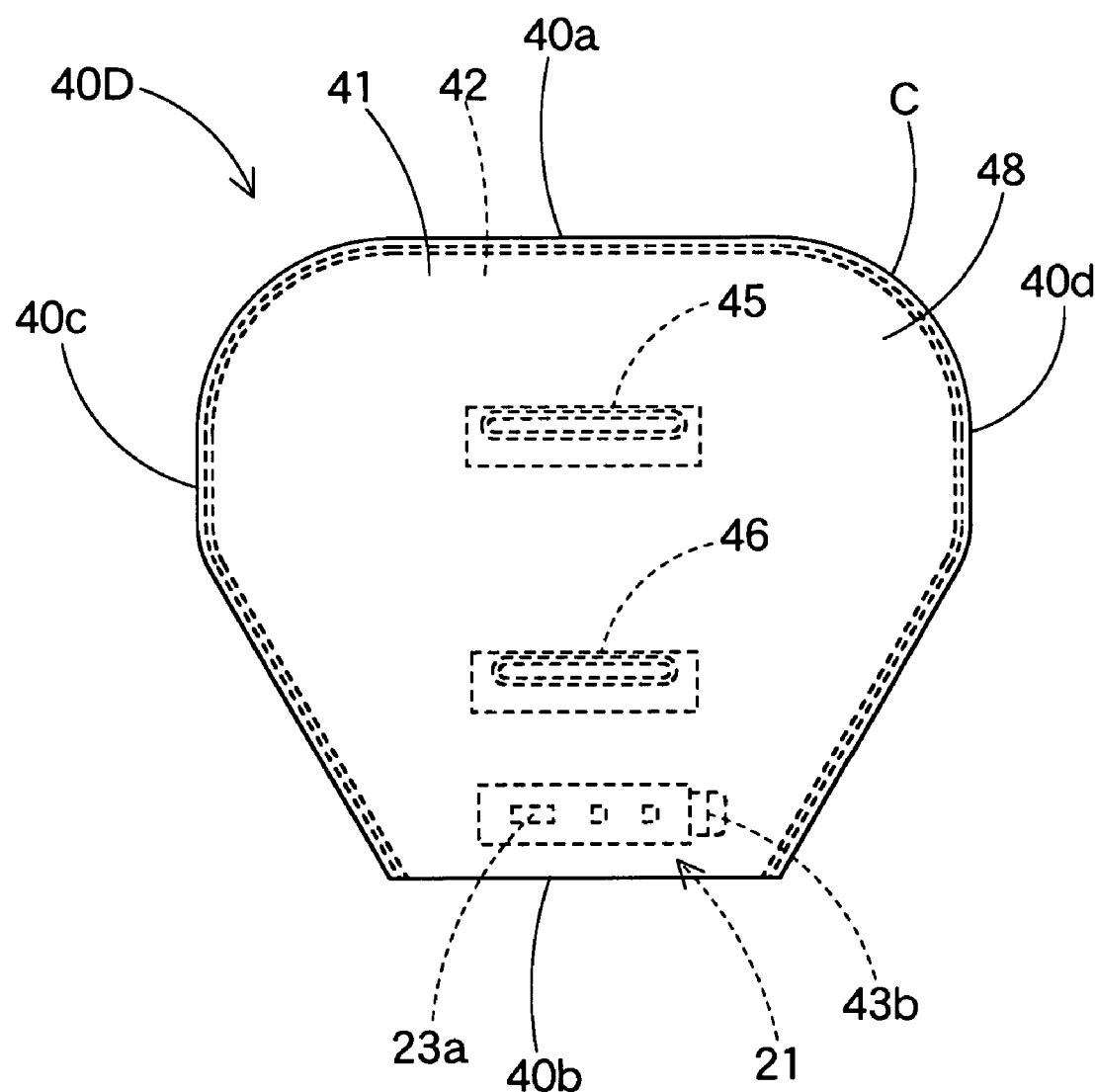
FIG. 19 is a schematic front view of an airbag used in a second embodiment of the knee-protecting airbag device of the present invention.

Airbag 40D shown in FIG. 19 internally having the tethers 45 and 46 located symmetrically may be employed in the cases that the restraining means R0 is constituted by folding the airbag such that the cover portion 48 may be unfolded later than the general portion 47 in the course of airbag deployment or by a fold-keeping member for keeping the folded state of the cover portion 48 in a releasable manner.

In the folding processes shown in FIGS. 16 and 17, prevention of damage by contacting with the key accessory A is achieved without considering kinetic energy of the cover portion and the general portion, and the airbag 40D folded by the folding methods shown in FIG. 16 or 17 constitutes a second embodiment S2 of the knee-protecting airbag device of the present invention.

That is, in the folding process of the airbag 40D illustrated in FIG. 16, the cover-portion folding step is applied before the roll-folding step. In the cover-portion folding step, from flat expanded state in which the column cover side wall 42 and the driver's side wall 41 are overlaid on each other as shown in FIG. 16A, a portion 49 near the corner C of the cover portion 48 is folded back toward the transverse center O1 of the airbag 40D on a fold F0, as shown in FIGS. 16A and 16B. At this time, the portion 49 is folded back on the driver's side wall 41 toward the vertical (longitudinal) and transverse center O2 of the airbag 40D. The folded-back portion 49 is adapted to cover the area of the accessory A as hung down from the key E from the vehicle's rear side when the airbag 40D is completely inflated and deployed. Folding width B of the portion 49 is so predetermined that the fold F0 and its vicinity may not engage the accessory A when the fold F0 is unfolded near the completion of inflation of the airbag 40D, but the vicinity of the outer edge 49a of the portion 49 may turn around the fold F0 to engage the lower end Ab of the accessory A.

If the airbag 40D admits inflation gas and protrudes from the case 13, the airbag 40D deploys while unfolding in substantially inverse process to the folding process. More specifically, in the course of deployment, the airbag 40D, unfolding the roll-folding, raises its upper edge 40a up to the vicinity of the upper end 5b of the column cover 5 along the lower (rear) surface 5a of the column cover 5, and then unfolds the folding of the portion 49 of the cover portion 48.

By the time the portion 49 is unfolded, the general portion 47 in the upper edge 40a of the airbag 40D except the cover portion 48 is deployed up to the highest location, as shown in FIGS. 9A and 9B. Then as shown in FIG. 20, the folded portion 49 unfolds in a condition that the fold F0 of the cover-portion folding step is located near the key cylinder 6.

Figure 20A:
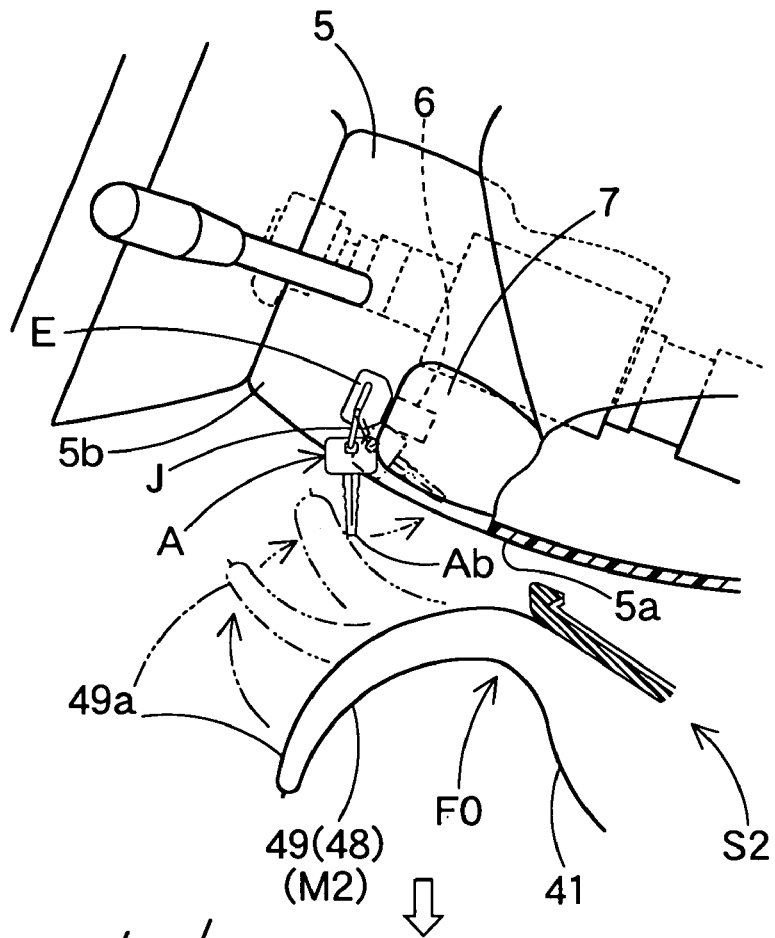
FIGS. 20A and 20B is a side view showing the actuated knee-protecting airbag device of the second embodiment in order.

More specifically, the portion 49 firstly turns around the fold F0 located near the key cylinder 6, as shown in FIG. 20A. At this time, since the portion 49 of the cover portion 48 is folded on the driver's side wall 41 in the cover-portion folding step, the portion 49 turns upward and rearward from the lower side of the fold F0.

Figure 20B:
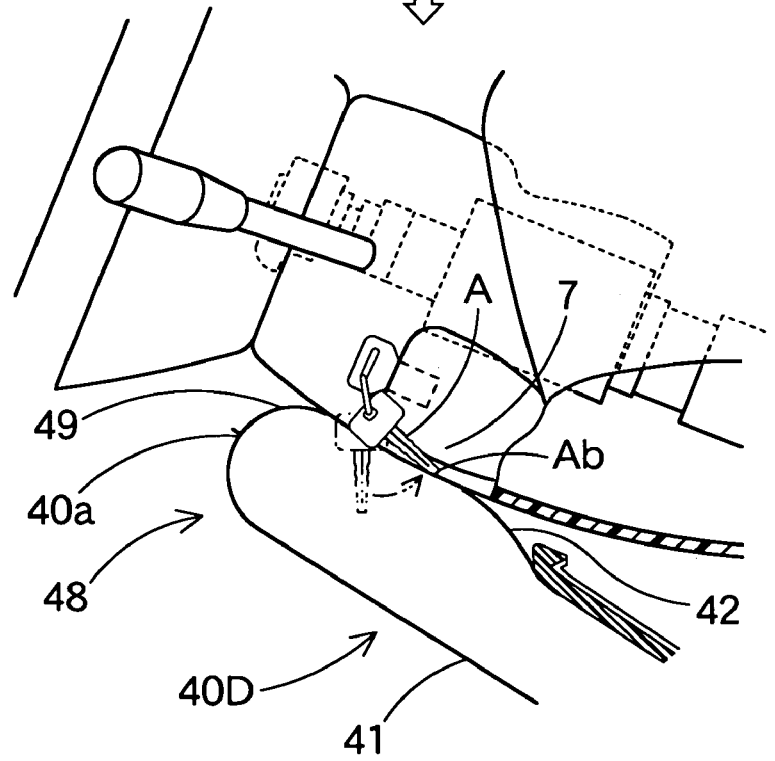

While the portion 49 turns upward and rearward from the lower side of the fold F0, the lower end Ab of the accessory A hung down from the key E is pushed forward of the vehicle. Then the accessory A turns forward of the vehicle around the joint portion with the key E, and substantially comes to extend along a lower surface of outer circumferential part 7 of the key cylinder 6. At this time, the portion 49 has not admitted so much gas, and thus is thin plate-shaped, and engages the lower end Ab of the accessory A from obliquely rear lower direction. Accordingly, the lower end Ab of the accessory A does not engage the cover portion 48 or the portion 49 perpendicularly, so that the cover portion 48 is prevented from being damaged. Even if the cover portion 48 inflates thickly thereafter, as shown in FIGS. 20A and 20B, the thick cover portion 48 does not contact with the lower end Ab of the accessory A in damageable manner as a matter of course, since the accessory A is pressed and substantially extended along the lower surface of the outer circumferential part 7 of the key cylinder 6.

Here, the outer circumferential part 7 designates a portion covering the key cylinder 6 at a right side 5c of the column cover 5.

In the second knee-protecting airbag device S2 employing the airbag 40D, therefore, a damage prevention means M2 is constituted by a series of processes of the cover-portion folding performed before the roll-folding step of the airbag 40D, and housing the airbag 40D in the case 13. Consequently, in this airbag device S2, even if the inflating airbag 40D contacts with the accessory A connected with the key E, the airbag 40D does not contact with it in a damageable manner, so that gas leakage is prevented.

Also in the second airbag device S2, since the airbag 40D is roll-folded on the column side wall 42 when bringing the upper edge 40a close to the lower edge 40b, when it is unrolled, the airbag 40D is able to develop along the lower surface 5a of the column cover 5 and deploy between the knees K of the driver D and the column cover lower surface 5a properly even if there is only a narrow space between the knees K of the driver D and the column cover lower surface 5a.

In this airbag 40D, the portion 49 of the cover portion 48 may also be folded back on the column side wall 42, not only on the driver's side wall 41, as shown in FIG. 17.

Figure 21:
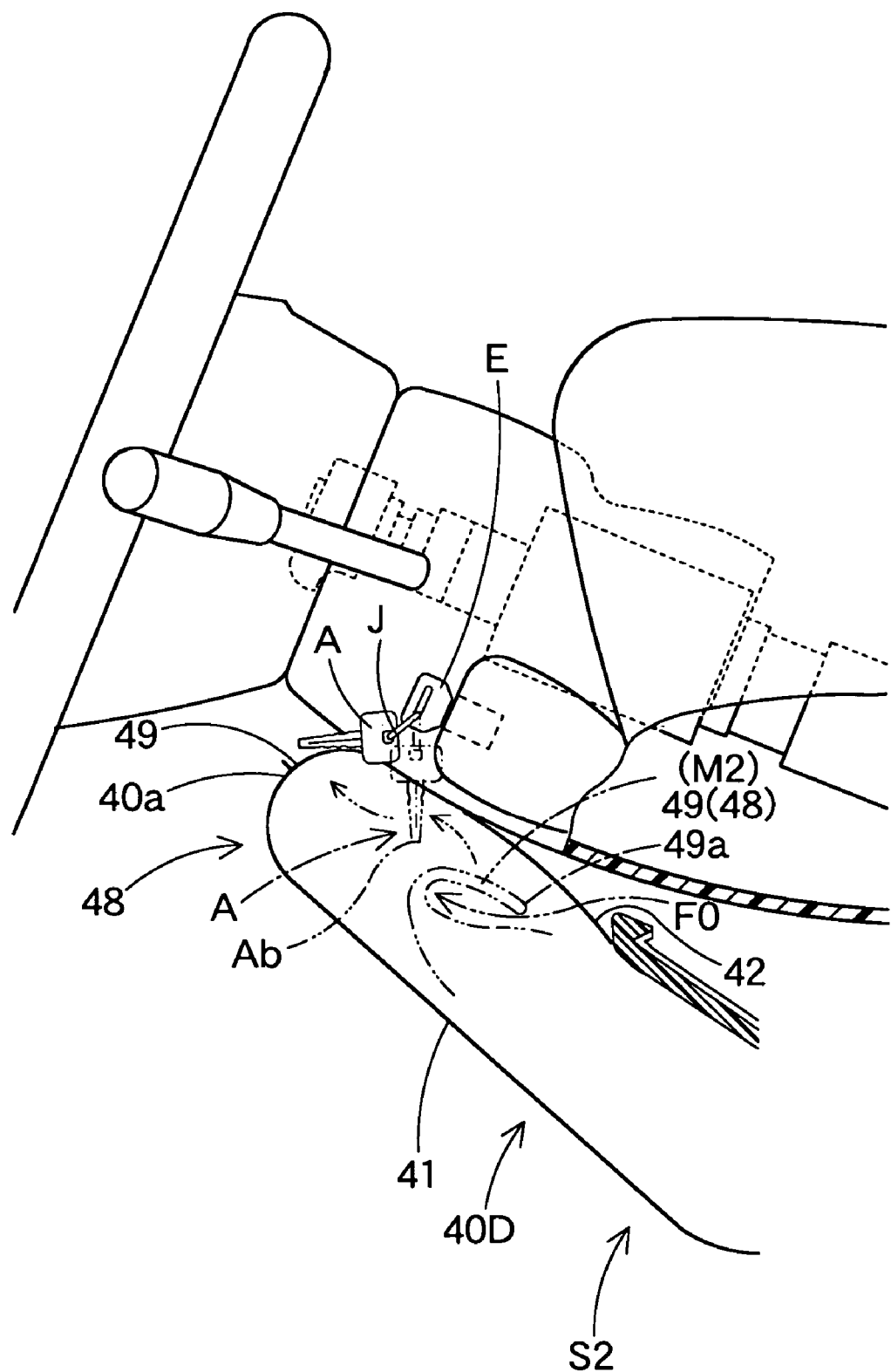
FIG. 21 is a side view showing the action of the second embodiment employing an airbag folded by the modification of the folding process.
Figure 22:
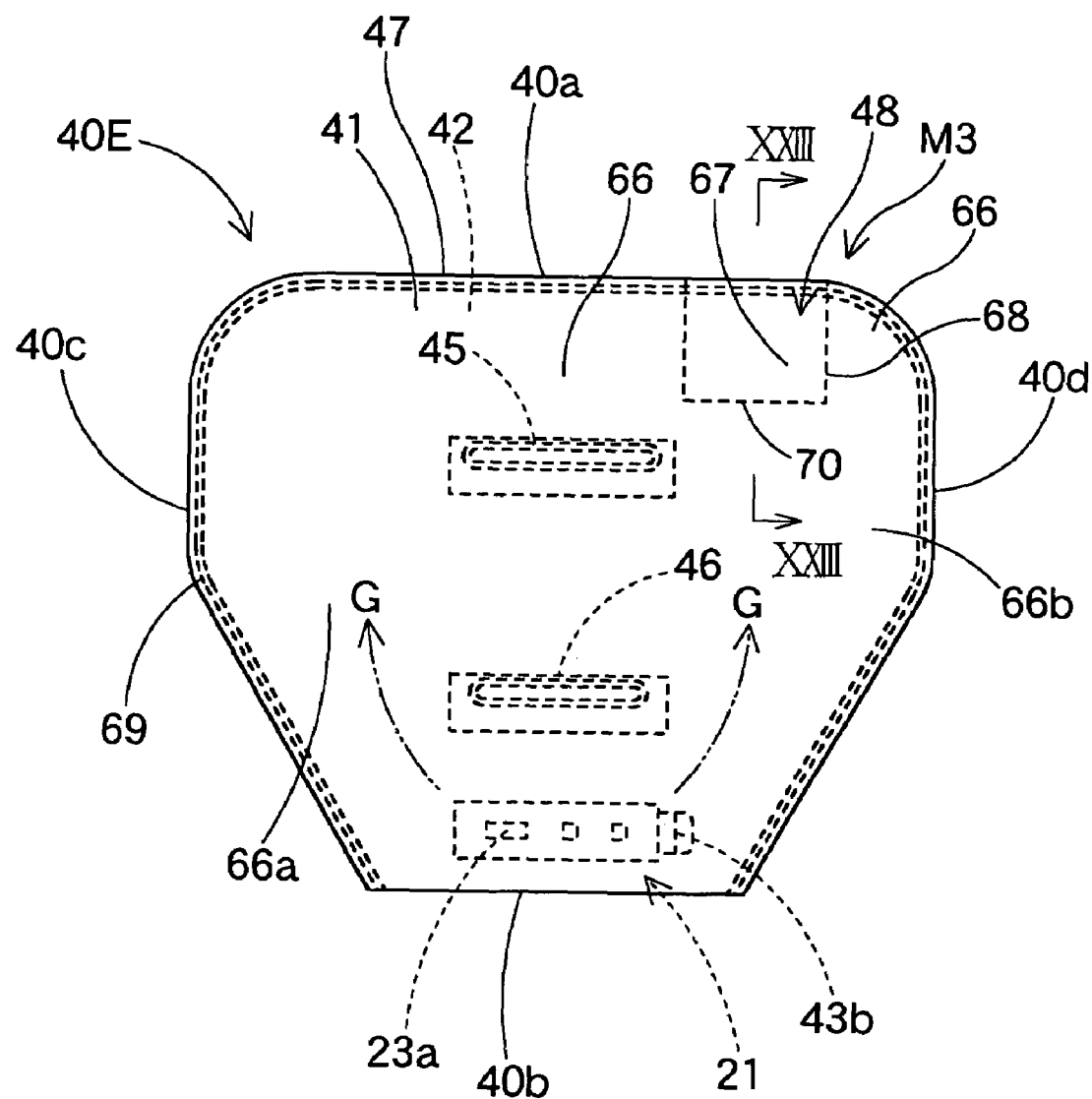
FIG. 22 is a schematic front view of an airbag used in a third embodiment of the knee-protecting airbag device of the present invention.
Figure 23:
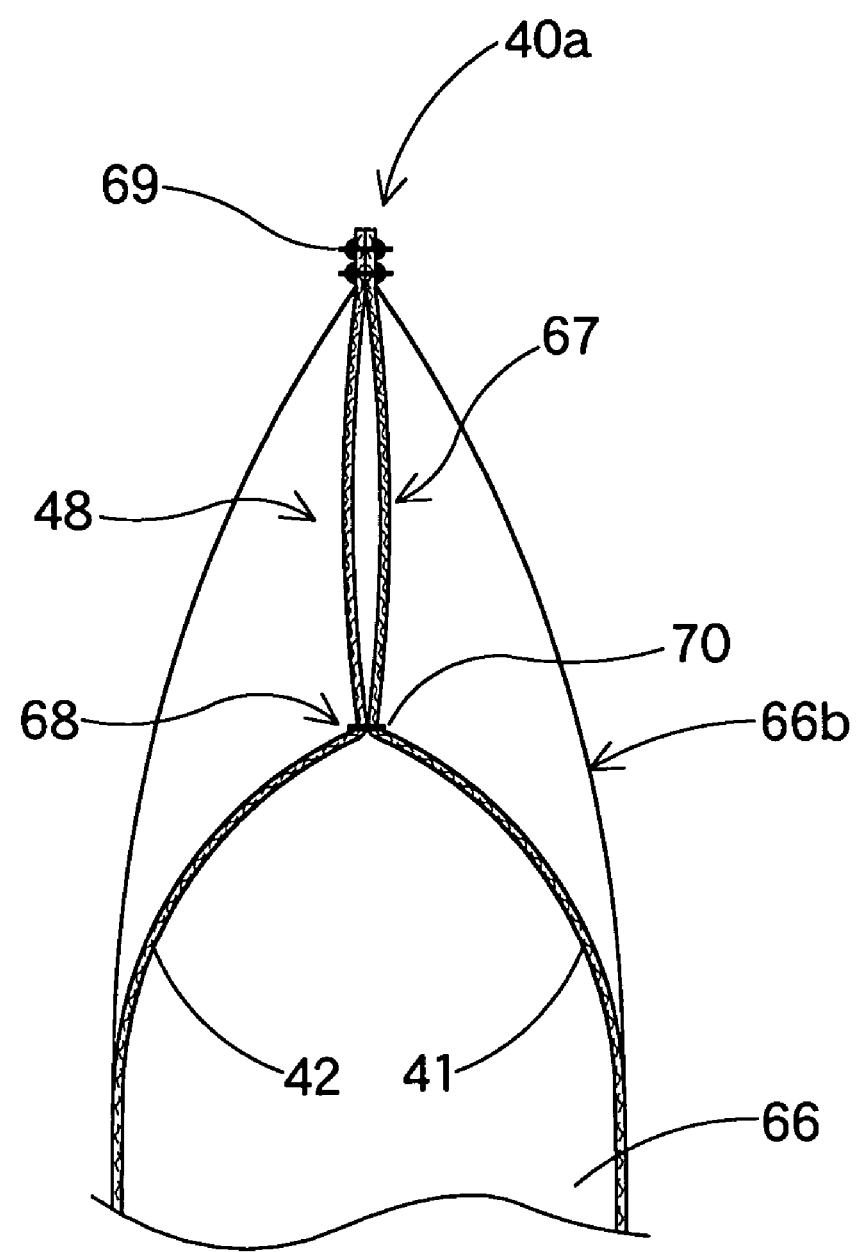
FIG. 23 is a schematic partial section taken along line XXIII—XXIII in FIG. 22.

In this case, right before the completion of inflation of the airbag 40D, the folded portion 49 is unfolded as shown in FIG. 21. Specifically, the portion 49 of the cover portion 48 turns upward and rearward from the front side of the fold F0. Then the portion 49 pushes the lower end Ab of the accessory A hung down from the key E rearward of the vehicle. The accessory A turns rearward of the vehicle around the joint portion with the key E, and makes its lower end Ab horizontally or upwardly oriented to keep the lower ends Ab away from the airbag 40D. At this time, too, the portion 49 has not admitted so much gas, and thus is thin plate-shaped, and engage the lower end Ab of the accessory A from obliquely front lower direction. Accordingly, the lower end Ab of the accessory A does not engage the cover portion 48 or the portion 49 perpendicularly, so that the cover portion 48 is prevented from being damaged. Even if the cover portion 48 inflates thickly thereafter, the thick cover portion 48 does not contact with the lower end Ab of the accessory A in a damageable manner as a matter of course, since the lower end Ab of the accessory A is directed horizontally or upward. Thus gas leakage is prevented.

However, if the portion 49 of the cover portion 48 is folded back on the driver's side wall 41 in the cover-portion folding step, when the portion 49 initially contacts with the lower end Ab of the accessory A, the portion 49 turns the accessory A forward of the vehicle, as shown in FIG. 20, not rearward and closer to the driver D as shown in FIG. 21, as described before. Therefore, even if the accessory A comes off the key E, it is prevented from flying toward the driver D.

In the airbag 40D of the second airbag device S2, the portion 49, which is a part of the right edge 40d in the airbag upper edge 40a, is folded at the beginning of the folding process. Accordingly, unfolding of the fold F0 of the portion 49 takes place immediately before the completion of inflation of the airbag 40D, so that the flow speed of inflation gas flowing into the portion 49 is slowed down than the initial stage of inflation. As described before, thus, the kinetic energy of the portion 49 at the time of contacting with the lower end Ab of the accessory A is restrained, so that the portion 49 itself is further prevented from being damaged by the accessory A.

Without considering the above point, the following arrangement will also be appreciated, provided that the cover-portion folding is performed before the roll-folding step, as the damage prevention means, and that the lower end Ab of the accessory A is pushed so as not to be oriented toward the inflating cover portion 48 in the unfolding process: after the vertical folding step to make left and right folds F1, the cover-portion folding is applied to make the fold F0, and then the roll-folding and the folding of the ends 50b are applied and, the airbag is housed in the case 13.

Here, if the case 13 to house the airbag 40D has a sufficient transverse width, the vertical folding step to make the folds F1, and the second vertical folding step of folding the ends 50b of the roll-folded portion 50 to form the folds FL and FR may be appropriately omitted.

Moreover, in the airbag 40D of the second airbag device S2, the portion 49 is folded back toward the vertical (longitudinal) and transverse center O2 of the airbag 40D. However, it is sufficient that the portion 49 pushes the lower end Ab of the accessory A such that the portion 49 may not contact with the lower end Ab of the accessory A along the axial direction of the lower end Ab, or such that the lower end Ab of the accessory A may not be directed toward the inflating cover portion 48. Accordingly, for example, one of the left and right edge side of the airbag where the portion 49 is located, the right edge 40d side in the accompanying drawings, may be folded toward the transverse center O1 of the airbag 40D over the entire length. The roll-folding step is applied thereafter.

FIGS. 22 to 25 illustrate an airbag 40E of a third embodiment S3 of the knee-protecting airbag device of the present invention. The airbag 40E includes a primary inflatable portion 66 and a secondary inflatable portion 67. The primary inflatable portion 66 is inflatable from initial stage of inflow of inflation gas G, and includes an area of the general portion 47 as its part. The secondary inflatable portion 67 starts to inflate around when the primary inflatable portion 66 completes inflation. The damage prevention means M3 is constituted by a cover portion 48 located either in the area of the secondary inflatable portion 67 of the airbag 40E, or in the area near the secondary inflatable portion 67.

More specifically, the airbag 40E is made of a single woven cloth in which the driver's side wall 41 and the column side wall 42 are connected at lower end 40b. The cloth is folded in two at the lower end 40b, and is sewn up with stitching yarn 69 at outer periphery to form the airbag 40E. The walls 41 and 42 are partially stitched together by breakable stitching yarn 70 as a volume expanding means, thereby locating the primary inflatable portion 66 inflatable from the initial stage of inflow of inflation gas G and, the secondary inflatable portion 67 starting to inflate around when the primary inflatable portion 66 completes inflation.

The airbag 40E has a similar construction to the airbag 40 in the first airbag device S1, except in that tethers 45 and 46 are located symmetrically as in the airbag 40D in the second airbag device S2, and in being partially stitched up by the stitching yarn 70. Accordingly, descriptions of similar members will be omitted by designating them common reference numerals. The case 13, the inflator 21, and the airbag cover 29 in the airbag device S3 are also similar to those in the first airbag device S1, and thus the descriptions will be omitted.

The primary inflatable portion 66 is so located that, when completely inflated, at least a part of the upper end 40a of the airbag 40E is deployed near a position of the airbag 40E as completed inflation. In other words, in the foregoing embodiment, the primary inflatable portion 66 includes the upper edge part of the upper end 40a of the airbag 40E except the area of the cover portion 48, or the general portion 47, as its outer periphery.

The primary inflatable portion 66 includes portions 66a and 66b extending substantially straightly from the lower end 40b to the upper end 40a of the airbag 40E completely inflated. In the third knee-protecting airbag device S3, the primary inflatable portion 66 includes a straight portion 66a at the side of the left edge 40c of the airbag 40E, and a straight portion 66b at the side of the right edge 40d. These straight portions 66a and 66b are out of locations of the tethers 46 and 45 in the vertical (longitudinal) direction of the airbag 40E, and thus allow inflation gas G from the inflator 21 located in the lower end 40b side of the airbag 40E to flow quickly and straightly toward the upper end 40a.

The secondary inflatable portion 67 is located in a substantially rectangular area in the upper end 40a of the airbag 40E to include a cover portion 48. The secondary inflatable portion 67 is formed by stitching up the walls 41 and 42 by means of the stitching yarn 70 at U-shaped stitch portion (joint portion) 68 at the outer periphery except part of the outer periphery of the walls 41 and 42. Breaking strength of the stitching yarn 70 is predetermined such that the yarn 70 breaks when inner pressure of the airbag 40E reaches s predetermined level after the primary inflatable portion 66 completes inflation, and inflates the secondary inflatable portion 67 swiftly.

To manufacture the airbag 40E, not-shown cloth members 45a and 46a are firstly stitched to predetermined locations of a single sheet member to form the airbag 40E before the sheet member is folded in two at the side of the lower edge 40b. There are preliminarily punched through holes 43a and 43b in the sheet member. Then the cloth members 45a and the cloth members 46a are stitched up, respectively. Subsequently, the sheet member is folded in two at the lower edge 40b, and is stitched up at the outer periphery of the driver's side wall 41 and the column sidewall 42. By forming the stitch portion 68 with the stitching yarn 70, then, the airbag 40E is formed. The outer periphery of the walls 41 and 42 is left unstitched partially so that an inflator 21 may be inserted therefrom.

Assemblage of the airbag device S3 begins with housing of the assembled inflator 21 in the airbag 40E so that individual bolts 23d are protruded from the through holes 43a and the end of the inflator body 22 is protruded from the through hole 43b. Subsequently, the unstitched part of the outer periphery of the walls 41 and 42 are stitched up, and then the airbag 40E is folded to fit in the case 13.

Figure 24A:
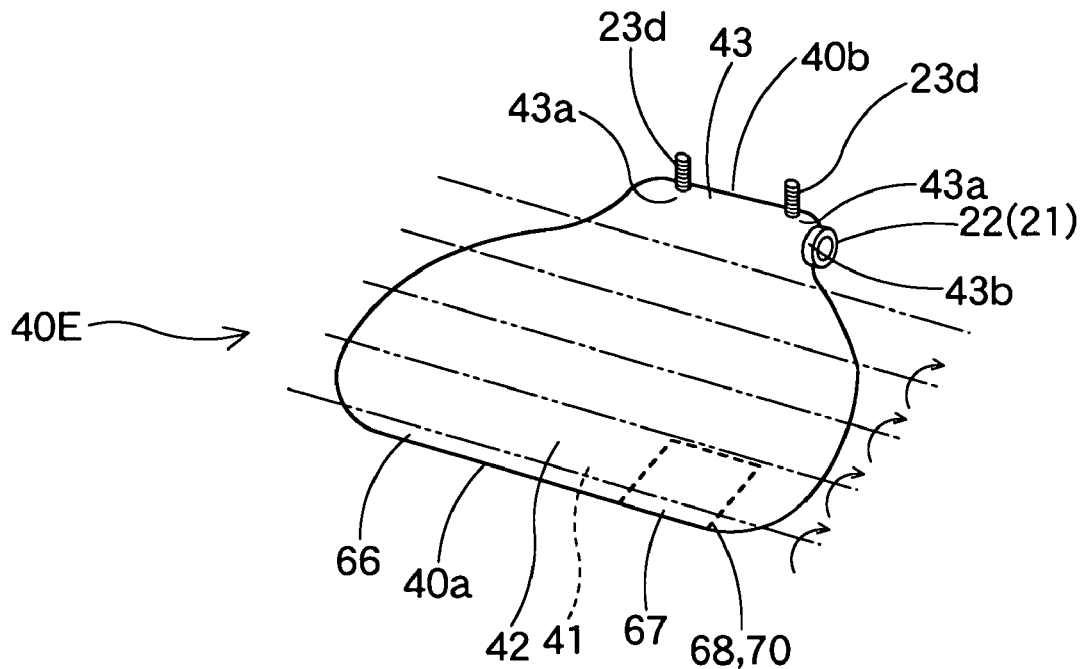
FIGS. 24A to 24C illustrate a folding process of the airbag of FIG. 22.
Figure 24B:
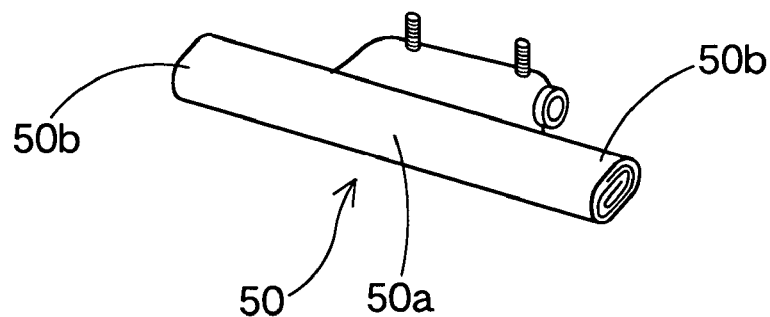
Figure 24C:
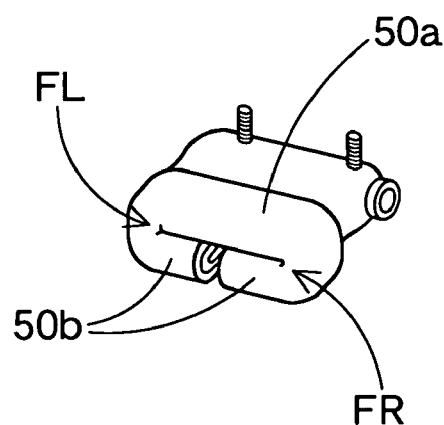

The airbag 40E is folded through a transverse folding step to form folds along the transverse direction, and a vertical folding step to adjust transverse width of the airbag 40E on folds along the vertical (longitudinal) direction. In the third airbag device S3, the vertical folding step is applied after the transverse folding step. More specifically, from flat expanded state in which the column cover side wall 42 and the driver's side wall 41 are overlaid on each other as shown in FIG. 24A, the airbag 40E is roll-folded on the column side wall 42 on folds along the transverse direction so that the upper edge 40a is brought close to the lower end 40b, as shown in FIGS. 24A and 24B. In the vertical folding step, subsequently, left and right ends 50b of the roll-folded portion 50 are folded back to be located below a center of the folded portion 50, as shown in FIGS. 24B and 24C.

After the folding process, the airbag 40E is wrapped around by not-shown breakable wrapping film for keeping the folded shape, and housed in the case 13 as in the first airbag device S1. Then the airbag cover 29 is attached to the case 13 to form the airbag device S3, and the airbag device S3 is mounted on the vehicle.

After mounted on the vehicle, if the inflator 21 is actuated, the airbag 40E admits inflation gas from the inflator 21 and protrudes from the case 13, then deploys while unfolding in substantially inverse processes to the folding process. More specifically, in the course of deployment, the inflating airbag 40E raises the ends 50b of the folded portion 50, and raises its upper edge 40a up to the vicinity of the upper end 5b of the column cover 5 along the lower (rear) surface 5a of the column cover 5 while unfolding the roll-folding, as shown in FIG. 9.

Figure 25A:
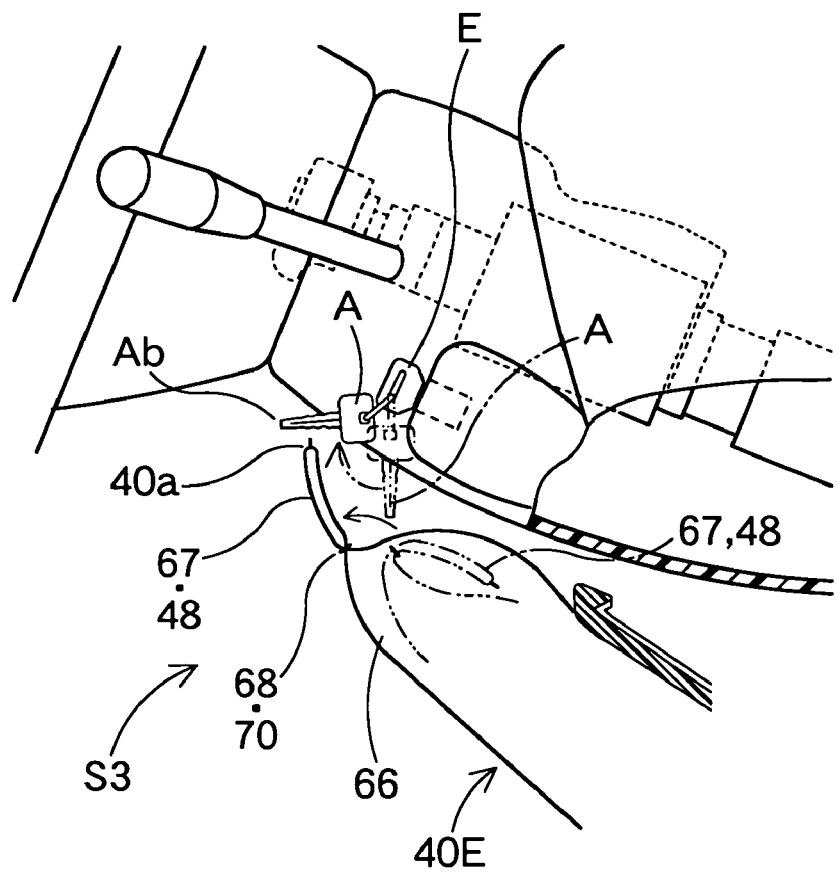
FIGS. 25A and 25B is a side view showing the actuated knee-protecting airbag device of the third embodiment in order.
Figure 25B:
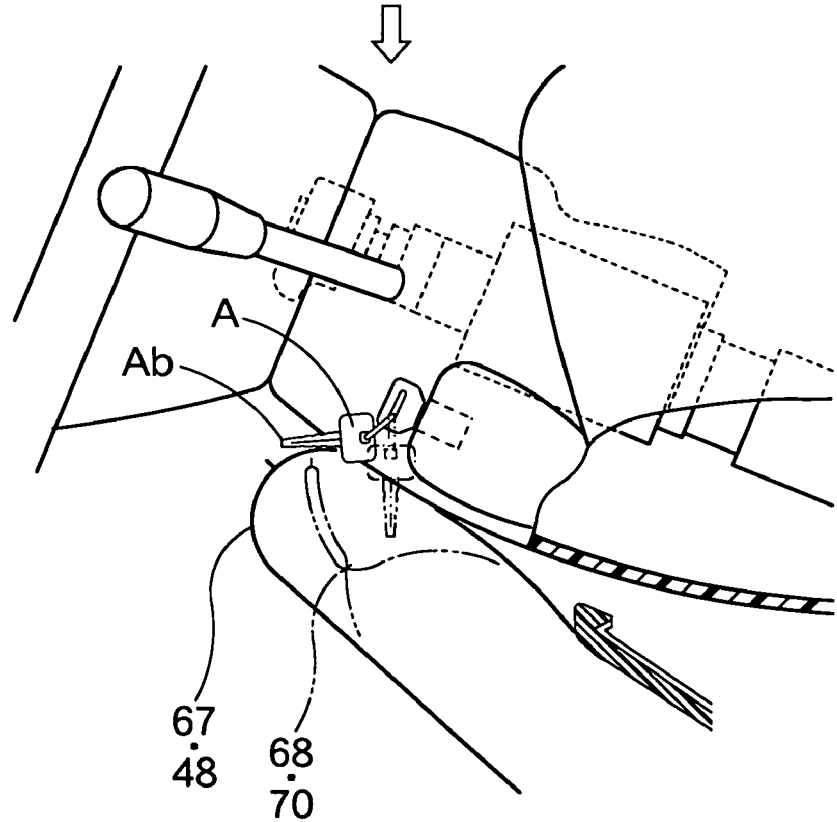

In the foregoing embodiment, the airbag 40E includes the cover portion 48 for covering the vehicle's rear side of the region of the key cylinder 6 when inflated completely, and the cover portion 48 is located in the area of the secondary inflatable portion 67 of the airbag 40E. Accordingly, since the cover portion 48 has admitted little gas and thus is thin plate-shaped in the initial stage of deployment, as shown in FIG. 25A, even if an accessory A is hung down from the key E inserted into the key cylinder 6, the cover portion 48 does not contact with the lower end Ab of the accessory A in a damageable manner, but instead would repel the accessory A. As shown in FIG. 25B, thereafter, the cover portion 48 is able to inflate smoothly without leaking gas. Here, if the cover portion 48 contacts with the lower end Ab of the accessory A perpendicularly in a thickly inflated condition, not in a thin plate-shaped condition, the cover portion 48 may be damaged by the accessory A and leak inflation gas.

This airbag 40E is able to complete inflation of the primary inflatable portion 66 swiftly since the capacity to inflate is reduced by the capacity of the secondary inflatable portion 67. Upon completing inflation, especially, the primary inflatable portion 66 locates the upper end 40a of the general portion 47 near a position of the airbag 40E as completed inflation. Accordingly, the entire airbag 40E is able to locate itself in front of the knees K of the driver D before the knees K come upfront. The knees K of the driver D are properly protected by the completely inflated primary inflatable portion 66 and the secondary inflatable portion 67 to inflate thereafter.

Therefore, the third knee-protecting airbag device S3 is able to thrust the airbag 40E in between the driver's knees K and the column cover 5 or the lower panel 10b as members of the vehicle body B easily even if advancing speed of the knees K is fast, and thus the knees K of the driver D are properly protected.

In the third embodiment, the airbag 40E is formed into substantially plate shape including the column side wall 42 located toward the steering column 2 as completely deployed and the driver's side wall 41 located toward the driver D. In the airbag 40E, the primary inflatable portion 66 and the secondary inflatable portion 67 are formed by the breakable stitching yarn 70 stitching up the column side wall 42 and the driver's side wall 41. With this arrangement, the primary inflatable portion 66 and the secondary inflatable portion 67 are formed easily only by stitching up the column side wall 42 and the driver's side wall 41 of the airbag 40E by the breakable stitching yarn 70, so that the manufacturing of the airbag 40E is facilitated. Especially, since the airbag 40E in the foregoing embodiment is stitched up by the stitching yarn 69 also at the outer periphery of the walls 41 and 42, it is easily manufactured through the stitching work employing two stitching yarns 69 and 70.

It will also be appreciated to releasably join the walls 41 and 42 at the stitch portion (joint portion) 68 or at an area defined by the stitch portion (joint portion) 68 (the area of the secondary inflatable portion 67) by means of adhesive to form the primary inflatable portion 66 and the secondary inflatable portion 67. Of course, adhesion strength of the joint portion 68 in this case is predetermined such that the walls 41 and 42 at the joint portion 68 are released from each other when the inner pressure of the airbag 40E reaches predetermined level after the primary inflatable portion 66 completes inflation, and inflates the secondary inflatable portion 67.

In the third embodiment, moreover, the primary inflatable portion 66 of the airbag 40E includes the portions 66a and 66b that extend substantially straightly from the lower end 40b to the upper end 40a of the airbag 40E as completely inflated. These straight portions 66a and 66B help inflation gas G discharged from the inflator 21 to flow toward the upper end 40a from the lower end 40b side smoothly, so that the upper end 40a of the airbag 40E is deployed in position quickly, and the entire airbag 40E is deployed in front of the knees K of the driver D before the knees K advance.

The airbag 40E of the third knee-protecting airbag device S3 includes the secondary inflatable portion 67 with small volume. However, it will also be appreciated, as an airbag 40F shown in FIG. 26, that an I-shaped secondary inflatable portion 67 with big volume is formed in the central area of the airbag 40F to the upper end 40a including center parts of the tethers 45 and 46, while the primary inflatable portion 66 is formed in an area of the left edge 40c, right edge 40d, and lower edge (lower end) 40b of the airbag 40F symmetrically U-shaped as viewed from front side. In the airbag 40F, the stitch portion 68 is formed in a U-shaped portion in the outer periphery of the secondary inflatable portion 67 except the outer periphery of the walls 41 and 42 by means of the stitching yarn 70.

Figure 27A:
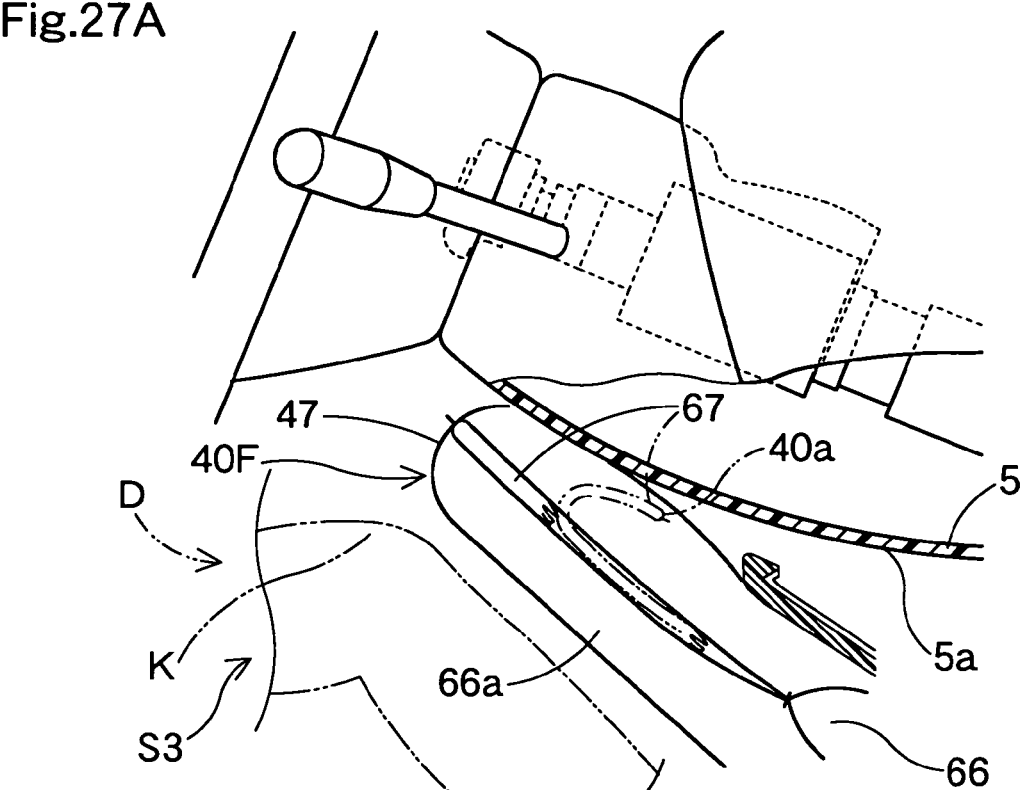
FIGS. 27A and 27B is a side view showing the actuated knee-protecting airbag device employing the airbag shown in FIG. 26 in order.
Figure 27B:
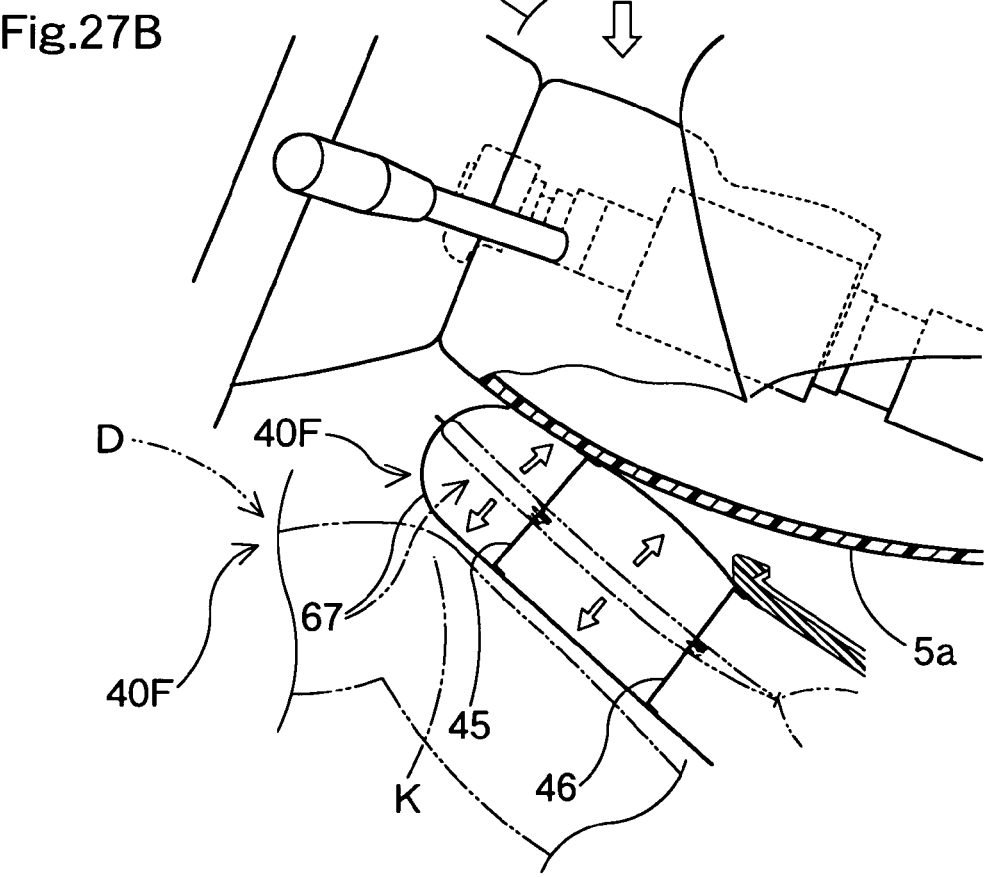
Figure 28:
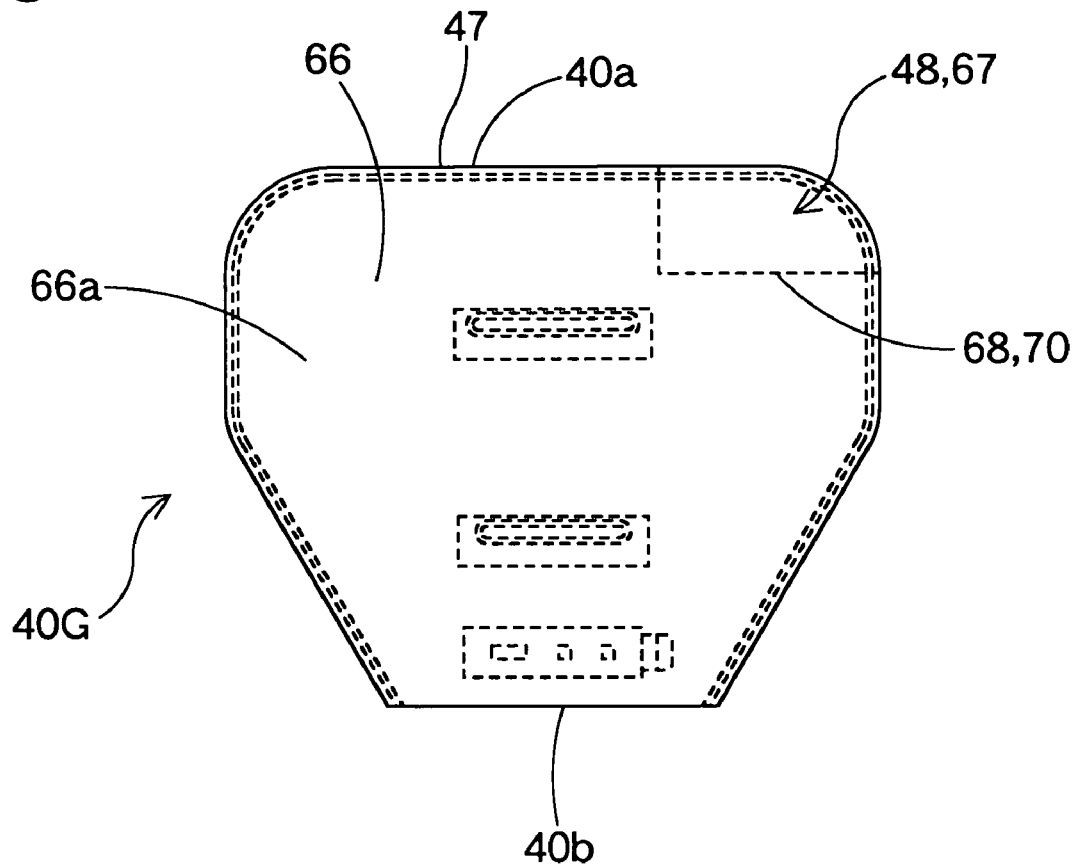
FIG. 28 is a schematic front view of another modification of the airbag of FIG. 22, as flatly developed with an inflator located inside thereof.
Figure 29:
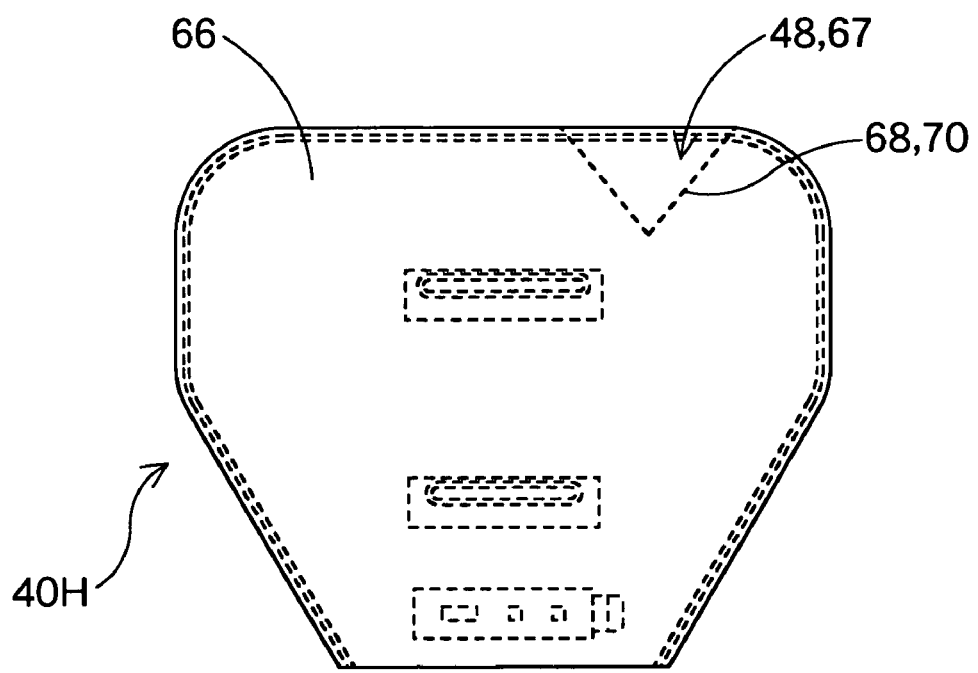
FIG. 29 is a schematic front view of yet another modification of the airbag of FIG. 22, as flatly developed with an inflator located inside thereof.
Figure 30:
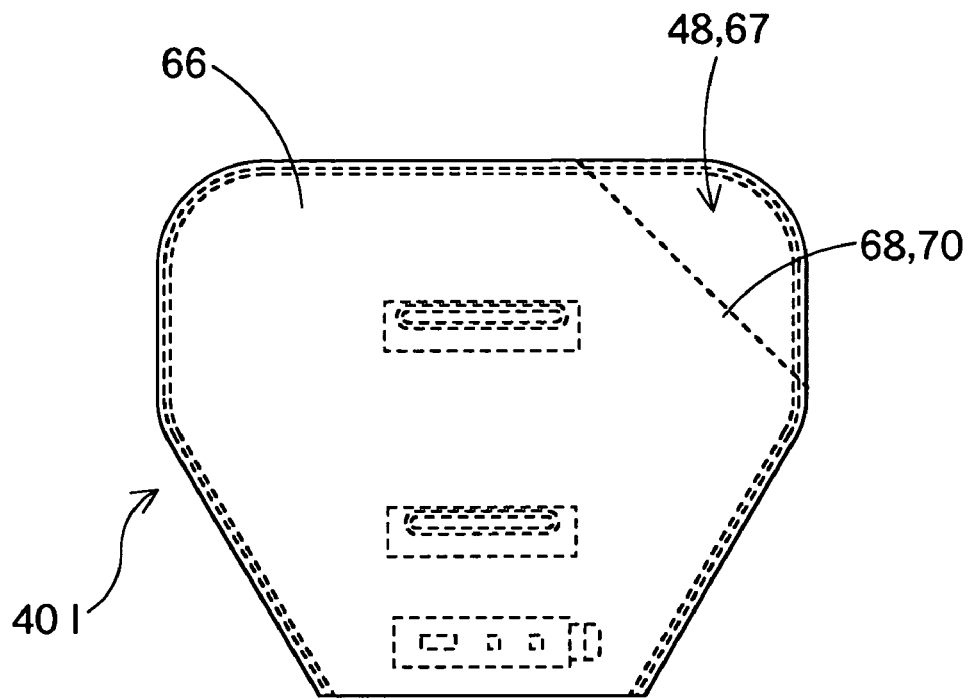
FIG. 30 is a schematic front view of still another modification of the airbag of FIG. 22, as flatly developed with an inflator located inside thereof.
Figure 31:
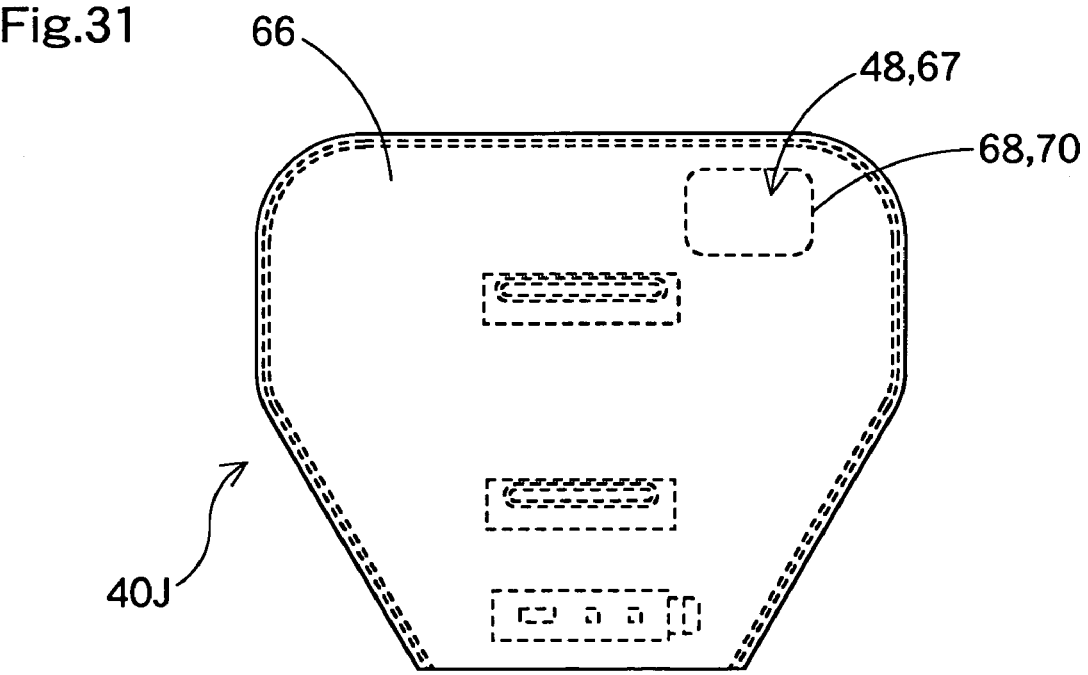
FIG. 31 is a schematic front view of still another modification of the airbag of FIG. 22, as flatly developed with an inflator located inside thereof.

Referring to FIGS. 27A and 27B, when the knee-protecting airbag device S3 employing the airbag 40F is actuated, the straight portions 66a and 66b located in the left and right sides of the airbag 40F firstly complete inflation, and then the stitching yarn 70 breaks and allows the secondary inflatable portion 67 located in the center of the airbag 40F and below the lower (rear) surface 5a of the column cover 5 to inflate. That is, the portion 67 to be located below the lower surface 5a of the column cover 5, which is close to the driver D and has a narrow space between itself and the driver D, is deployed in a thin condition in the initial stage of inflation of the airbag 40F, so that the airbag 40F is easily deployed even if there is only a narrow space between the column cover lower surface 5a and the knees K of the driver D.

Figure 26:
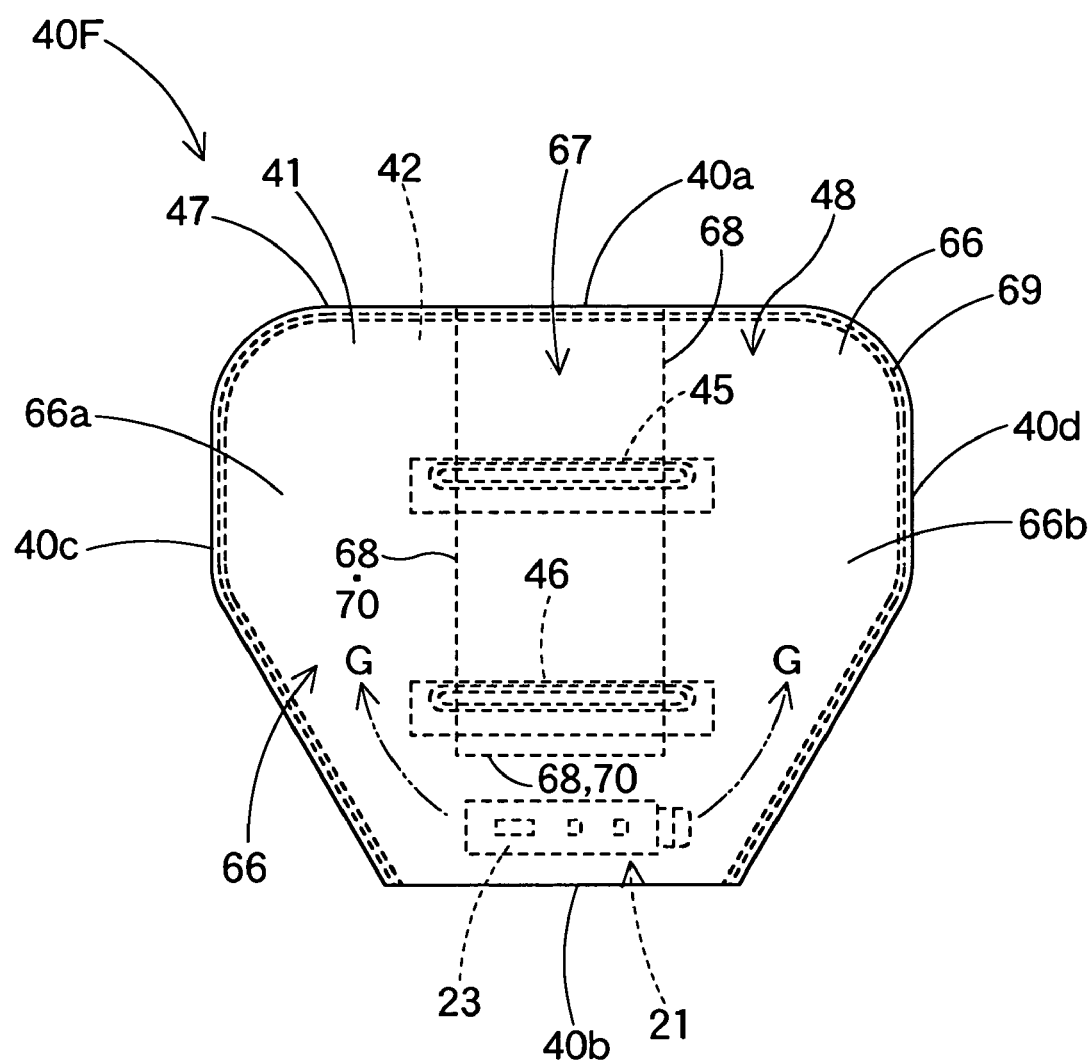
FIG. 26 is a schematic front view of a modification of the airbag of FIG. 22, as flatly developed with an inflator located inside thereof.

Of course, instead of such a secondary inflatable portion 67 with big volume as in the airbag 40F shown in FIGS. 26 and 27, a small secondary inflatable portion 67 may be located in the area of the cover portion 48, or in its vicinity, in half-round, rectangular, trapezoid, triangular, or round shape, like airbags 40G, 40H, 40I and 40J shown in FIGS. 28 to 31, to function as a damage prevention means M3. Here, the secondary inflatable portion 67 does not necessarily have to be a closed area closed by the stitch portion 68 by the stitching yarn 70 or closed by the stitch portion 68 and the outer periphery of the walls 41 and 42. Instead, as in airbags 40K or 40L shown in FIGS. 32 and 33, the secondary inflatable portion 67A, 67B or 67C may be formed by being partially enclosed with a plurality of straight or curved stitch portions 68. Furthermore, a single straight or curved stitch portion 68 is also able to form a secondary inflatable portion 67. For example, a secondary inflatable portion 67D shown in FIG. 33 is formed by a single stitch portion 68 itself and its vicinity.

Figure 32:
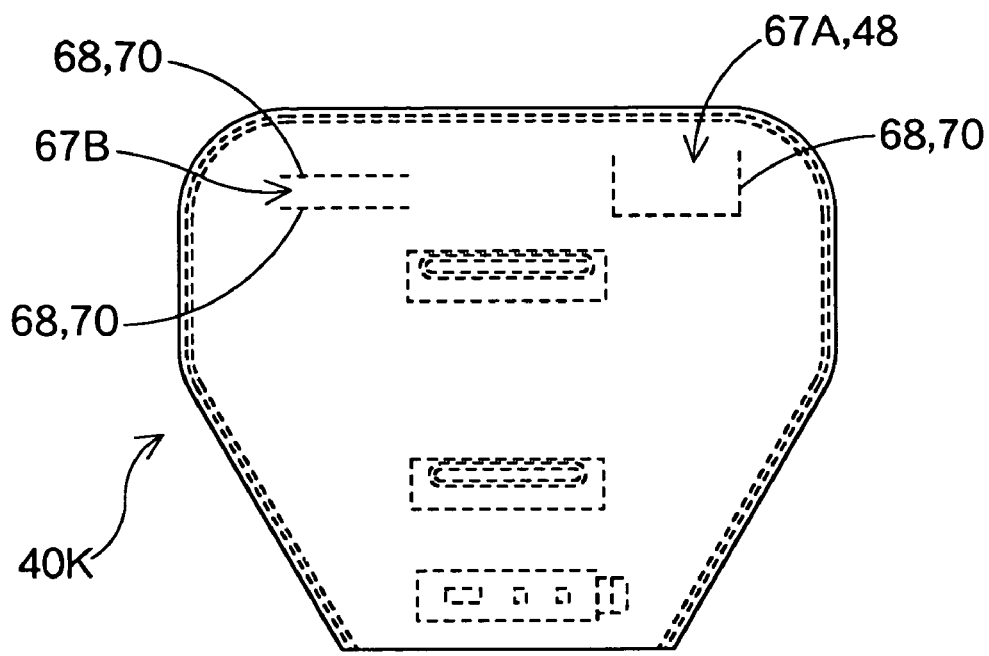
FIG. 32 is a schematic front view of still another modification of the airbag of FIG. 22, as flatly developed with an inflator located inside thereof.
Figure 33:
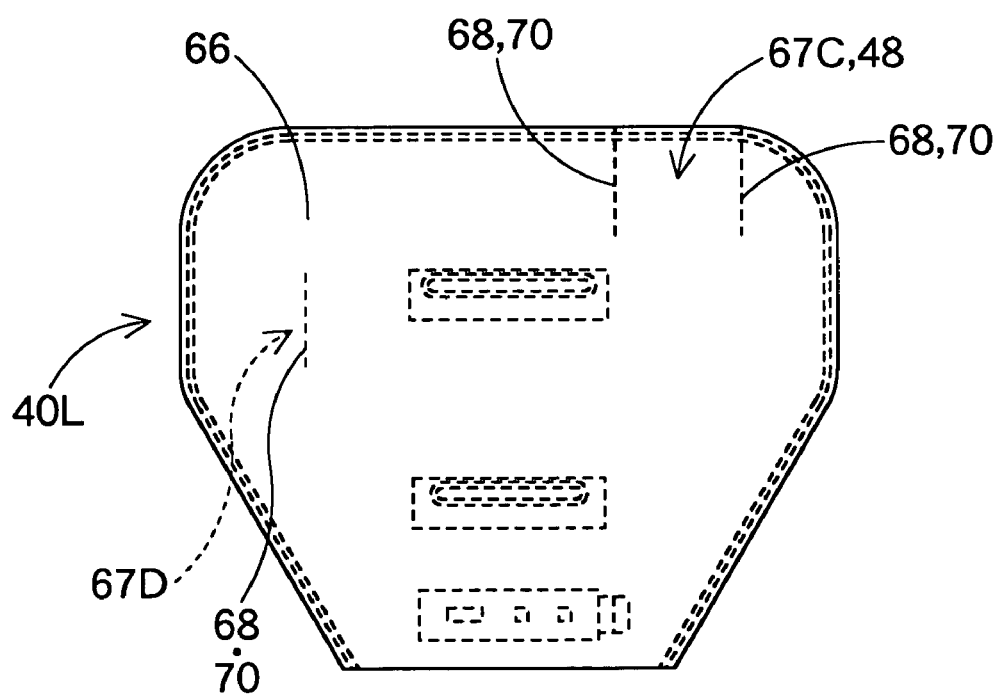
FIG. 33 is a schematic front view of still another modification of the airbag of FIG. 22, as flatly developed with an inflator located inside thereof.

Although the secondary inflatable portions 67B and 67D are located in positions away from the cover portion 48 in FIGS. 32 and 33, the secondary inflatable portions 67B and 67D having the same arrangement may of course be located in the area of the cover portion 48 or in its vicinity, as a damage prevention means M3.

Figure 34:
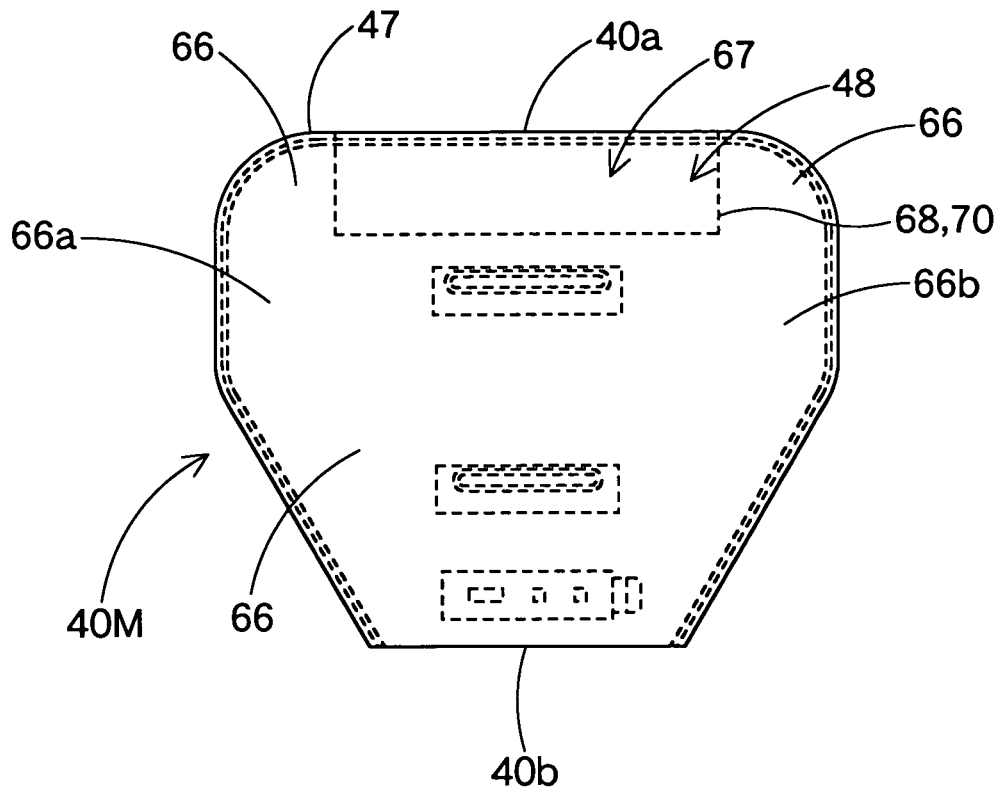
FIG. 34 is a schematic front view of still another modification of the airbag of FIG. 22, as flatly developed with an inflator located inside thereof.

Moreover, if the secondary inflatable portion 67 is formed symmetrically relative to the center of the airbag as in the airbags 40F and 40M shown in FIGS. 26 and 34, the airbags 40F and 40M will also inflate symmetrically, so that the airbags 40F and 40M are able to deploy balancedly.

Figure 35:
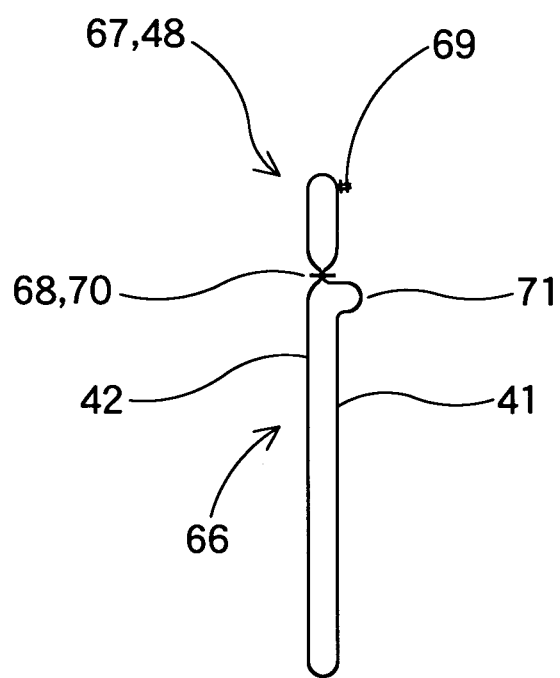
FIG. 35 is a partial vertical section of still another modification of the airbag of FIG. 22.

Furthermore, in the case the stitch portion 68 is formed, the stitch portion 68 may be formed not only with the walls 41 and 42 overlaid on each other flatly, but also with either one of the walls 41 or 42 tucked, as a tucked portion 71 shown in FIG. 35.

When the stitch portion 68 is formed by the stitching yarn 70, the stitch portion 68 may be formed not only by a single stitching, but also by multiple stitching such as double stitching.

Although the third airbag device S3 is shown as an airbag device for a driver, it may also be applied to a knee-protecting airbag device located in front of front passenger's seat, considering quick deployment of the airbag but not the cover portion 48.

Figure 36:
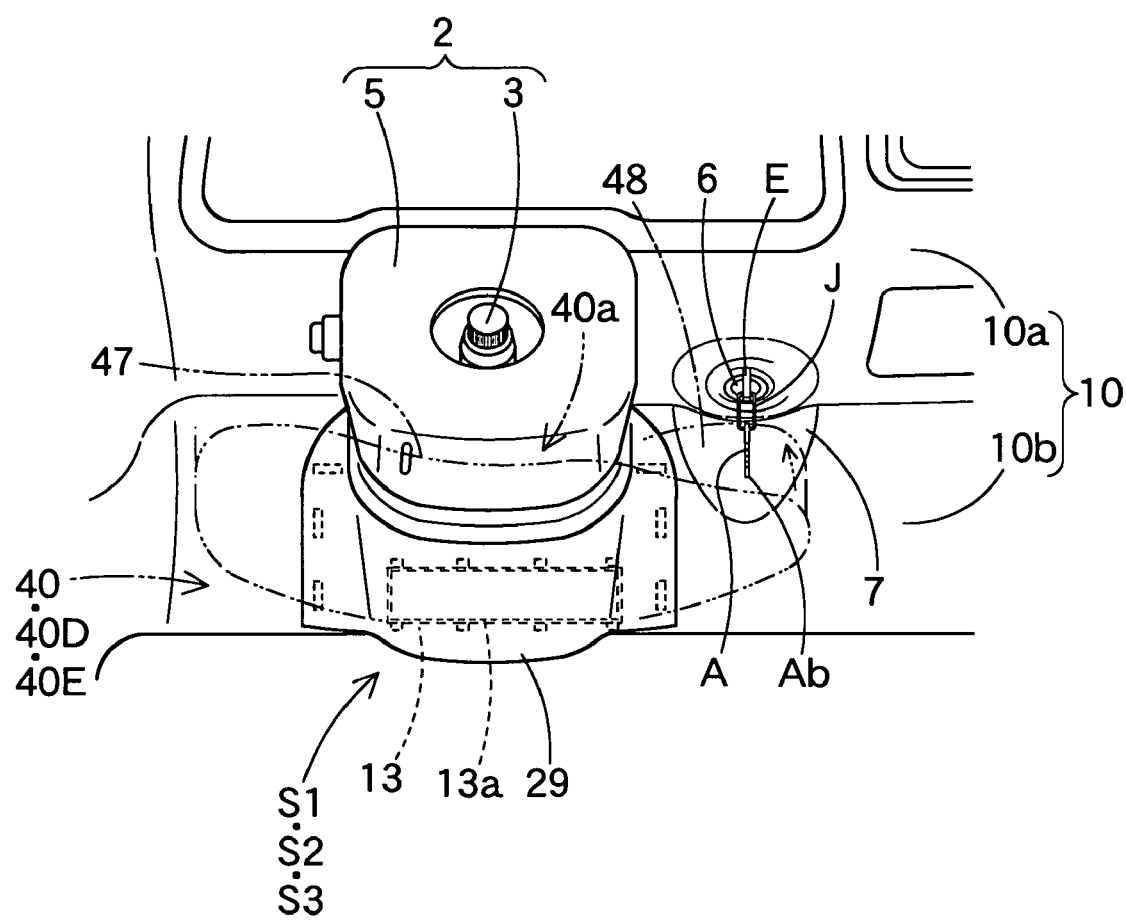
FIG. 36 is a schematic front view of a modification of the embodiments of the knee-protecting airbag device described in the present specification.

Although the foregoing embodiments show the key cylinder 6 located in the steering column 2 (column cover 5) itself, the present invention can also be applied to a case in which the key cylinder 6 is located on the dashboard 10 or on the upper panel 10a as shown in FIG. 36, if the airbags for the knee-protecting airbag device 40, 40A, 40B, 40C, 40D, 40E, 40F, 40G, 40H, 40I, 40J, 40K 40L and 40M include a cover portion 48 to contact with the accessory A of the key E inserted in the key cylinder 6.

Furthermore, if the key cylinder 6 is located on the left side face of the column cover 5, or on the dashboard 10 apart leftward from the column cover 5, the present invention can also be applied by forming a cover portion in the airbag to contact with the accessory A of the key E inserted in the key cylinder 6.

Figure 37:
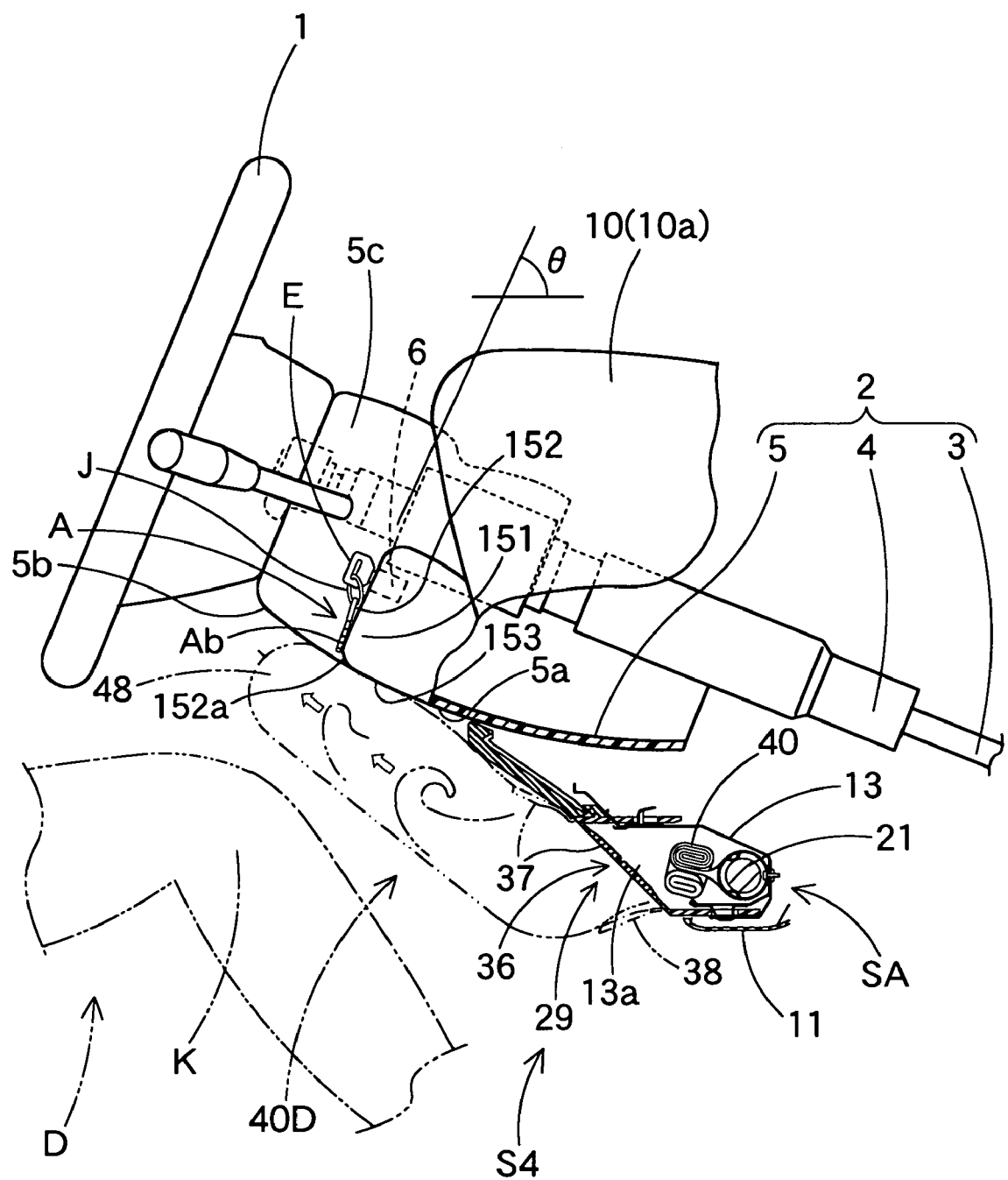
FIG. 37 is a schematic vertical section of a fourth embodiment of the knee-protecting airbag device according to the present invention in action, taken along the longitudinal direction of the vehicle.

FIGS. 37 and 38 illustrate the fourth embodiment S4 of the knee-protecting airbag device of the present invention. The airbag device S4 is located below the steering column 2 in front of a driver D for protecting knees K of the driver D. The airbag device S4 includes a folded airbag 40D, an inflator 21 for supplying the airbag 40D with inflation gas, a housing case 13 opened rearward for housing the folded airbag 40D and the inflator 21, an airbag cover 29 for covering vehicle's rearward of the case 13, and a damage prevention member 151 located near the key cylinder 6.

Here, the fourth airbag device S4 differs from the first airbag device S1 in that it employs the airbag 40D of the second airbag device S2, that the airbag 40D is folded in the folding process illustrated in FIG. 11, and that it also includes the damage prevention member 151. However, other constructions are similar to those of the first airbag device S1. Accordingly, similar members will be designated common reference numerals, and descriptions of those members will be omitted.

In the foregoing embodiment, the damage prevention member 151 is formed integrally with the column cover 5 on the right side face 5c of the column cover 5, and is located to encircle at least the lower side of the key cylinder 6. The damage prevention member 151 includes a receiving plane 152 and a guide plane 153. The receiving plane 152 is extended obliquely down and rearward from the leading end plane (upper end plane) of the key cylinder 6, substantially in parallel with the upper end plane of the key cylinder 6, and is adapted to receive a key accessory A hung down from the key E from lower side. The guide plane 153 extends downward from the rear end 152a of the receiving plane 152 substantially in parallel with the lower surface 5a of the column cover 5, and is adapted to guide the inflating airbag 40D upward. Oblique angle θ of the receiving plane 152 descending rearward is predetermined such that the receiving plane 152 is able to support the key accessory A hung down from the key E on itself, and dimension of the receiving plane 152 is predetermined such that the lower end Ab of the key accessory A as supported on the receiving plane 152 may not contact with the airbag 40D rising along the guide plane 153 in the course of deployment.

The airbag device S4 is mounted on the vehicle in a similar manner to the first airbag device S1. More specifically, the case 13, the inflator 21, the airbag cover 29, and the airbag 40D are assembled together to form an airbag module SA, and the airbag module SA is mounted on the vehicle. After being mounted on the vehicle, when the inflator 21 is actuated to discharge inflation gas into the airbag 40D, the airbag 40D inflates and pushes doors 37 and 38 of the airbag cover 29, and breaks a breakable portion 36. Then the airbag 40D opens the doors 37 and 38 and protrudes rearward from an opening 13a of the case 13 as a housing portion of the airbag 40D. The airbag 40D further deploys upward along the column cover lower surface 5a of the steering column 2, and rises up to the vicinity of the upper end 5b of the column cover lower surface 5a.

Here, since the airbag 40D in the fourth embodiment is also roll-folded on the column side wall 42 in the transverse folding step to bring the upper edge 40a side toward the lower edge 40b side, as shown in FIG. 11, the airbag 40D develops along the lower surface 5a of the column cover 5 when unrolled, so that the airbag 40D is properly deployed between a space between the knees K of the driver D and the column cover lower surface 5a even if the space is narrow.

Figure 38A:
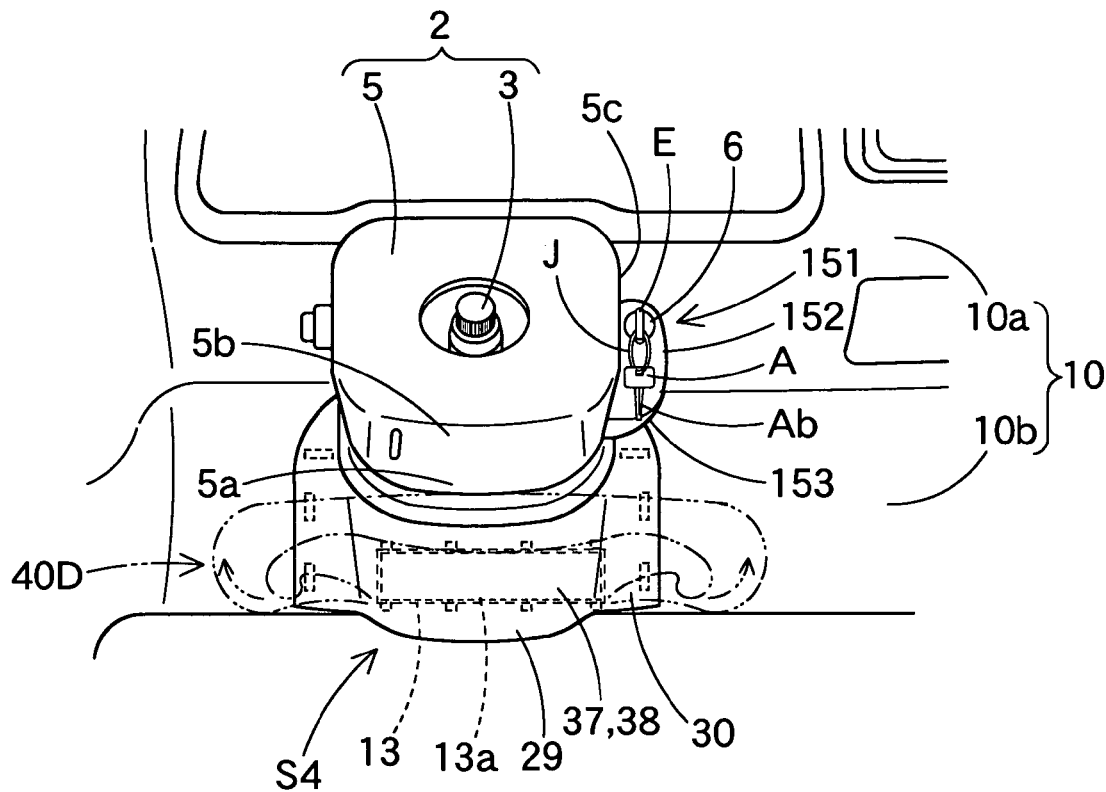
FIGS. 38A and 38B is a front view showing the actuated knee-protecting airbag device of FIG. 37 in order.
Figure 38B:
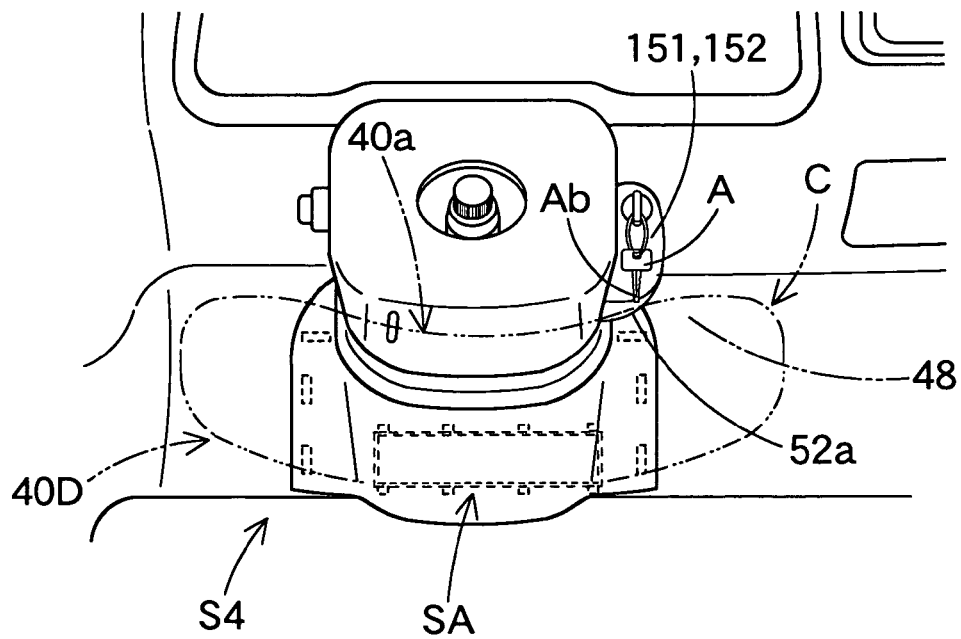

As referred to FIGS. 37, 38A and 38B, in the fourth knee-protecting airbag device S4, when the cover portion 48 of the airbag 40D deploys, the cover portion 48 is guided by the guide plane 153 below the receiving plane 152 of the damage prevention member 151 and rises, so that the cover portion 48 does not contact with the key accessory A supported on the receiving plane 152. Thus, gas leakage does not occur.

In the fourth knee-protecting airbag device S4, therefore, the inflating airbag 40D is not damaged by the key accessory A, and the knees K of the driver D are protected properly.

Besides, the damage prevention member 151 of the fourth embodiment only supports the key accessory A on its receiving plane 152 descending obliquely downward. Since there is a space around the key accessory A, the key accessory A on the receiving plane 152 is easy to hand-grasp. Therefore, the member 151 does not hinder such actions as pulling out the key E inserted in the key cylinder 6.

Figure 39:
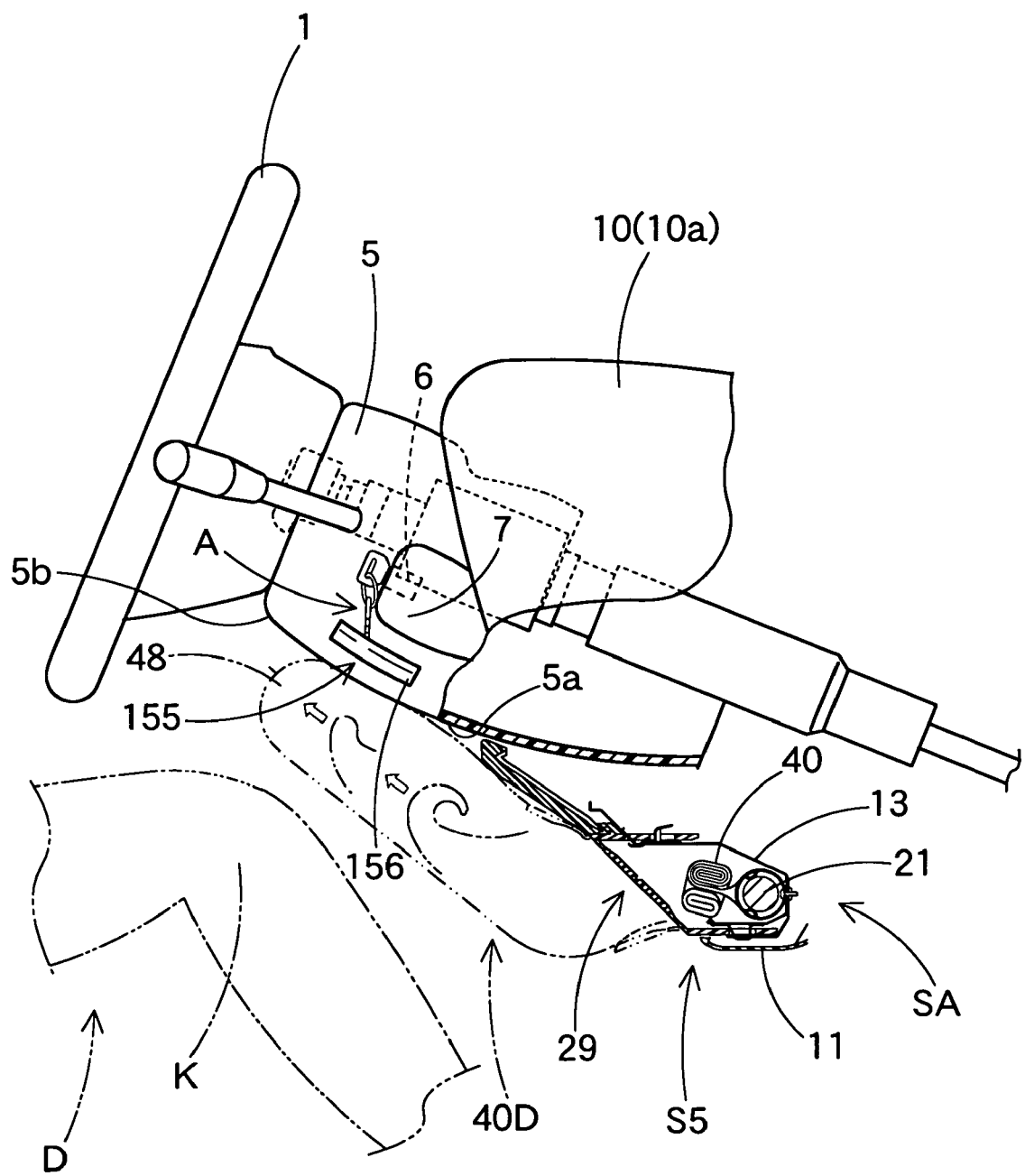
FIG. 39 is a schematic side view of a fifth embodiment of the knee-protecting airbag device according to the present invention.
Figure 40:
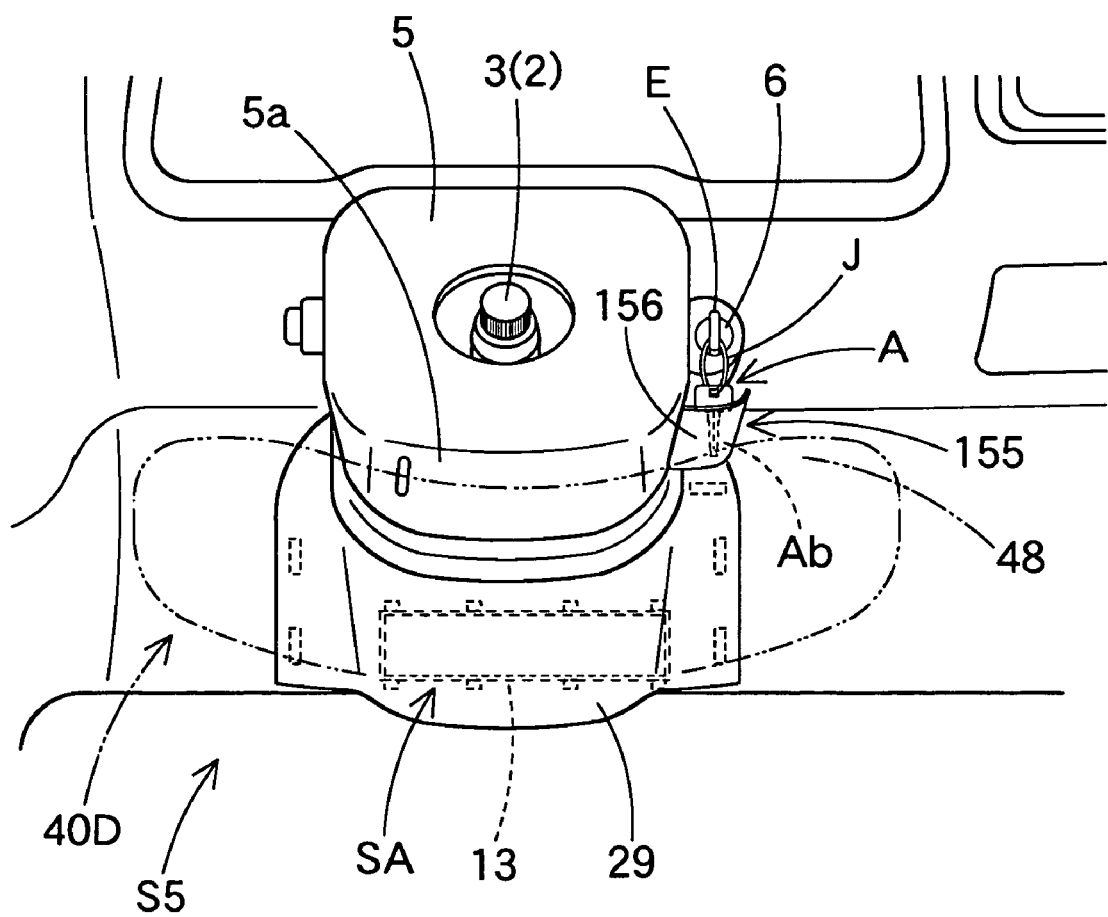
FIG. 40 is a schematic front view of the knee-protecting airbag device of FIG. 39.

A fifth embodiment S5 of the knee-protecting airbag device illustrated in FIGS. 39 and 40 includes a damage prevention member 155 protruded from the right side face 5c of the column cover 5 near the key accessory A in a curved plate shape for covering the lower side of the key accessory A. The damage prevention member 155 has its lower surface 156 function as a guide surface to guide the cover portion 48 of the inflating airbag 40D upward.

Here, the fifth knee-protecting airbag device S5 is equipped with the airbag module SA of the fourth embodiment, and differs from the airbag device S4 only in the damage prevention member 155. Thus, the folding process of the airbag 40D and the action of the airbag 40D in deployment are similar to those of the fourth airbag device S4.

When the airbag device S5 having the damage prevention member 155 is actuated, the cover portion 48 of the inflating airbag 40D is guided by the guide surface 156 or the lower surface of the damage prevention member 155 and rises, so that the cover portion 48 does not contact with the key accessory A covered by the damage prevention member 155. Thus, gas leakage does not occur. Moreover, since the damage prevention member 155 only covers the lower side of the key accessory A and leaves the right side opened, it does not hinder an operation of gripping the key accessory A.

Figure 41:
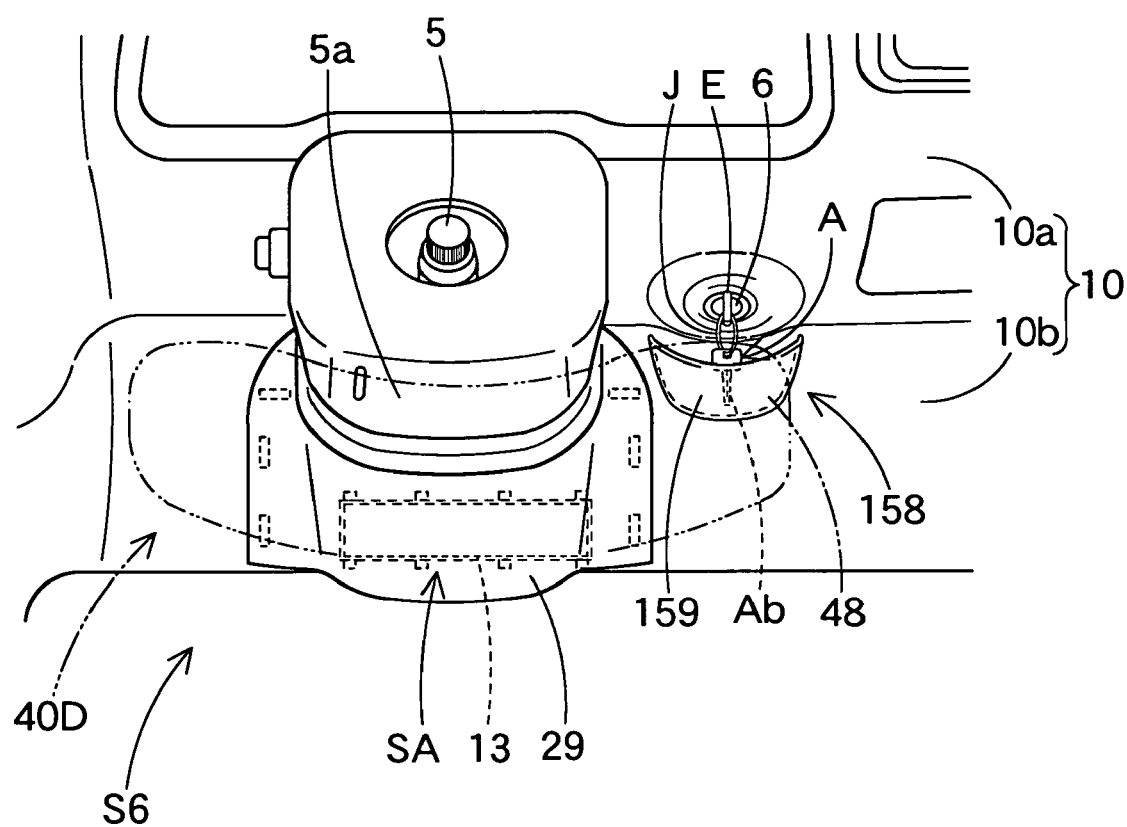
FIG. 41 is a schematic front view of a sixth embodiment of the knee-protecting airbag device.
Figure 42:
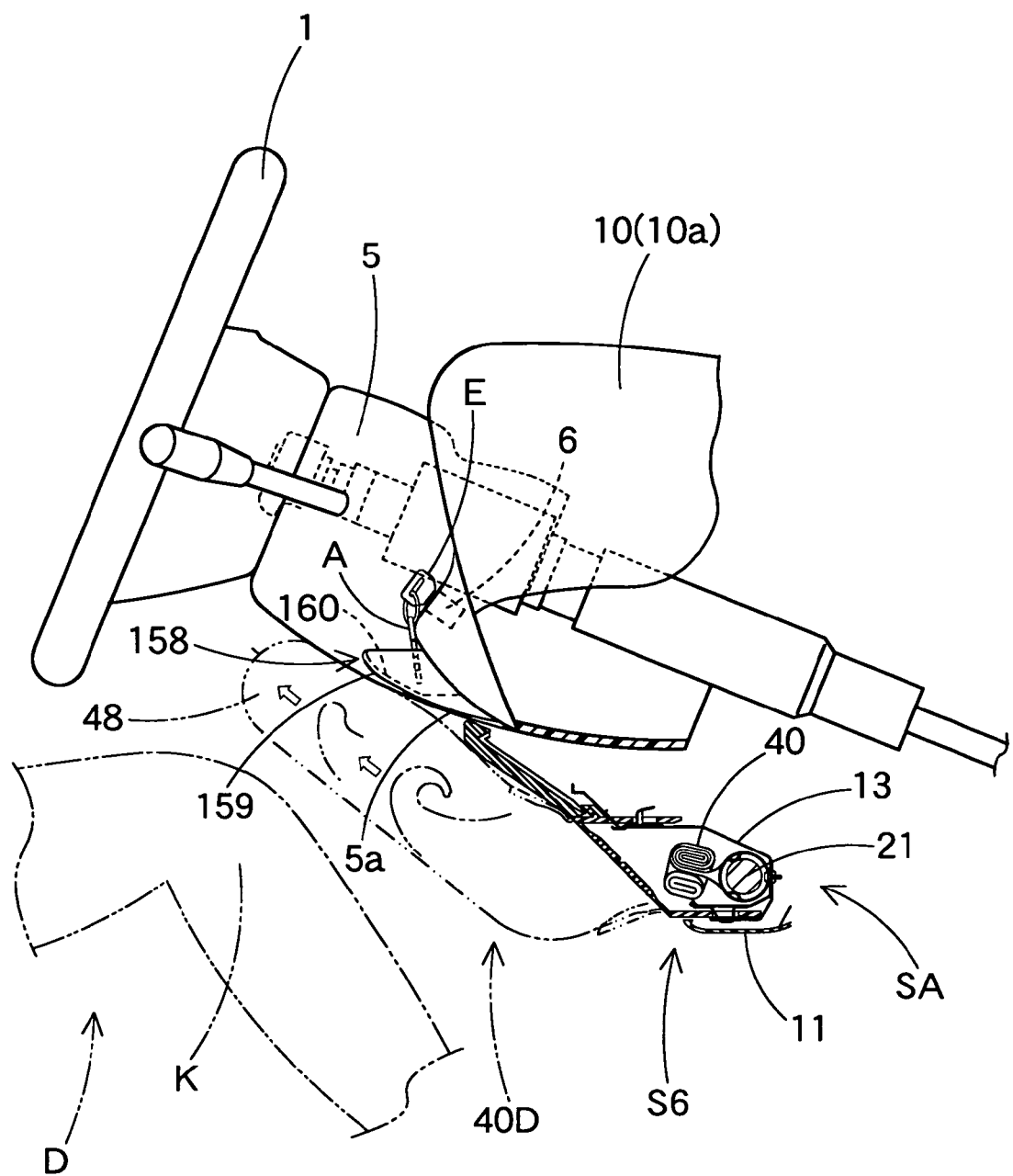
FIG. 42 is a schematic side view of the knee-protecting airbag device of FIG. 41.

A sixth embodiment S6 of the knee-protecting airbag device illustrated in FIGS. 41 and 42 includes a damage prevention member 158 that is protruded substantially horizontally rearward from the lower panel 10b near the key accessory A and has a cup-like shape recessed downward so as to cover the lower side of the key accessory A. The damage prevention member 158 has its lower surface 159 function as a guide surface to guide the cover portion 48 of the inflating airbag 40D upward.

Here, in a vehicle on which the knee-protecting airbag device S6 is to be mounted, the key cylinder 6 is not located in the steering column or the column cover 5 itself, but located in the dashboard 10 (in the upper panel 10a, in FIGS. 41 and 42). The sixth airbag device S6 is also equipped with the airbag module SA of the fourth embodiment, and differs from the airbag device S4 only in the damage prevention member 158. Thus, the folding process of the airbag 40D and the action of the airbag 40D in deployment are similar to those of the fourth airbag device S4.

When the airbag device S6 having the damage prevention member 158 is actuated, the cover portion 48 of the inflating airbag 40D is guided by the guide surface 159 or the lower surface of the damage prevention member 158 and rises, so that the cover portion 48 does not contact with the key accessory A covered by the damage prevention member 158. Thus, gas leakage does not occur. Moreover, the damage prevention member 158 can also be used as a coin holder which holds coins with its top surface 160 toward the key accessory A.

Figure 43:
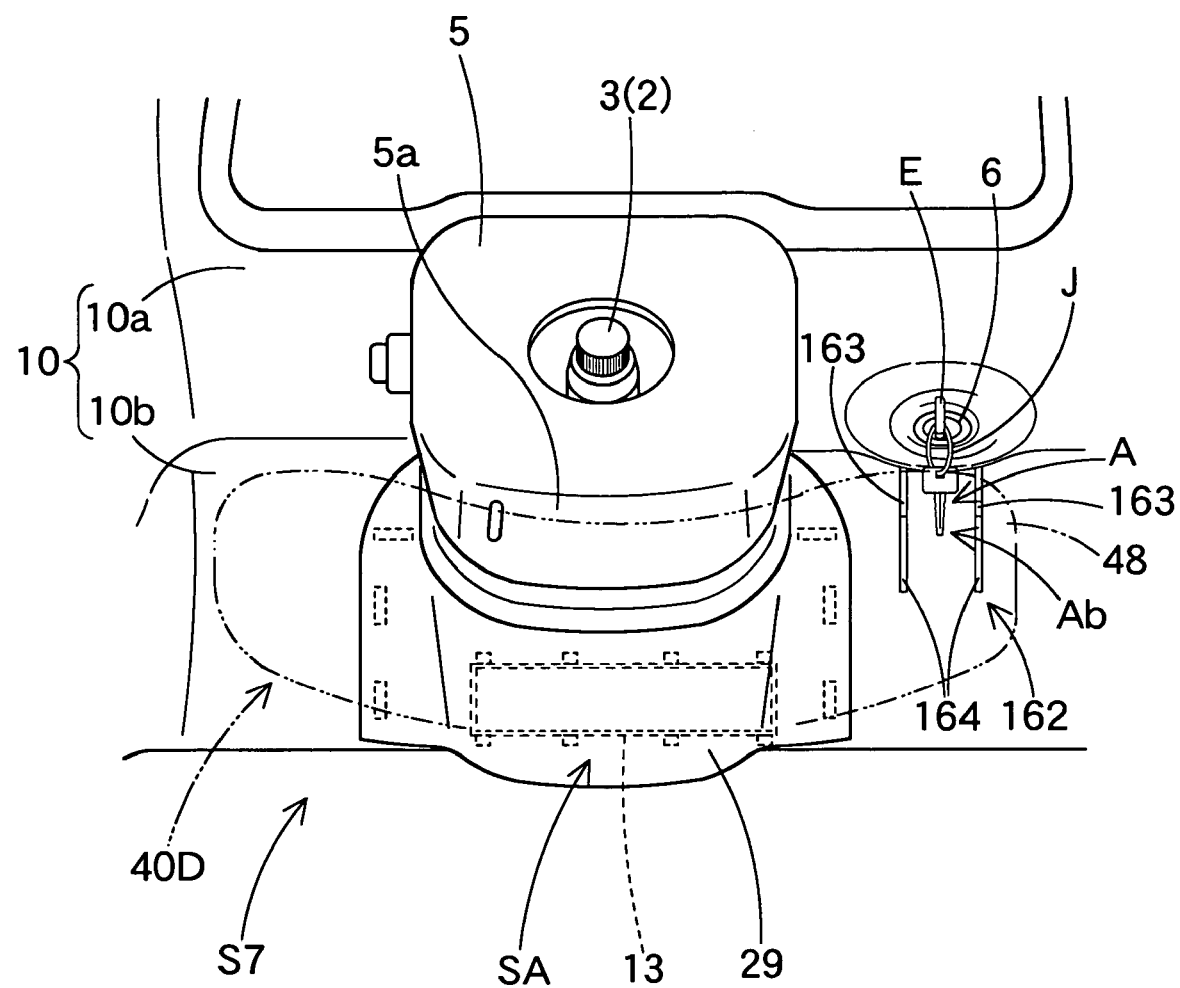
FIG. 43 is a schematic front view of a seventh embodiment of the knee-protecting airbag device.
Figure 44:
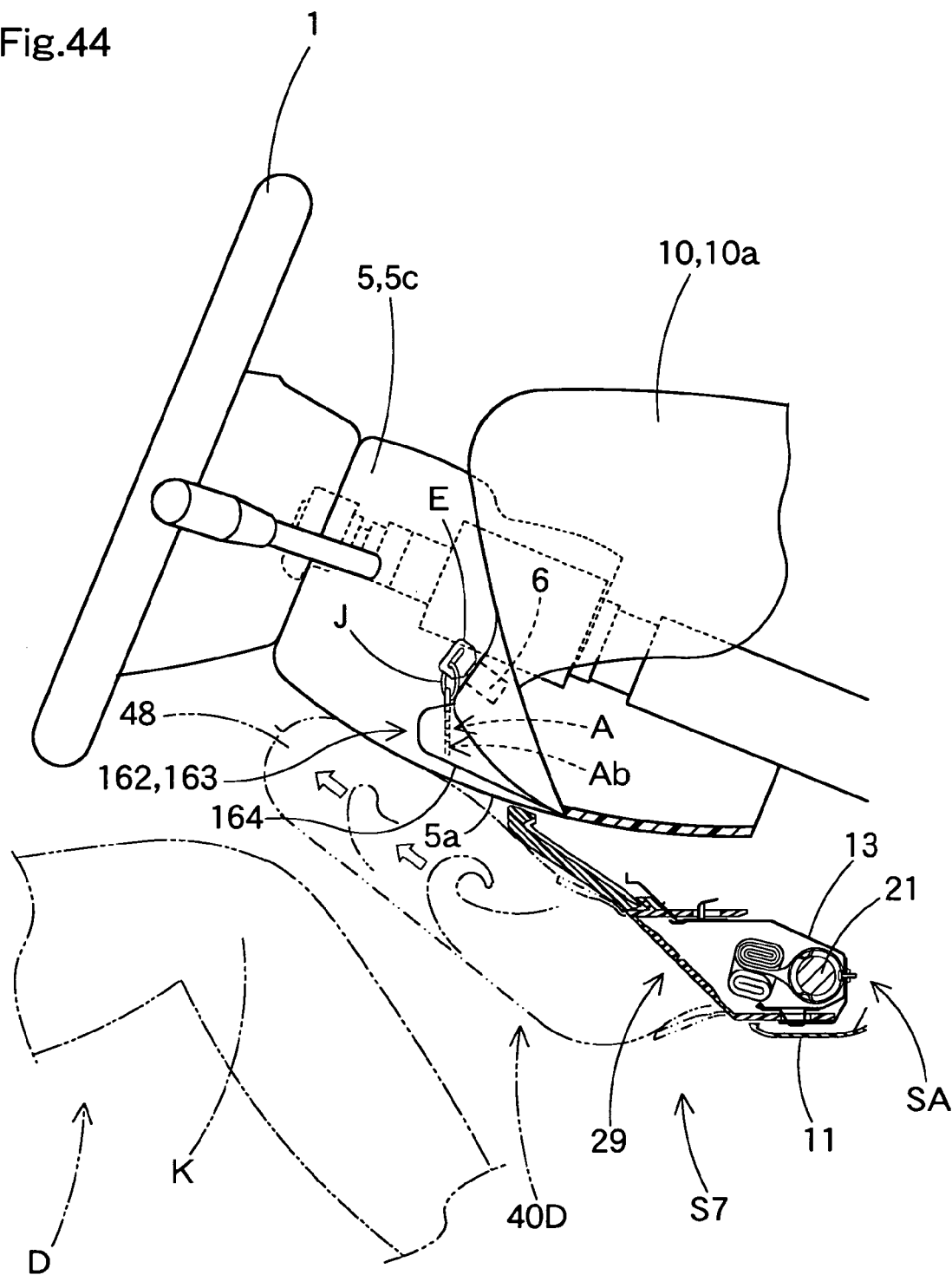
FIG. 44 is a schematic side view of the knee-protecting airbag device of FIG. 43.

A seventh embodiment S7 of the knee-protecting airbag device illustrated in FIGS. 43 and 44 includes a damage prevention member 162 constituted by ribs 163 protruded from sides of the key accessory A. FIGS. 43 and 44 show ribs 163 each of which has a trapezoid plate shape and is protruded rearward than the key accessory A from the left and right sides of the key accessory A in the lower panel 10b. The lower surfaces 164 of the ribs 163 are adapted to function as guide surfaces for guiding the deploying airbag 40D upward.

The seventh airbag device S7 is also equipped with the airbag module SA of the fourth embodiment, and differs from the airbag device S4 only in the damage prevention member 162. Thus, the folding process of the airbag 40D and the action of the airbag 40D in deployment are similar to those of the fourth airbag device S4.

In the airbag device S7 having the damage prevention member 162, the cover portion 48 of the inflating airbag 40D is guided by the guide surfaces 164 or the lower surface of the damage prevention member 162 protruded rearward than the key accessory A and rises, so that the cover portion 48 does not contact with the key accessory A. Thus, gas leakage does not occur. Moreover, since the rear side of the key accessory A between the ribs 163 is opened, the key accessory A is easy to hand-grip, and actions such as pulling out the key E inserted in the key cylinder 6 are not hindered. Provided that the cover portion 48 is prevented from contacting with the key accessory A, it will also be appreciated to locate the rib 163 at only either one of the left or right side of the key accessory A.

It will also be appreciated that the damage prevention member protruded from the periphery of the key accessory A is supported by a moving means movably between a preventing position and a housed position. In the preventing position, the damage prevention member prevents the damage of the airbag 40D, and in the housed position, the member is housed in the periphery of the key cylinder 6.

Figure 45A:
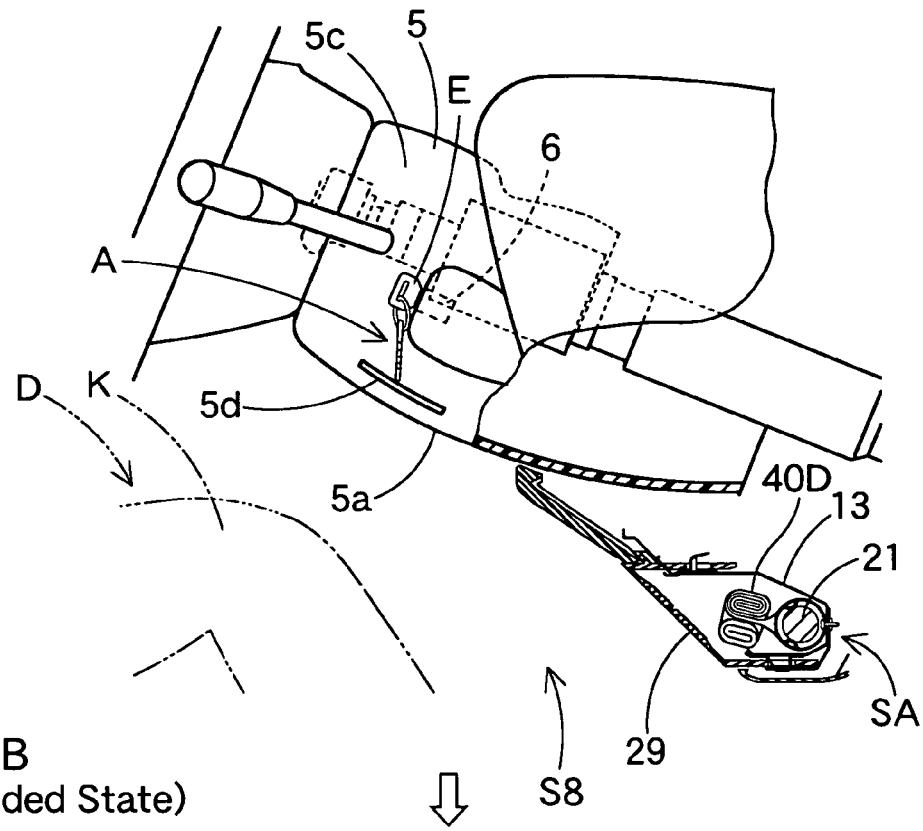
FIGS. 45A and 45B is a schematic side view illustrating an action of an eighth embodiment of the knee-protecting airbag device.
Figure 45B:
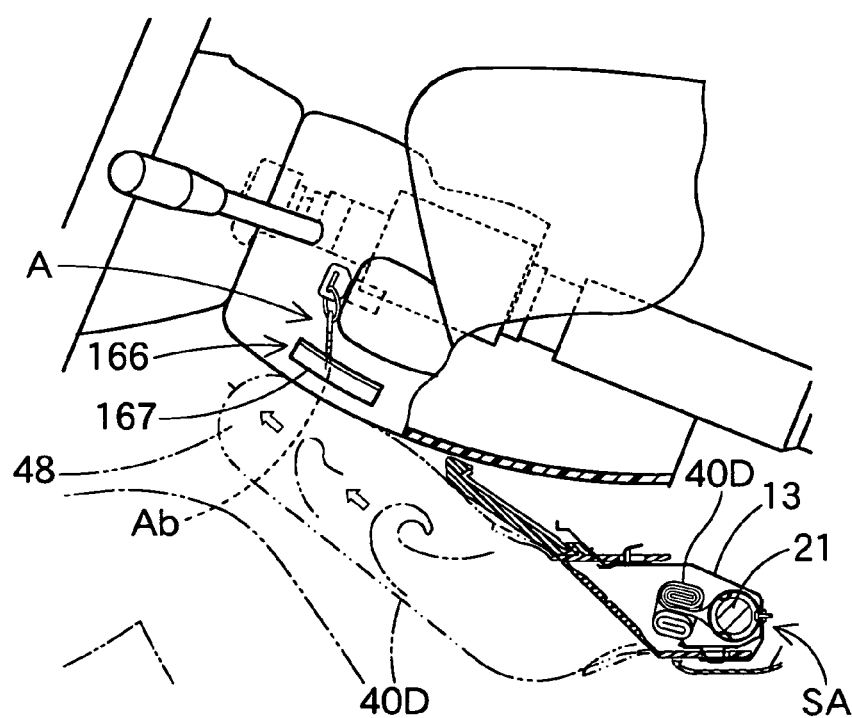
Figure 46A:
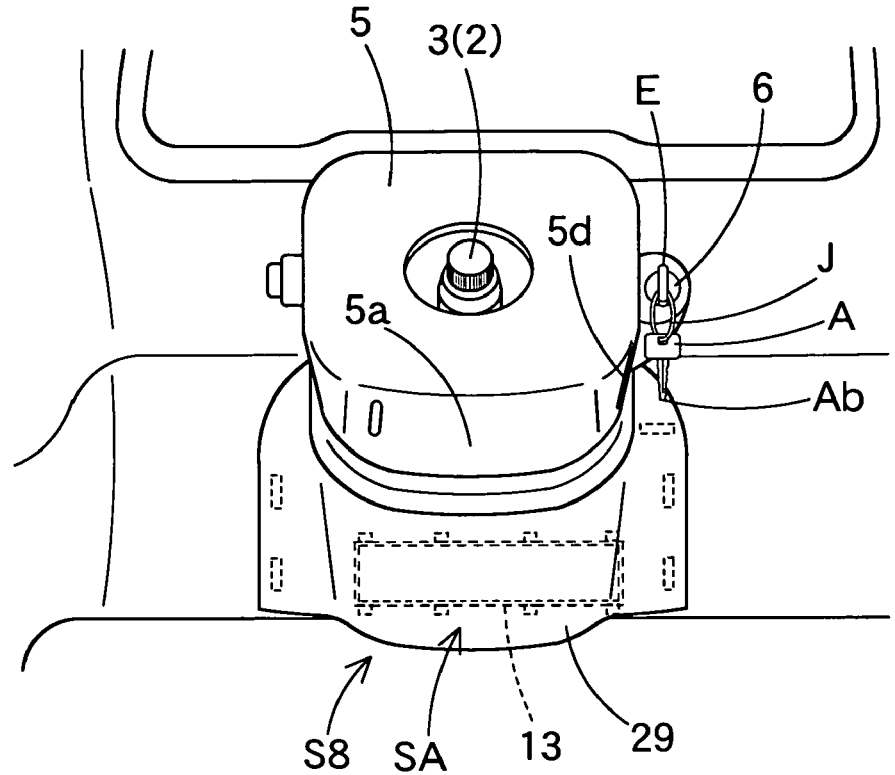
FIGS. 46A and 46B is a schematic front view illustrating the action of the knee-protecting airbag device of FIGS. 45A and 45B.
Figure 46B:
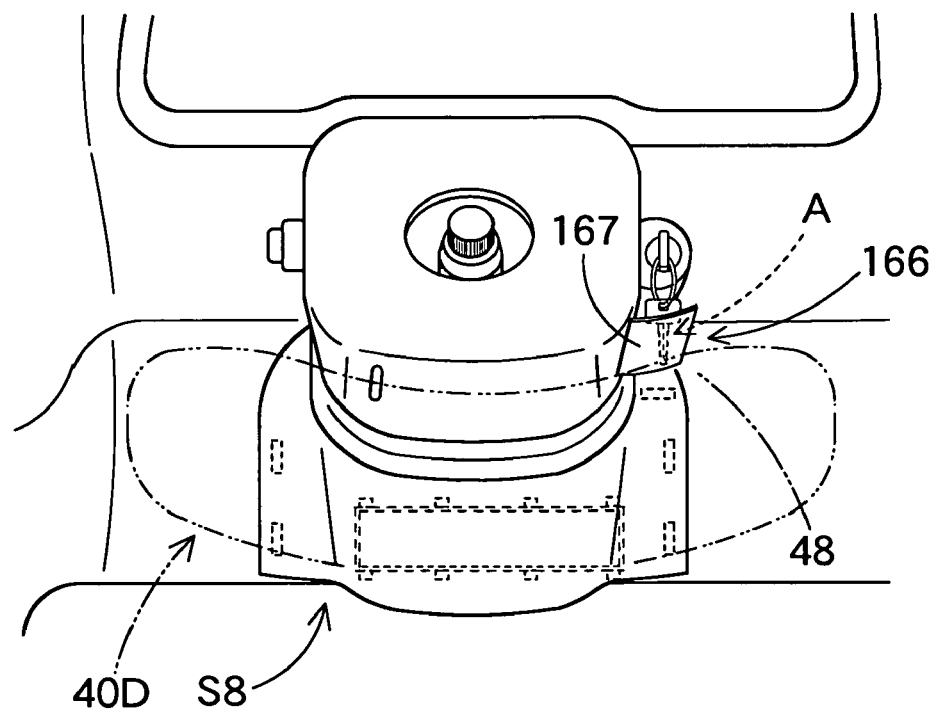

An eighth embodiment S8 of the knee-protecting airbag device shown in FIGS. 45 and 46 includes a damage prevention member 166 which is adapted to cover the lower side of the key accessory A and moves in and out of the column cover 5 by means of a moving means 169. Referring to FIGS. 47A and 47B, the damage prevention member 166 has a curved plate shape, and is protruded from a slit 5d formed on the right side face 5c of the column cover 5 in the periphery of the key accessory A, like the damage prevention member 155 in the fifth embodiment in the protruded state. In the housed state, the damage prevention member 166 is housed in the column cover 5. The prevention member 166 has its lower surface 167 function as a guide surface for guiding the cover portion 48 of the inflating airbag 40D upward.

The moving means 169 includes a control device 170 and a motor 171 fixed in the column cover 5 as a drive source. A pinion 172 formed in a drive shaft 171a of the motor 171 is engaged with a rack 168 formed in the prevention member 166. When the prevention member 166 moves back and forth between the preventing position and the housed position, it is supported by a not-shown guide within the column cover 5.

Figure 48:
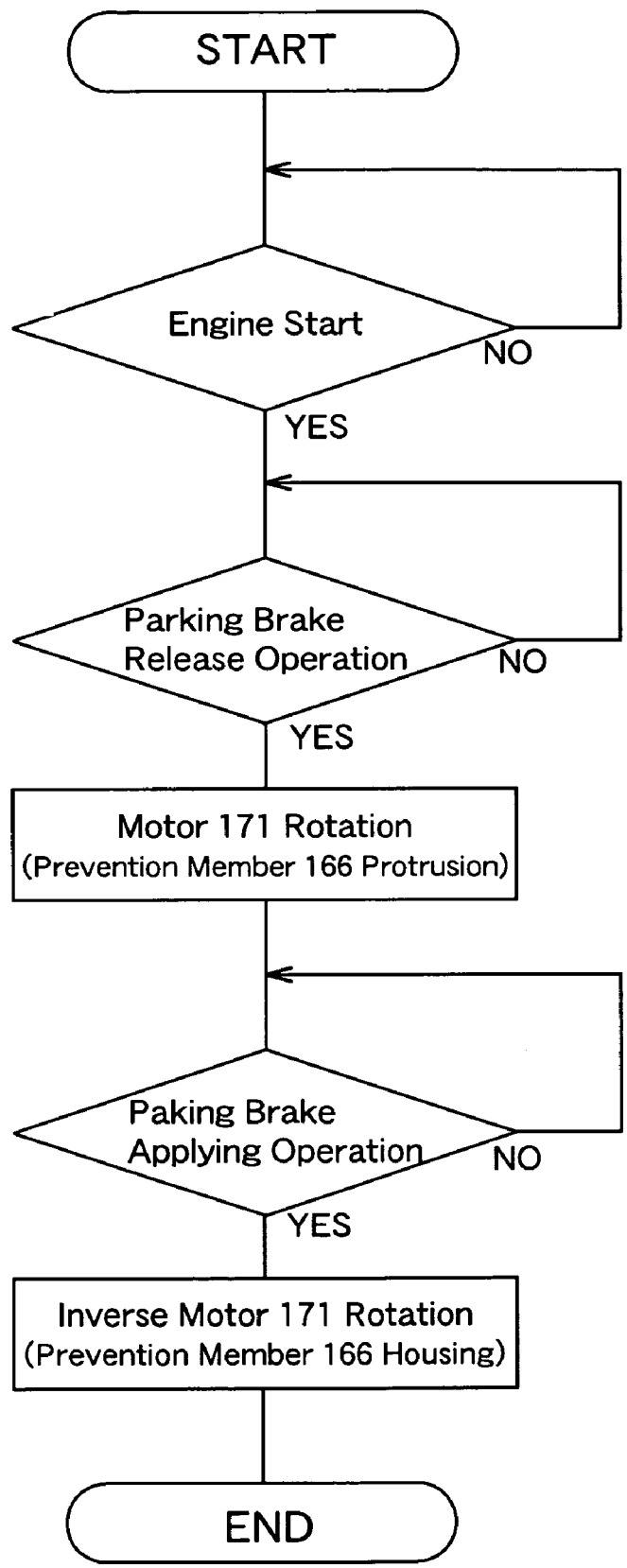
FIG. 48 is a flow chart showing the control of the moving of the damage prevention member shown in FIGS. 47A and 47B.

The control device 170 is adapted to control action of the motor 171. As referred to FIG. 48, when a parking brake is released after a vehicle engine is started, the motor 171 drives the prevention member 166 to protrude up to the preventing position so as to cover the lower side of the key accessory A. On applying the parking brake thereafter, the motor 171 spins inversely and controls the prevention member 166 to go back to the housed position in the column cover 5.

The eighth knee-protecting airbag device S8 is also equipped with the airbag module SA of the fourth embodiment, and differs from the airbag device S4 only in that the damage prevention member 166 is movably supported by the moving means 169. Thus, the folding process of the airbag 40D and the action of the airbag 40D in deployment are similar to those of the fourth airbag device S4.

In the airbag device S8, the damage prevention member 166 is not protruded but housed when the ignition key E needs to be operated and so on, so that key operation is not hindered. Moreover, since the damage prevention member 166 is housed except when it is needed, good appearance in the periphery of the key cylinder 6 is maintained.

Especially in the eighth airbag device S8, the moving means 169 is actuated and protrudes the prevention member 166 up to the preventing position when the parking brake is released after the vehicle engine is started, while it is actuated to move the prevention member 166 back to the housed position when the parking brake is used. With this arrangement, the releasing and applying operations of the parking brake determine the actions of the damage prevention member 166, so that the timing of moving in and out of the damage prevention member 166 is clear. Therefore, the moving means 169 properly behaves.

Figure 49A:
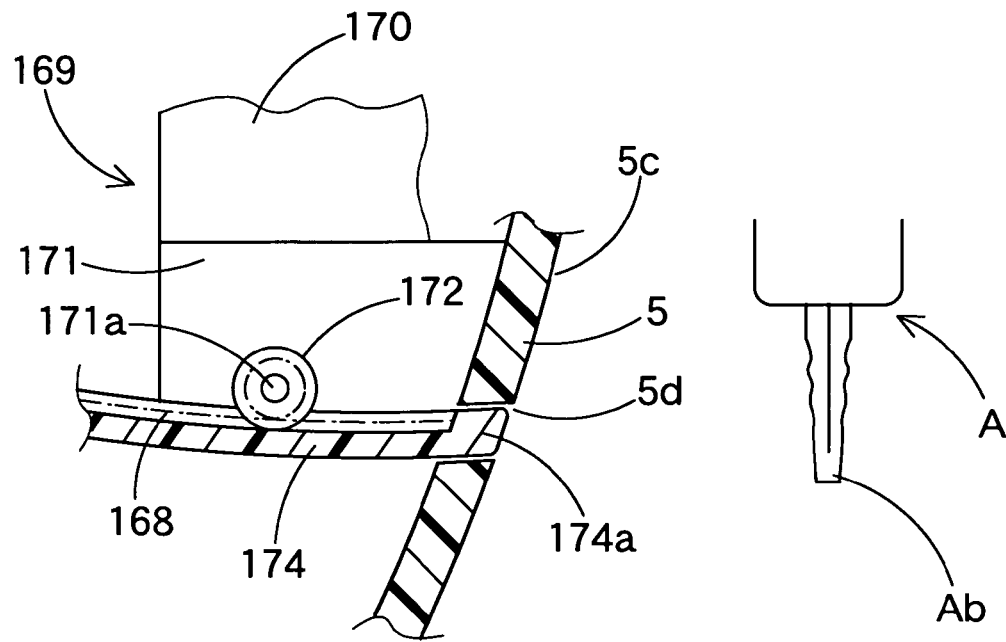
FIGS. 49A and 49B is a schematic vertical section taken along the transverse direction illustrating an action of the damage prevention member used in a ninth embodiment of the knee-protecting airbag device.
Figure 49B:
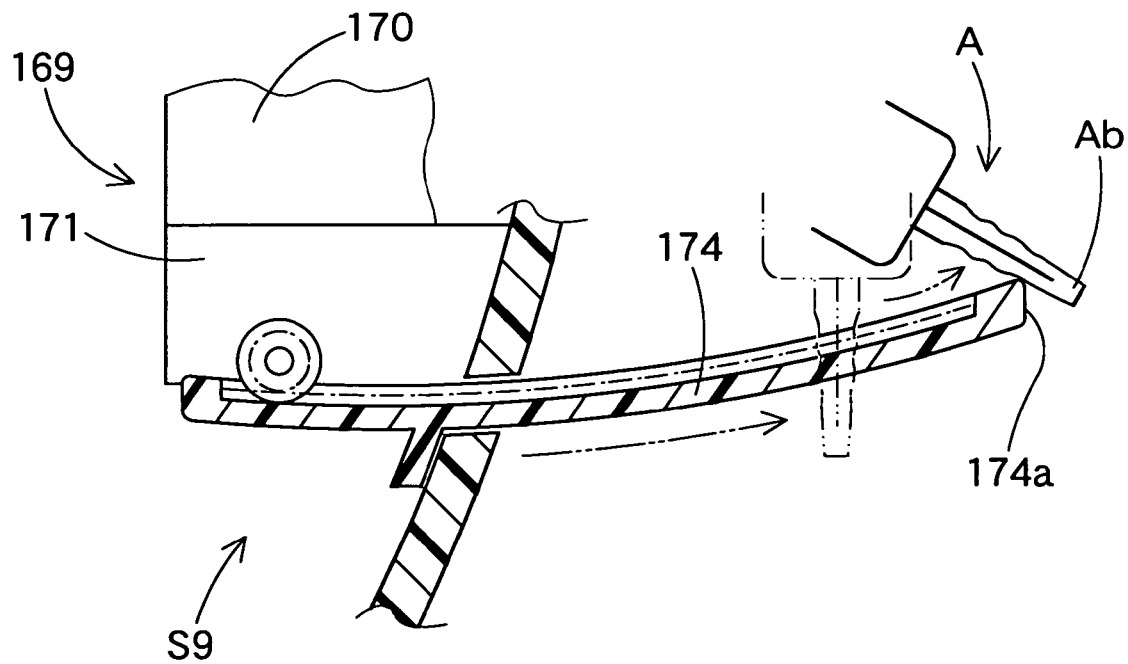

It will also be appreciated that the damage prevention member moves the key accessory A so as to prevent the contact of the inflating airbag 40D and the key accessory A. A ninth embodiment S9 of the airbag device shown in FIG. 49 includes a damage prevention member 174 which has a similar construction to that of the prevention member 166 in the eighth embodiment and is located closer to the key accessory A. The prevention member 174 moves like the prevention member 166 in the eighth embodiment. However, this prevention member 174 rather constitutes a moving piece to move the key accessory A. More specifically, the prevention member 174 differs from the prevention member 166 in, when protruded, pushing the key accessory A by its moving end 174a and directing the lower end Ab of the key accessory A away from the cover portion 48 of the inflating airbag 40D. With this arrangement, it is sufficient that the prevention member 174 and its moving means 169 change the direction of the lower end Ab of the key accessory A. Therefore, an acting portion can be as compact as possible.

Of course, the prevention member 174 may be configured to move the key accessory A itself out of the deployment area of the cover portion 48.

Figure 50:
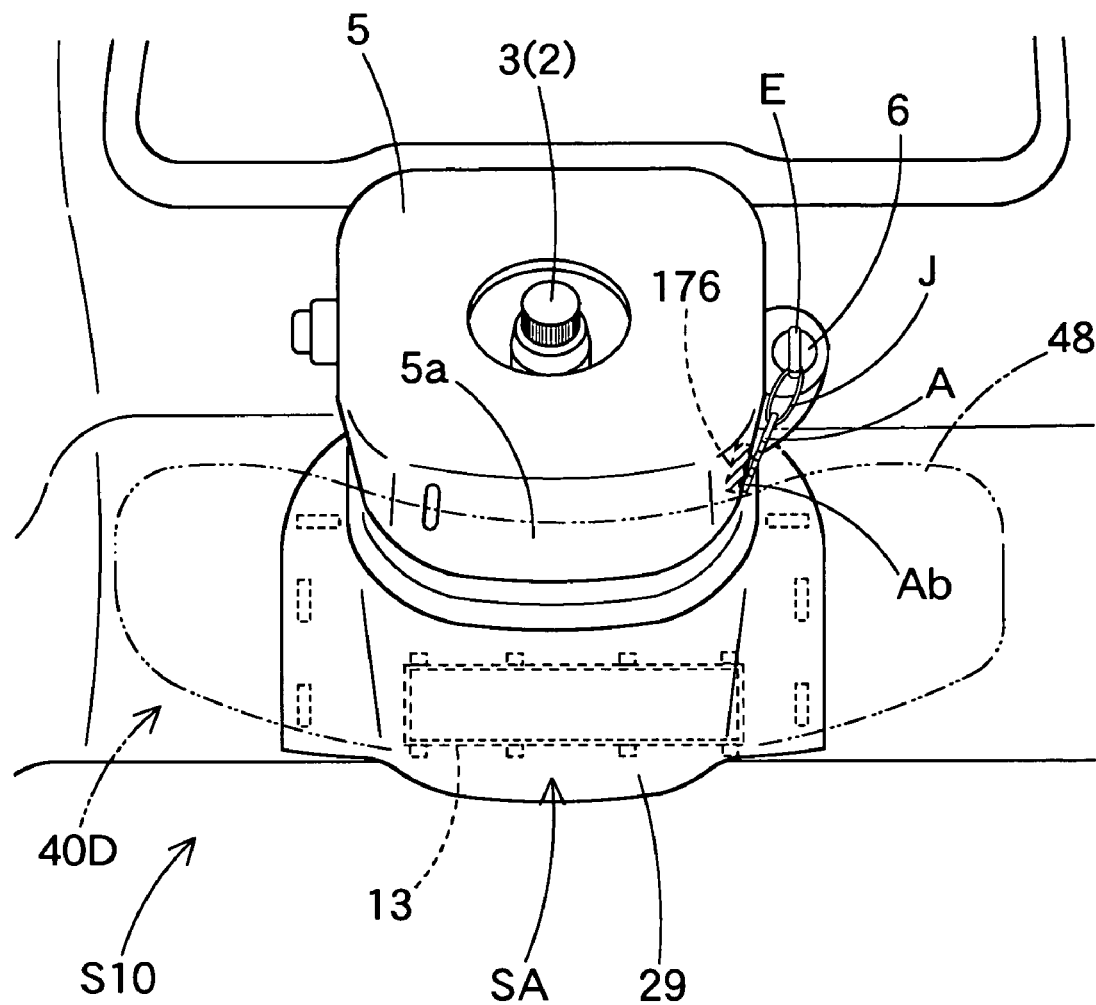
FIG. 50 is a schematic front view of a tenth embodiment of the knee-protecting airbag device.
Figure 51:
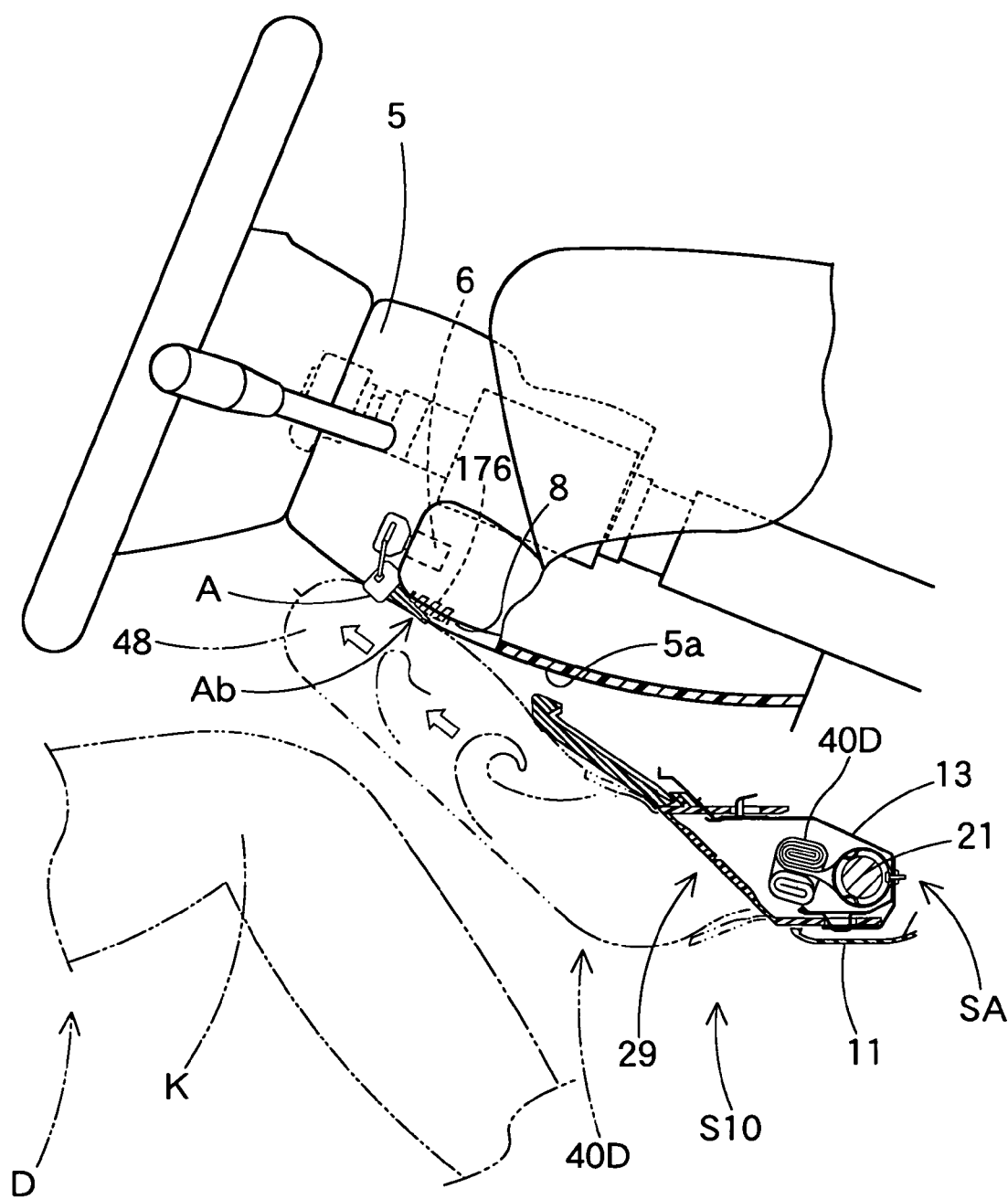
FIG. 51 is a schematic side view of the knee-protecting airbag device of FIG. 50.

A tenth embodiment S10 of the airbag device shown in FIGS. 50 and 51 includes a damage prevention member 176 constituted by a magnet that absorbs the key accessory A to a portion 8 proximate to the key cylinder 6. The damage prevention member 176 changes the direction of the lower end Ab of the key accessory A by absorbing the key accessory A such that the lower end Ab of the key accessory A may not contact with the cover portion 48 in a damageable way. If the damage prevention member 176 is composed of a magnet, a driving mechanism is not required, which helps the damage prevention member 176 to be more compact. Moreover, good appearance in the vicinity of the key cylinder 6 is secured since the magnet 176 does not have to be exposed on the surface. Here, the absorption of the key accessory A to the magnet 176 may not only be performed by the driver, but also be performed automatically by means of swinging of the running vehicle and soon. Alternatively, electro-magnet may be utilized. In that case, it would be appreciated to employ the control device 170 in the eighth embodiment. Specifically, a switch is turned on to absorb the key accessory A when the motor 171 is controlled to normal rotation, and the switch is turned off to release the key accessory A when the motor 171 is controlled to contra-rotation.

In the fourth to eighth embodiments, the damage preventing members 151, 155, 158, 162 and 166 are configured such that the inflating airbag 40D does not contact with the key accessory A at all. However, the inflating airbag 40D may contact with the key accessory A in such a degree as not to cause gas leakage. In that case, the damage preventing members 151, 155, 158, 162 and 166 may be made more compact.

Although the fourth to tenth embodiments show the key cylinder 6 located on the right side face 5c of the column cover or in the dashboard 10 rightward of the column cover 5, the present invention can also be applied, of course, to the key cylinder 6 located on the left side face of the column cover 5, or in the dashboard 10 apart leftward from the column cover 5.

What is claimed is:

1. A knee-protecting airbag device located below a steering column in front of a driver's seat and, at a lower side of a key cylinder into which an ignition key with an accessory is inserted, the airbag device comprising:

a housing case located below the steering column;
   an airbag folded and housed in the housing case in an undeployed condition, and upon inflow of inflation gas, the airbag protruding rearward from the housing case to deploy upward in order to protect the knees of a seated driver; the airbag comprising:
     a cover portion located in a left or right corner in an upper edge side of the airbag as completely deployed, the cover portion being for covering a vehicle's rear side of an area proximate to the key cylinder; and
     a general portion, the general portion being the upper edge side of the airbag as completely deployed other than the cover portion; and
   a damage prevention means for preventing the airbag from being damaged by the key accessory and leaking gas when the inflated airbag contacts with the key accessory directly
   wherein:
   the airbag comprises a primary inflatable portion, the primary inflatable portion being inflatable from an initial stage of inflow of inflation gas, and including the general portion as a part of the primary inflatable portion, and a secondary inflatable portion, the secondary inflatable portion starting to inflate around when the primary inflatable portion completes inflation,
   the cover portion is located either in an area of the secondary inflatable portion of the airbag, or in an area near the secondary inflatable portion, thereby constituting the damage prevention means,
   upon completion of inflation by the primary inflatable portion, the upper edge side of the airbag deploys up to a position of the upper edge side at complete inflation of the airbag with the cover portion remaining uninflated and in a thin plate-shape.

2. The knee-protecting airbag device according to claim 1, wherein:

the airbag as completely inflated takes a substantially plate shape including a column side wall located toward the steering column and a driver's side wall located toward the driver's seat; and
   the primary inflatable portion and the secondary inflatable portion are formed by stitching yarn, the stitching yarn breakably stitching the column cover side wall and the driver's side wall together.

* * * * *